US010630408B2

(12) United States Patent
Liu et al.

(10) Patent No.: US 10,630,408 B2
(45) Date of Patent: Apr. 21, 2020

(54) OVERLAPPED MULTIPLEXING MODULATION METHOD, APPARATUS AND SYSTEM

(71) Applicant: SHENZHEN SUPER DATA LINK TECHNOLOGY LTD., Shenzhen (CN)

(72) Inventors: Ruopeng Liu, Shenzhen (CN); Chunlin Ji, Shenzhen (CN); Shasha Zhang, Shenzhen (CN)

(73) Assignee: SHEN ZHEN KUANG-HI HEZHONG TECHNOLOGY LTD., Shenshen (CN)

( * ) Notice: Subject to any disclaimer, the term of this patent is extended or adjusted under 35 U.S.C. 154(b) by 108 days.

(21) Appl. No.: 16/017,012

(22) Filed: Jun. 25, 2018

(65) Prior Publication Data

US 2018/0309529 A1    Oct. 25, 2018

Related U.S. Application Data

(63) Continuation of application No. PCT/CN2016/111405, filed on Dec. 22, 2016.

(30) Foreign Application Priority Data

Dec. 23, 2015 (CN) .......................... 2015 1 0976691
Dec. 23, 2015 (CN) .......................... 2015 1 0976723

(Continued)

(51) Int. Cl.
*H04J 1/06* (2006.01)
*H04L 5/22* (2006.01)
(Continued)

(52) U.S. Cl.
CPC ................. *H04J 1/06* (2013.01); *H04J 3/04* (2013.01); *H04J 14/08* (2013.01); *H04J 15/00* (2013.01);
(Continued)

(58) Field of Classification Search
CPC .... H04J 1/06; H04J 3/04; H04J 3/1676; H04J 14/0223; H04L 12/2878; H04L 2012/6459;
(Continued)

(56) References Cited

U.S. PATENT DOCUMENTS 5,400,359 A * 3/1995 Hikoso .................. H04B 1/707
                                                         375/133
2009/0154613 A1 * 6/2009 Lai ...................... H04L 27/2649
                                                         375/344
(Continued)

FOREIGN PATENT DOCUMENTS

CN       104639493 A      5/2015
WO       2008006246 A1    1/2008
WO       2008019529 A1    2/2008

*Primary Examiner* — Warner Wong
(74) *Attorney, Agent, or Firm* — Cantor Colburn LLP

(57) ABSTRACT

The disclosure relates to an overlapped multiplexing modulation method, apparatus, and system. An initial envelope waveform that is smooth in a time domain or frequency domain is generated based on design parameters; the initial envelope waveform is shifted in the time domain or frequency domain at a preset spectrum interval based on times of overlapped multiplexing, to obtain subcarrier envelope waveforms; an input digital signal sequence is converted into a positive-negative symbol sequence; each symbol in the positive-negative symbol sequence is multiplied by a subcarrier envelope waveform corresponding to the symbol, to obtain modulated envelope waveforms of subcarriers; the modulated envelope waveforms of the subcarriers are superimposed in the time domain or frequency domain, to obtain a time-domain or frequency-domain complex modulated envelope waveform; and the time-domain or frequency-domain complex modulated envelope waveform is transformed, to obtain a time-domain or frequency-domain complex modulated envelope waveform.

16 Claims, 45 Drawing Sheets

(30) Foreign Application Priority Data

| Dec. 23, 2015 | (CN) | 2015 1 0976738 |
|---|---|---|
| Dec. 23, 2015 | (CN) | 2015 1 0976808 |
| Dec. 23, 2015 | (CN) | 2015 1 0976810 |
| Dec. 23, 2015 | (CN) | 2015 1 0976894 |
| Dec. 23, 2015 | (CN) | 2015 1 0976895 |
| Dec. 23, 2015 | (CN) | 2015 1 0976914 |
| Dec. 23, 2015 | (CN) | 2015 1 0976950 |
| Dec. 23, 2015 | (CN) | 2015 1 0976982 |
| Dec. 23, 2015 | (CN) | 2015 1 0976985 |
| Dec. 23, 2015 | (CN) | 2015 1 0977027 |
| Dec. 23, 2015 | (CN) | 2015 1 0977028 |
| Dec. 23, 2015 | (CN) | 2015 1 0977078 |
| Dec. 23, 2015 | (CN) | 2015 1 0977154 |
| Dec. 23, 2015 | (CN) | 2015 1 0977187 |
| Dec. 23, 2015 | (CN) | 2015 1 0977201 |
| Dec. 23, 2015 | (CN) | 2015 1 0977202 |
| Dec. 23, 2015 | (CN) | 2015 1 0977211 |
| Dec. 23, 2015 | (CN) | 2015 1 0977212 |
| Dec. 23, 2015 | (CN) | 2015 1 0977213 |
| Dec. 23, 2015 | (CN) | 2015 1 0979091 |
| Dec. 23, 2015 | (CN) | 2015 1 0979093 |
| Dec. 23, 2015 | (CN) | 2015 1 0979187 |
| Dec. 23, 2015 | (CN) | 2015 1 0979188 |
| Dec. 23, 2015 | (CN) | 2015 1 0979525 |
| Dec. 23, 2015 | (CN) | 2015 1 0979680 |
| Dec. 23, 2015 | (CN) | 2015 1 0979707 |
| Dec. 23, 2015 | (CN) | 2015 1 0981427 |
| Dec. 23, 2015 | (CN) | 2015 1 0981428 |
| Dec. 23, 2015 | (CN) | 2015 1 0981430 |
| Dec. 23, 2015 | (CN) | 2015 1 0981466 |

(51) Int. Cl.

| *H04J 99/00* | (2009.01) |
|---|---|
| *H04J 14/08* | (2006.01) |
| *H04J 3/04* | (2006.01) |
| H04L 27/00 | (2006.01) |
| H04L 27/24 | (2006.01) |

(52) U.S. Cl.
CPC ............ *H04L 5/22* (2013.01); *H04L 27/0006* (2013.01); *H04L 27/24* (2013.01)

(58) Field of Classification Search
CPC ......... H04L 5/1423; H04L 2025/03394; H04L 2027/0026; H04L 2027/0083; H04L 27/00; H04L 27/10; H04L 27/24; H04L 27/20; H04L 27/2003
See application file for complete search history.

(56) References Cited

U.S. PATENT DOCUMENTS

| 2011/0075649 | A1* | 3/2011 | Li | H04L 25/03203 370/343 |
|---|---|---|---|---|
| 2013/0077714 | A1* | 3/2013 | Lim | H04L 27/2636 375/302 |
| 2016/0204889 | A1* | 7/2016 | Swarup | H04J 13/0018 375/130 |
| 2017/0195113 | A1* | 7/2017 | Smaini | H03C 3/0916 |
| 2018/0054269 | A1* | 2/2018 | Cui | H04L 27/2676 |
| 2018/0227069 | A1* | 8/2018 | Lee | H04L 5/005 |
| 2019/0068308 | A1* | 2/2019 | Shin | H04J 13/12 |

* cited by examiner $$a_0X_0 \quad a_1X_0 \quad a_2X_0 \quad \cdots \quad a_{k-1}X_0$$

$$a_0X_1 \quad a_1X_1 \quad a_2X_1 \quad \cdots \quad a_{k-1}X_1$$

$$a_0X_2 \quad a_1X_2 \quad a_2X_2 \quad \cdots \quad a_{k-1}X_2$$

$$\cdots$$

$$a_0X_{k-1} \quad a_1X_{k-1} \quad a_2X_{k-1} \quad \cdots \quad a_{k-1}X_{k-1}$$

Input symbols:   +1  +1  −1  −1  −1  +1  −1  +1

Superimposition procedure:

+1  +1  +1  −1  −1  −1  −1  −1  −1

+1  +1  +1  −1  −1  −1  +1  +1  +1

+  −1  −1  −1  +1  +1  +1

Output symbols:  +1  +2  +1  −1  −3  −1  −1  +1

FIG. 12

OVERLAPPED MULTIPLEXING MODULATION METHOD, APPARATUS AND SYSTEM

CROSS REFERENCE TO RELATED APPLICATIONS

This application is a continuation of PCT Application No. PCT/CN2016/111405 filed on 2016 Dec. 22, which claims priority to Chinese patent application No. 201510979188.3 of 2015 Dec. 23; Chinese patent application No. 201510977202.6 of 2015 Dec. 23; Chinese patent application No. 201510979707.6 of 2015 Dec. 23; Chinese patent application No. 201510977201.1 of 2015 Dec. 23; Chinese patent application No. 201510977154.0 of 2015 Dec. 23; Chinese patent application No. 201510979187.9 of 2015 Dec. 23; Chinese patent application No. 201510977078.3 of 2015 Dec. 23; Chinese patent application No. 201510976950.2 of 2015 Dec. 23; Chinese patent application No. 201510976914.6 of 2015 Dec. 23; Chinese patent application No. 201510981430.0 of 2015 Dec. 23; Chinese patent application No. 201510979525.9 of 2015 Dec. 23; Chinese patent application No. 201510979680.0 of 2015 Dec. 23; Chinese patent application No. 201510979093.1 of 2015 Dec. 23; Chinese patent application No. 201510976810.5 of 2015 Dec. 23; Chinese patent application No. 201510977028.5 of 2015 Dec. 23; Chinese patent application No. 201510981466.9 of 2015 Dec. 23; Chinese patent application No. 201510977187.5 of 2015 Dec. 23; Chinese patent application No. 201510979091.2 of 2015 Dec. 23; Chinese patent application No. 201510977027.0 of 2015 Dec. 23; Chinese patent application No. 201510976808.8 of 2015 Dec. 23; Chinese patent application No. 201510981427.9 of 2015 Dec. 23; Chinese patent application No. 201510976738.6 of 2015 Dec. 23; Chinese patent application No. 201510976723.X of 2015 Dec. 23; Chinese patent application No. 201510976985.6 of 2015 Dec. 23; Chinese patent application No. 201510981428.3 of 2015 Dec. 23; Chinese patent application No. 201510977213.4 of 2015 Dec. 23; Chinese patent application No. 201510976982.2 of 2015 Dec. 23; Chinese patent application No. 201510976895.7 of 2015 Dec. 23; Chinese patent application No. 201510977212.X of 2015 Dec. 23; Chinese patent application No. 201510976894.2 of 2015 Dec. 23; Chinese patent application No. 201510976691.3 of 2015 Dec. 23 and Chinese patent application No. 201510977211.5 of 2015 Dec. 23, all of which are incorporated herein by reference.

TECHNICAL FIELD

The disclosure relates to the communications field, and specifically, to an overlapped multiplexing modulation method and apparatus, and an overlapped multiplexing system.

BACKGROUND

Time division (hereinafter referred to as TD) multiplexing (TDM: Time Division Multiplexing) is a technology in which a plurality of signal symbols occupying relatively narrow time durations share one relatively wide time duration in digital communication. Frequency division multiplexing FDM (Frequency Division Multiplexing) is a technology in which a plurality of signals occupying relatively narrow bandwidths share one relatively wide bandwidth. Used signal bandwidths are respectively B1, B2, B3, B4, . . . , or certainly, the signals may occupy a same bandwidth. AB is a minimum guard bandwidth, and an actual guard bandwidth may be wider. AB should be greater than a sum of a transition bandwidth of a used demultiplexing filter, a maximum frequency drift of a system, and a maximum frequency diffusion of a channel. This is a most common frequency division multiplexing technology. This technology is used in most existing systems such as broadcast systems, communications systems, and radar systems. A most significant feature of this technology is that used signal spectrums are isolated from each other, without mutual interference.

FIG. 1A is a schematic diagram of a conventional time division multiplexing technology. In FIG. 1A, time durations (referred to as timeslot widths in engineering) of multiplexed signal symbols are respectively T1, T2, T3, T4, . . . , and in engineering, the signal symbols usually occupy a same timeslot bandwidth. ΔT is a minimum guard timeslot, and an actual guard timeslot width should be larger. ΔT should be greater than a sum of a transition time width of a used demultiplexing gate circuit and a maximum time jitter of a system. This is a most common time division multiplexing technology. This technology is used in most existing systems such as multichannel digital broadcast systems and multichannel digital communications systems.

FIG. 1B is corresponding to a schematic diagram of a frequency division multiplexing technology. Used signal bandwidths are respectively B1, B2, B3, B4, . . . , or certainly, the signals may occupy a same bandwidth. ΔB is a minimum guard bandwidth, and an actual guard bandwidth may be wider. ΔB should be greater than a sum of a transition bandwidth of a used demultiplexing filter, a maximum frequency drift of a system, and a maximum frequency diffusion of a channel. This is a most common frequency division multiplexing technology. This technology is used in most existing systems such as broadcast systems, communications systems, and radar systems. A most significant feature of this technology is that used signal spectrums are isolated from each other, without mutual interference.

A most significant feature of this technology when it is applied to digital communications is: Multiplexed signal symbols are fully isolated from each other in terms of time, without mutual interference. The multiplexed signal symbols are not limited, and symbol durations (timeslot widths) of signals may have different widths. In addition, this technology is applicable to different communications mechanisms, provided that timeslots of the multiplexed signal symbols do not overlap or cross with each other. Therefore, this technology is most widely used. However, such multiplexing has no effect in improving spectrum efficiency of a system.

Therefore, a conventional idea is that adjacent channels do not overlap in a time domain, to avoid interference between the adjacent channels. However, this technology limits improvement of spectrum efficiency. An idea of a time division multiplexing technology in the prior art is that channels do not need to be isolated from each other and may strongly overlap with each other. As shown in FIG. 2A, in the prior art, overlapping between channels is considered as a new encoding constraint relationship, and corresponding modulation and demodulation technologies are proposed based on the constraint relationship. Therefore, a technology is referred to as an overlapped time division multiplexing (OvTDM: Overlapped Time Division Multiplexing). In this technology, spectrum efficiency increases proportionally with a quantity K of times of overlapping. In a frequency domain, a technology is correspondingly overlapped frequency division multiplexing (Overlapped Frequency Division Multiplexing). Correspondingly, this technology is shown in FIG. 2B.

Theoretically, when data transmission is performed by the overlapped time division multiplexing technology or overlapped frequency division multiplexing, the quantity K of times of overlapping may increase unlimitedly. Therefore, the spectrum efficiency may also increase unlimitedly. However, at a laboratory investigation stage, it is found that as the quantity K of times of overlapping increases, although the spectrum efficiency increases, transmit power also increases correspondingly. An increase in the transmit power also limits, in turn, an increase in the quantity K of times of overlapping to some extent, thereby limiting an increase in the spectrum efficiency.

SUMMARY

According to a first aspect of this application, this application provides an overlapped time division multiplexing modulation method, including:

generating, based on design parameters, an initial envelope waveform that is smooth in a time domain;

shifting the initial envelope waveform in the time domain at a preset shift interval based on times of overlapped multiplexing, to obtain offset envelope waveforms of transmit signals at various moments;

converting an input digital signal sequence into a positive-negative symbol sequence;

multiplying the positive-negative symbol sequence obtained after conversion by the offset envelope waveforms of transmit signals at various moments that are obtained after shifting, to obtain modulated envelope waveforms of the moments; and superimposing the modulated envelope waveforms of the moments in the time domain, to obtain a complex modulated envelope waveform carrying an output signal sequence.

According to a second aspect of this application, this application further provides an overlapped time division multiplexing modulation apparatus, including:

a waveform generation module, configured to generate, based on design parameters, an initial envelope waveform that is smooth in a time domain;

a shift module, configured to shift the initial envelope waveform in the time domain at a preset shift interval based on times of overlapped multiplexing, to obtain offset envelope waveforms of transmit signals at various moments;

a modulation module, configured to convert an input digital signal sequence into a positive-negative symbol sequence;

a multiplication module, configured to multiply the input positive-negative symbol sequence by the offset envelope waveforms of transmit signals at various moments, to obtain modulated envelope waveforms of the moments; and a superimposition module, configured to superimpose the modulated envelope waveforms of the moments in the time domain, to obtain a complex modulated envelope waveform carrying an output signal sequence.

A third aspect of the disclosure provides an overlapped frequency division multiplexing modulation method, including the following steps:

generating, based on design parameters, an initial envelope waveform that is smooth in a frequency domain;

shifting the initial envelope waveform in the frequency domain at a preset spectrum interval based on times of overlapped multiplexing, to obtain subcarrier envelope waveforms;

converting an input digital signal sequence into a positive-negative symbol sequence;

multiplying each symbol in the positive-negative symbol sequence by a subcarrier envelope waveform corresponding to the symbol, to obtain modulated envelope waveforms of subcarriers;

superimposing the modulated envelope waveforms of the subcarriers in the frequency domain, to obtain a frequency-domain complex modulated envelope waveform; and transforming the frequency-domain complex modulated envelope waveform, to obtain a time-domain complex modulated envelope waveform.

A fourth aspect of the disclosure provides an overlapped frequency division multiplexing modulation apparatus, including:

a waveform generation module, configured to generate an initial envelope waveform that is smooth in a frequency domain;

a shift module, configured to shift the initial envelope waveform in the frequency domain at a preset spectrum interval based on times of overlapped multiplexing, to obtain subcarrier envelope waveforms;

a conversion module, configured to convert an input digital signal sequence into a positive-negative symbol sequence;

a multiplication module, configured to multiply each symbol in the positive-negative symbol sequence by a subcarrier envelope waveform corresponding to the symbol, to obtain modulated envelope waveforms of subcarriers;

a superimposition module, configured to superimpose the modulated envelope waveforms of the subcarriers in the frequency domain, to obtain a frequency-domain complex modulated envelope waveform; and a transformation module, configured to transform the frequency-domain complex modulated envelope waveform, to obtain a time-domain complex modulated envelope waveform.

In the overlapped time division multiplexing modulation method, apparatus, and system provided in the disclosure, the time-domain waveform of the initial envelope waveform is relatively smooth, frequency-domain bandwidth is relatively narrow, and a waveform obtained after superimposition is relatively smooth and is limited in relatively narrow bandwidth; therefore, spectrum utilization and a transmission rate of the system are improved, and a bit error rate of the system is reduced. However, in the overlapped frequency division multiplexing modulation method, apparatus, and system, the generated initial envelope waveform is smooth in the frequency domain, and correspondingly, the initial envelope waveform has centralized energy and relatively short duration in the time domain; therefore, the complex modulated envelope waveform obtained by modulating the initial envelope waveform has centralized energy and relatively short duration in the time domain, so that spectrum utilization of the system is high, a signal transmission rate is also high, relatively low transmit power is required, and there is a relatively low bit error rate during demodulation.

BRIEF DESCRIPTION OF DRAWINGS

FIG. 12 is a schematic principle diagram of a symbol superimposition procedure of K waveforms;

DESCRIPTION OF EMBODIMENTS

The following further describes the disclosure in detail with reference to specific embodiments and accompanying drawings.

In a research on an overlapped time division multiplexing technology, the inventor finds that an increase in transmit power is mainly related to a spectrum of a multiplexed signal (namely, a modulation window function), other than a theoretical assumption that no requirement is imposed on a spectrum shape and bandwidth of the multiplexed signal. Although there are many window functions in the prior art, theoretically, a transmit symbol may be modulated by using various window functions freely. However, generation, design, and application of a rectangular window are easier and more cost-effective than those of other window functions. Therefore, currently, the rectangular window is preferentially used for signal modulation. However, spectrum bandwidth of a rectangular wave is relatively wide, and performance of a multiplexing waveform system is poor. Consequently, required transmit power and a bit error rate are high.

Based on the foregoing findings, in the embodiments of the disclosure, when the overlapped time division multiplexing technology is used, a window function superior to the rectangular wave is used to modulate an input digital signal sequence.

Figure 1A:
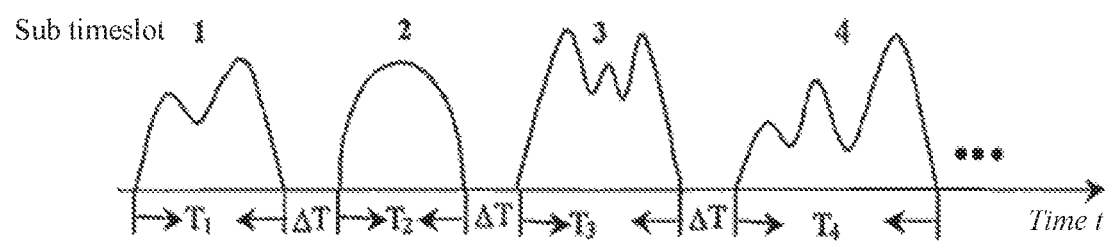
FIG. 1A is a schematic diagram of a conventional time division multiplexing technology.
Figure 1B:
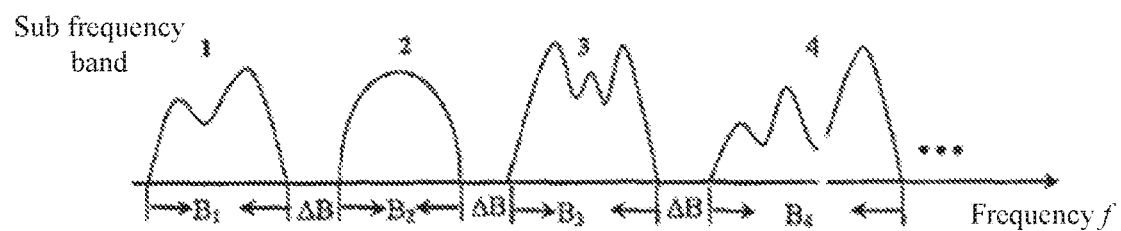
FIG. 1B is a schematic diagram of a conventional frequency division multiplexing technology.
Figure 2A:
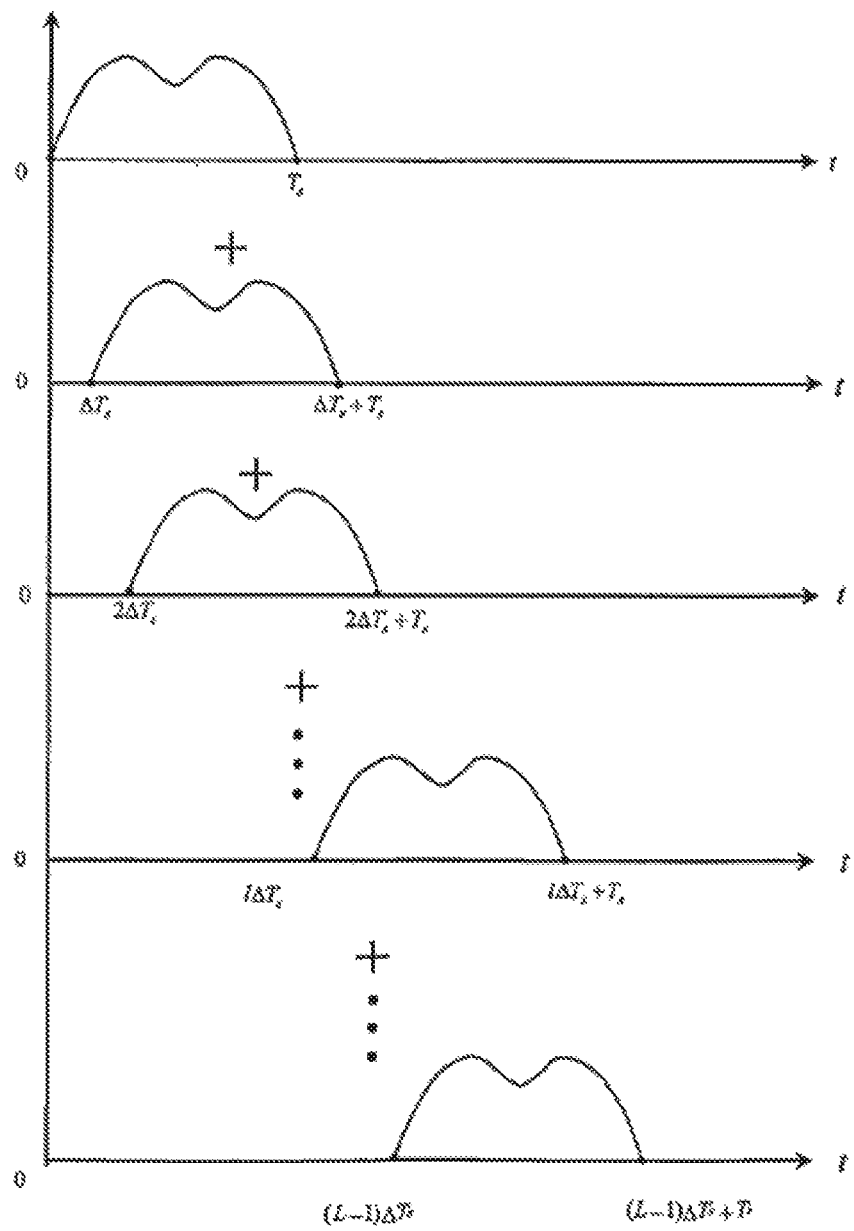
FIG. 2A is a schematic diagram of an overlapped time division multiplexing principle.
Figure 2B:
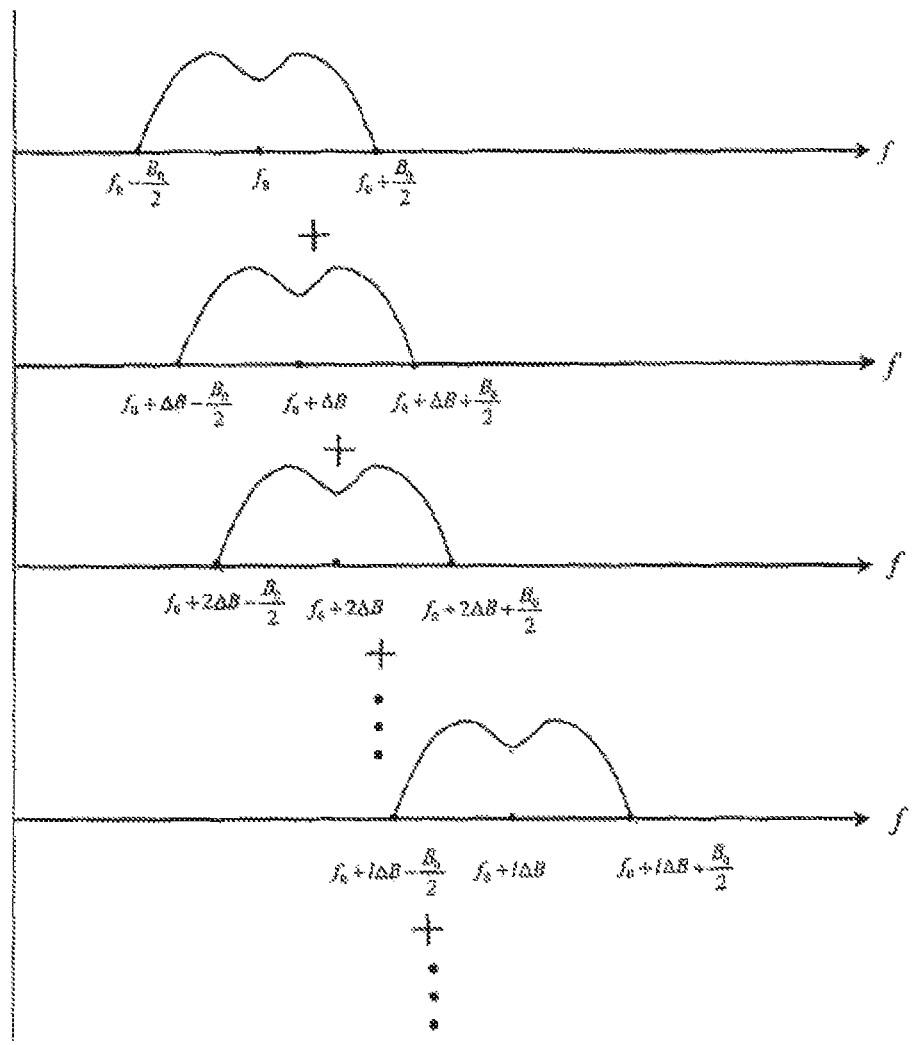
FIG. 2B is a schematic diagram of an overlapped frequency division multiplexing principle.
Figure 3A:
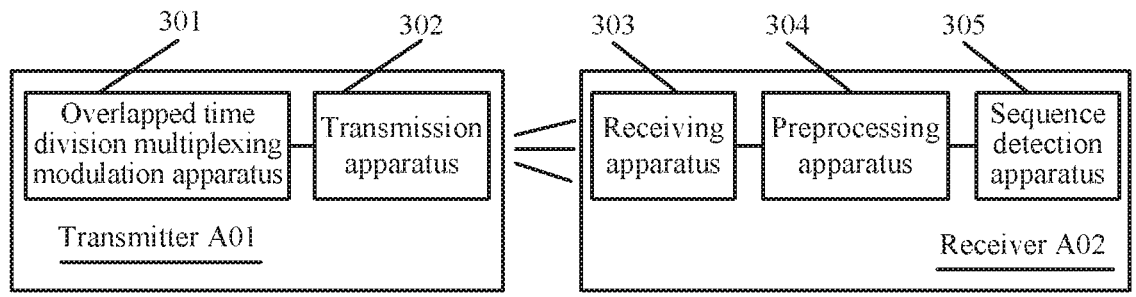
FIG. 3A is a schematic structural diagram of an overlapped time division multiplexing system according to an embodiment of the disclosure.

Referring to FIG. 3A, an overlapped time division multiplexing system includes a transmitter A01 and a receiver A02.

The transmitter A01 includes an overlapped time division multiplexing modulation apparatus 301 and a transmission apparatus 302. The overlapped time division multiplexing modulation apparatus 301 is configured to generate a complex modulated envelope waveform carrying an output signal sequence. The transmission apparatus 302 is configured to transmit the complex modulated envelope waveform to the receiver A02.

The receiver A02 includes a receiving apparatus 303 and a sequence detection apparatus 305. The receiving apparatus 303 is configured to receive the complex modulated envelope waveform transmitted by the transmission apparatus 302. The sequence detection apparatus 305 is configured to perform data sequence detection on the received complex modulated envelope waveform in a time domain, to perform decision output.

Preferably, the receiver A02 further includes a preprocessing apparatus 304 between the receiving apparatus 303 and the sequence detection apparatus 305, configured to assist in forming a synchronously received digital signal sequence in each frame.

In the transmitter A01, the input digital signal sequence forms, by using the overlapped time division multiplexing modulation apparatus 301, transmit signals that have a plurality of symbols overlapped in the time domain; and then the transmission apparatus 302 transmits the transmit signals to the receiver A02. The receiving apparatus 303 of the receiver A02 receives the signals transmitted by the transmission apparatus 302. The signals form, by using the preprocessing apparatus 304, digital signals suitable for the sequence detection apparatus 305 to detect and receive. The sequence detection apparatus 305 performs data sequence detection on the received signals in the time domain, to output a decision.

Figure 3B:
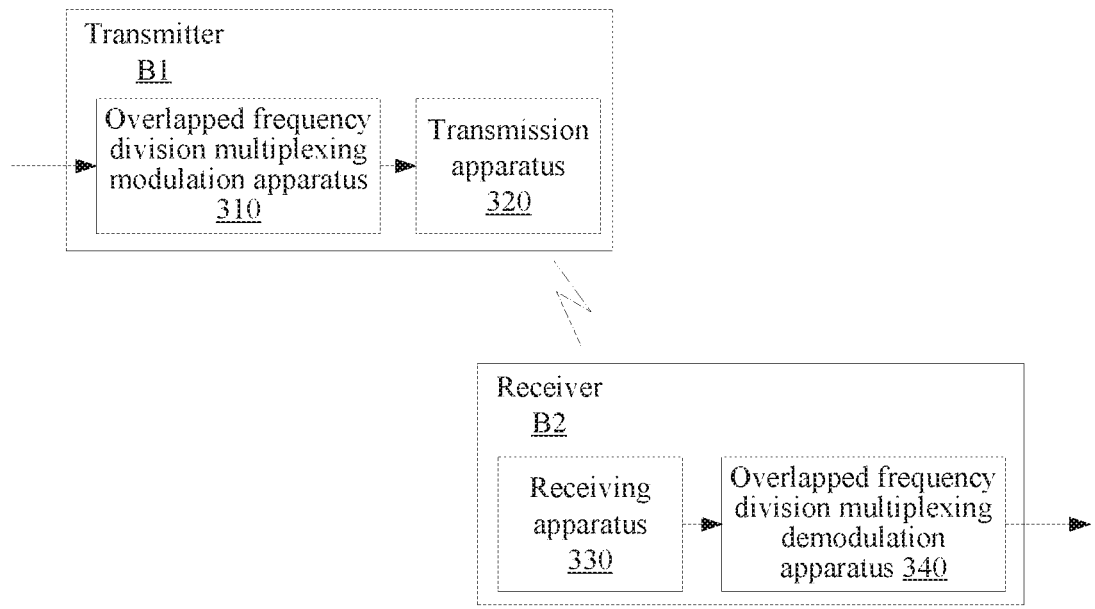
FIG. 3B is a schematic structural diagram of an overlapped frequency division multiplexing system according to an embodiment of the disclosure.

Correspondingly, structures of a transmitter and a receiver in an overlapped frequency division multiplexing system are shown in FIG. 3B. The transmitter B1 includes an overlapped frequency division multiplexing modulation apparatus 310 and a transmission apparatus 320. The overlapped frequency division multiplexing modulation apparatus 310 is configured to generate, through modulation, a complex modulated envelope waveform carrying an output signal sequence. The transmission apparatus 320 is configured to transmit the complex modulated envelope waveform to the receiver B2. The receiver B2 includes a receiving apparatus 330 and an overlapped frequency division multiplexing demodulation apparatus 340. The receiving apparatus 330 is configured to receive the complex modulated envelope waveform transmitted by the transmission apparatus 320. The overlapped frequency division multiplexing demodulation apparatus 340 is configured to demodulate and decode the received complex modulated envelope waveform.

Figure 4A:
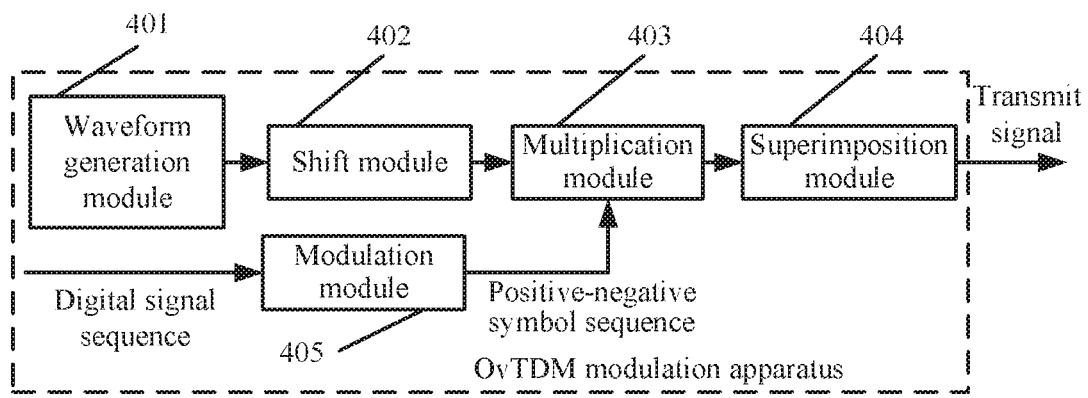
FIG. 4A is a schematic structural diagram of an overlapped time division multiplexing modulation apparatus according to an embodiment of the disclosure.

Referring to FIG. 4A, the overlapped time division multiplexing modulation apparatus 301 (OvTDM modulation apparatus) in FIG. 3A includes a waveform generation module 401, a shift module 402, a multiplication module 403, a superimposition module 404, and a modulation module 405.

The waveform generation module 401 is configured to generate, based on design parameters, an initial envelope waveform that is smooth in a time domain.

The shift module 402 is configured to shift the initial envelope waveform in the time domain at a preset shift interval based on times of overlapped multiplexing, to obtain offset envelope waveforms of transmit signals at various moments.

The modulation module 405 is configured to convert an input digital signal sequence into a positive-negative symbol sequence.

The multiplication module 403 is configured to multiply the positive-negative symbol sequence obtained after conversion by the offset envelope waveforms of transmit signals at various moments that are obtained after shifting, to obtain modulated envelope waveforms of the moments.

The superimposition module 404 is configured to superimpose the modulated envelope waveforms of the moments in the time domain, to obtain a complex modulated envelope waveform carrying an output signal sequence.

Figure 4B:
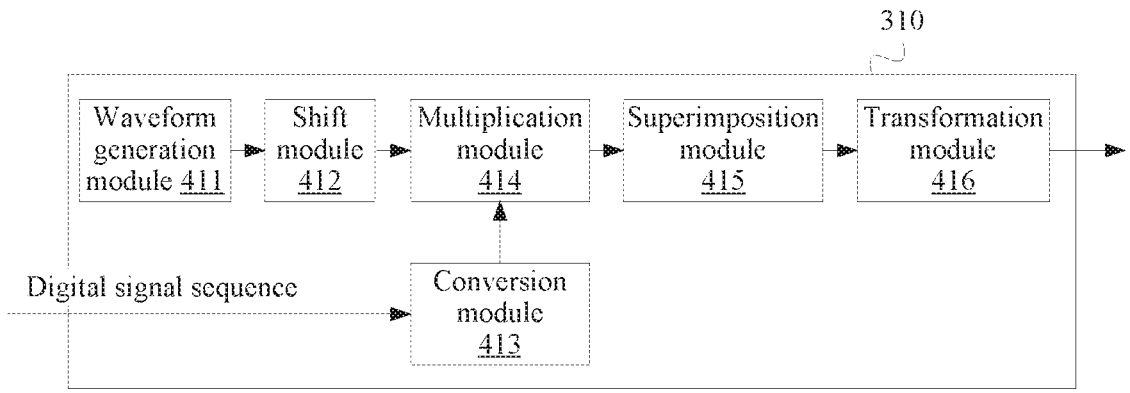
FIG. 4B is a schematic structural diagram of an overlapped frequency division multiplexing modulation apparatus according to an embodiment of the disclosure.

In an overlapped frequency division multiplexing modulation apparatus shown in FIG. 4B, the overlapped frequency division multiplexing modulation apparatus 310 includes a waveform generation module 411, a shift module 412, a conversion module 413, a multiplication module 414, a superimposition module 415, and a transformation module 416.

The waveform generation module 411 is configured to generate, based on design parameters, an initial envelope waveform that is smooth in a frequency domain. In an embodiment, the design parameter at least includes a bandwidth of the initial envelope waveform.

The shift module 412 is configured to shift the initial envelope waveform in the frequency domain at a preset spectrum interval based on times of overlapped multiplexing, to obtain subcarrier envelope waveforms. In an embodiment, the spectrum interval is a subcarrier spectrum interval $\Delta B$, where the subcarrier spectrum interval $\Delta B=B/K$, $B$ is the bandwidth of the initial envelope waveform, and $K$ is the quantity of times of overlapped multiplexing.

The conversion module 413 is configured to convert an input digital signal sequence into a positive-negative symbol sequence. In an embodiment, that the conversion module 413 converts the input digital signal sequence into the positive-negative symbol sequence is specifically: converting 0 and 1 in the input digital signal sequence into +A and −A respectively, to form and output the positive-negative symbol sequence. For example, A=1. In a specific embodiment, the conversion module 413 converts, through modulation in a BPSK modulation manner, an input {0, 1} bit sequence into {+1, −1} symbol sequence.

The multiplication module 414 is configured to multiply each symbol in the positive-negative symbol sequence by a subcarrier envelope waveform corresponding to the symbol, to obtain modulated envelope waveforms of subcarriers.

The superimposition module 415 is configured to superimpose the modulated envelope waveforms of the subcarriers in the frequency domain, to obtain a frequency-domain complex modulated envelope waveform.

The transformation module 416 is configured to transform the frequency-domain complex modulated envelope waveform into a time-domain complex modulated envelope waveform. In a specific embodiment, the transformation module 416 may use Inverse Fourier Transform to transform the frequency-domain complex modulated envelope waveform into the time-domain complex modulated envelope waveform.

The foregoing complex modulated envelope waveform generated through modulation carries the output signal sequence corresponding to the positive-negative symbol sequence obtained through conversion. The output signal sequence is formed by output signals of various spectrum intervals. The output signals of the spectrum intervals are results obtained after operation values of modulated envelope waveforms in each spectrum interval are superimposed. When a modulated envelope waveform is obtained after a positive symbol is multiplied by a subcarrier envelope waveform, an operation value of the modulated envelope waveform is +1. When a modulated envelope waveform is obtained after a negative symbol is multiplied by a subcarrier envelope waveform, an operation value of the modulated envelope waveform is −1.

Still referring to FIG. 4A, the following further describes the overlapped time division multiplexing modulation apparatus 301 with reference to an overlapped time division multiplexing modulation method. The overlapped time division multiplexing modulation method includes the following steps:

(1) The waveform generation module 401 generates, based on design parameters, an initial envelope waveform h(t) that is smooth in a time domain.

During generation of the initial envelope waveform, a user may enter the design parameter, to implement flexible configuration in an actual system based on a system performance indicator.

In some embodiments, when side lobe attenuation of the initial envelope waveform has been determined, the design parameter includes a window length L of the initial envelope waveform, for example, when the initial envelope waveform is a Bartlett envelope waveform.

In some embodiments, the design parameter includes a window length L and side lobe attenuation r of the initial envelope waveform, for example, when the initial envelope waveform is a Chebyshev envelope waveform.

Certainly, when the initial envelope waveform is in another form, the design parameter may be determined based on characteristics of the corresponding initial envelope waveform.

(2) The shift module 402 shifts the initial envelope waveform in the time domain at a preset shift interval based on a quantity K of times of overlapped multiplexing, to obtain offset envelope waveforms h(t−i*ΔT) of transmit signals at various moments.

The shift interval is a time interval ΔT, and the time interval ΔT is: ΔT=L/K.

In addition, it further needs to be ensured that ΔT is not less than a reciprocal of a system sampling rate.

A value of i is related to an input symbol length N, and i is an integer from 0 to N−1. For example, when N=8, i is an integer from 0 to 7.

(3) The modulation module 405 converts an input digital signal sequence into a positive-negative symbol sequence.

Specifically, the modulation module 405 converts 0 and 1 in the input digital signal sequence into +A and −A respectively, to obtain the positive-negative symbol sequence, where a value of A is a non-zero arbitrary number. For example, when A is 1, an input {0, 1} bit sequence is converted into a {+1, −1} symbol sequence through BPSK (binary phase shift keying) modulation.

(4) The multiplication module 403 multiplies the positive-negative symbol sequence $x_i$ obtained after conversion by the offset envelope waveforms h(t−i*ΔT) of transmit signals at various moments, to obtain modulated envelope waveforms $x_i$h(t−i*ΔT) of the moments.

(5) The superimposition module 404 superimposes the modulated envelope waveforms $x_i$h(t−i*ΔT) of the moments in the time domain, to obtain a complex modulated envelope waveform carrying an output signal sequence, namely, a transmit signal.

The transmit signal may be represented as follows:

$$s(t) = \sum_i x_i h(t - i \times \Delta T)$$

The time-domain waveform of the initial envelope waveform is relatively smooth, frequency-domain bandwidth is relatively narrow, and a waveform obtained after superimposition is relatively smooth and is limited in relatively narrow bandwidth. Therefore, spectrum utilization and a transmission rate of the system are improved, and a bit error rate of the system is reduced.

Figure 5A:
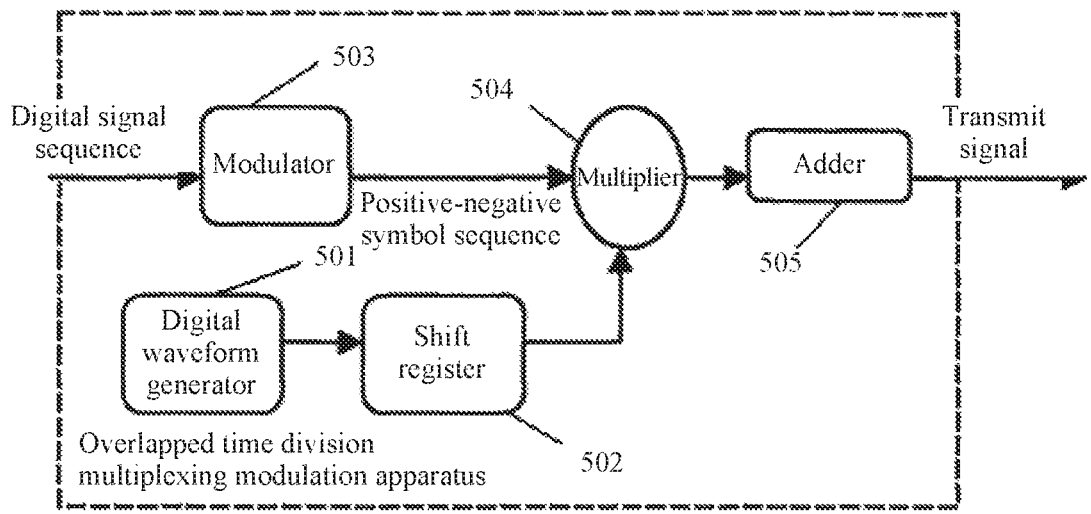
FIG. 5A is a schematic diagram of a hardware structure of an overlapped time division multiplexing modulation apparatus according to an embodiment of the disclosure.

Referring to FIG. 5A, specifically, the overlapped time division multiplexing modulation apparatus 301 may be implemented by using the following hardware units. The overlapped time division multiplexing modulation apparatus 301 includes a digital waveform generator 501, a shift register 502, a modulator 503, a multiplier 504, and an adder 505.

First, the digital waveform generator 501 forms a first in-phase waveform of an initial envelope waveform in a digital manner, where the initial envelope waveform is smooth in a time domain. Then, the shift register 502 shifts the first in-phase waveform of the initial envelope waveform that is generated by the digital waveform generator 501, to generate offset envelope waveforms of transmit signals at various moments. Next, the modulator 503 converts an input digital signal sequence into a positive-negative symbol sequence, and the multiplier 504 multiplies the positive-negative symbol sequence obtained after conversion by the offset envelope waveforms of transmit signals at various moments that are obtained after shifting, to obtain modulated envelope waveforms of the moments. Finally, the adder 505 superimposes the modulated envelope waveforms of the moments in the time domain, to obtain a complex modulated envelope waveform carrying an output signal sequence and form a transmit signal.

Figure 5B:
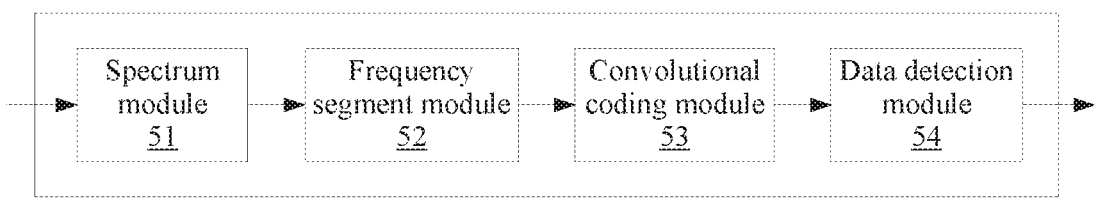
FIG. 5B is a schematic diagram of a hardware structure of an overlapped frequency division multiplexing modulation apparatus according to an embodiment of the disclosure.

For the demodulation apparatus of the overlapped frequency division multiplexing system, a structure of the apparatus is shown in FIG. 5B. The overlapped frequency division multiplexing demodulation apparatus includes a spectrum module 51, a frequency segment module 52, a convolutional coding module 53, and a data detection module 54.

The spectrum module 51 is configured to transform the foregoing time-domain received symbol sequence, to form a received signal spectrum. In a specific embodiment, the spectrum module 51 uses Fourier Transform to transform the foregoing time-domain received symbol sequence into the received signal spectrum.

The frequency segment module 52 is configured to segment the received signal spectrum in a frequency domain based on a subcarrier spectrum interval ΔB, to obtain received signal segment spectrums.

The convolutional coding module 53 is configured to perform convolutional coding on a received signal segment spectrum in each subcarrier spectrum interval ΔB, to obtain an one-to-one correspondence between the received signal spectrum and a positive-negative symbol sequence in the transmitter that is obtained through conversion of an input digital signal sequence.

The data detection module 54 is configured to detect the positive-negative symbol sequence based on the one-to-one correspondence.

Figure 6:
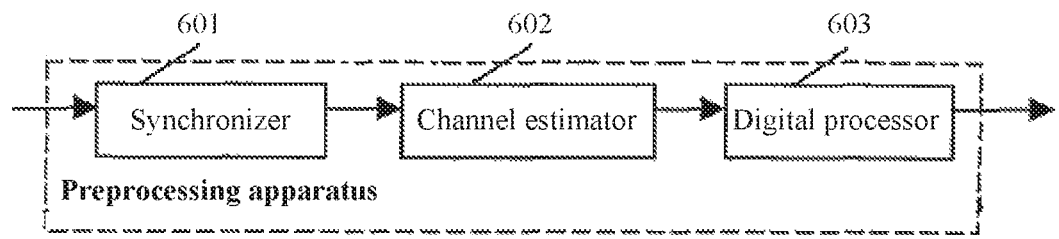
FIG. 6 is a schematic structural diagram of a preprocessing apparatus of a receiver according to an embodiment of the disclosure.

Referring to FIG. 6, FIG. 6 is a block diagram of the preprocessing apparatus of the receiver A02 in the overlapped time division multiplexing system according to an embodiment of the disclosure.

The preprocessing apparatus includes a synchronizer 501, a channel estimator 502, and a digital processor 503. The synchronizer 501 implements symbol time synchronization of received signals in the receiver. Next, the channel estimator 502 estimates a channel parameter. The digital processor 503 performs digital processing on received signals in each frame, to form a digital signal sequence suitable for the sequence detection apparatus to perform sequence detection and receive.

Figure 7:
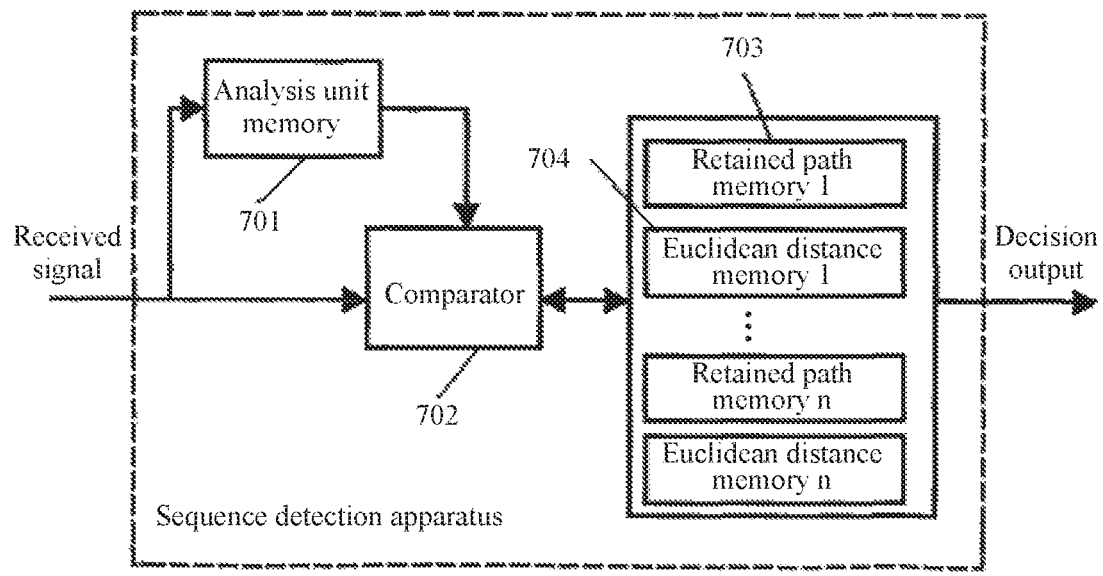
FIG. 7 is a schematic structural diagram of a sequence detection apparatus of a receiver according to an embodiment of the disclosure.

Referring to FIG. 7, FIG. 7 is a block diagram of the sequence detection apparatus 202 of the receiver A02 in the overlapped time division multiplexing system according to the disclosure.

The sequence detection apparatus includes an analysis unit memory 701, a comparator 702, and a plurality of retained path memories 703 and Euclidean distance memories 704 or weighted Euclidean distance memories (not shown in the figure). In a detection procedure, the analysis unit memory 701 makes a complex convolutional coding model and a trellis diagram of the overlapped time division multiplexing system, and lists and stores all states of the overlapped time division multiplexing system; the comparator 702 finds, based on the trellis diagram in the analysis unit memory 701, a path with a minimum Euclidean distance or a weighted minimum Euclidean distance to a received digital signal; and the retained path memory 703 and the Euclidean distance memory 704 or the weighted Euclidean distance memory are respectively configured to store a retained path and an Euclidean distance or a weighted Euclidean distance that are output by the comparator 702. One retained path memory 703 and one Euclidean distance memory 704 or weighted Euclidean distance memory need to be prepared for each stable state. Preferably, a length of the retained path memory 703 may be 4K-5K. Preferably, the Euclidean distance memory 704 or the weighted Euclidean distance memory stores only a relative distance.

The initial envelope waveform used in the overlapped time division/frequency division multiplexing modulation method, apparatus, and system may include a multiplexing waveform such as a Chebyshev, Gaussian, Hamming, Hanning, Blackman, Blackman-Harris, Bartlett, Bartlett-Hanning, Bohman, flat top, Nuttall, Parzen, Taylor, Tukey, Kaiser, or a triangular waveform, or an evolved waveform based on the multiplexing waveform.

Embodiment 1

In this embodiment, OvTDM signal transmission and receiving procedures are described by using an example in which an initial envelope waveform is a Chebyshev envelope waveform, times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

Referring to FIG. 5, a signal generation procedure includes the following steps:

(1) First, generate a Chebyshev envelope waveform h(t) of a transmit signal based on design parameters.

Figure 8:
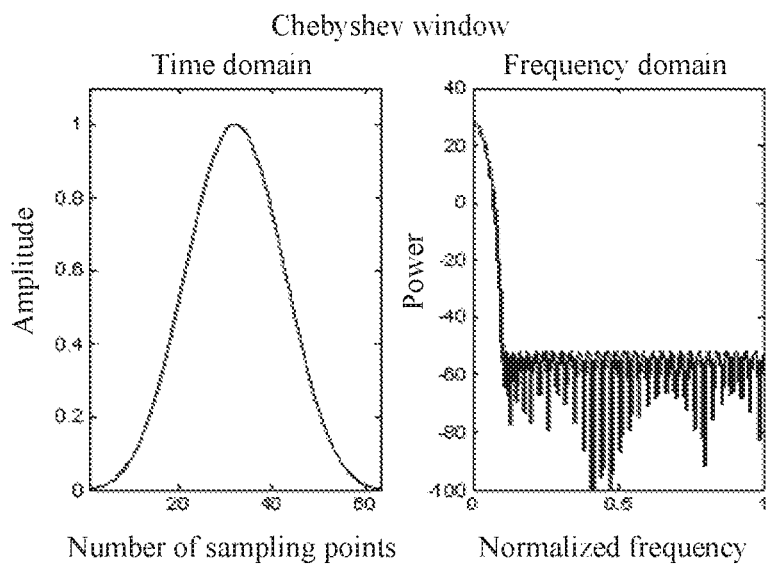
FIG. 8 is a diagram of a time-domain waveform and a frequency-domain waveform of a Chebyshev envelope waveform according to an embodiment of the disclosure.

In this embodiment, in the design parameter, a window length L=63, and a side lobe attenuation r=80 dB. A time-domain waveform and a frequency-domain waveform thereof are shown in FIG. 8. It can be learned from FIG. 8 that a Chebyshev window in the time-domain waveform starts from approximately 0, and a frequency-domain side lobe attenuation is 80 dB.

Figure 9:
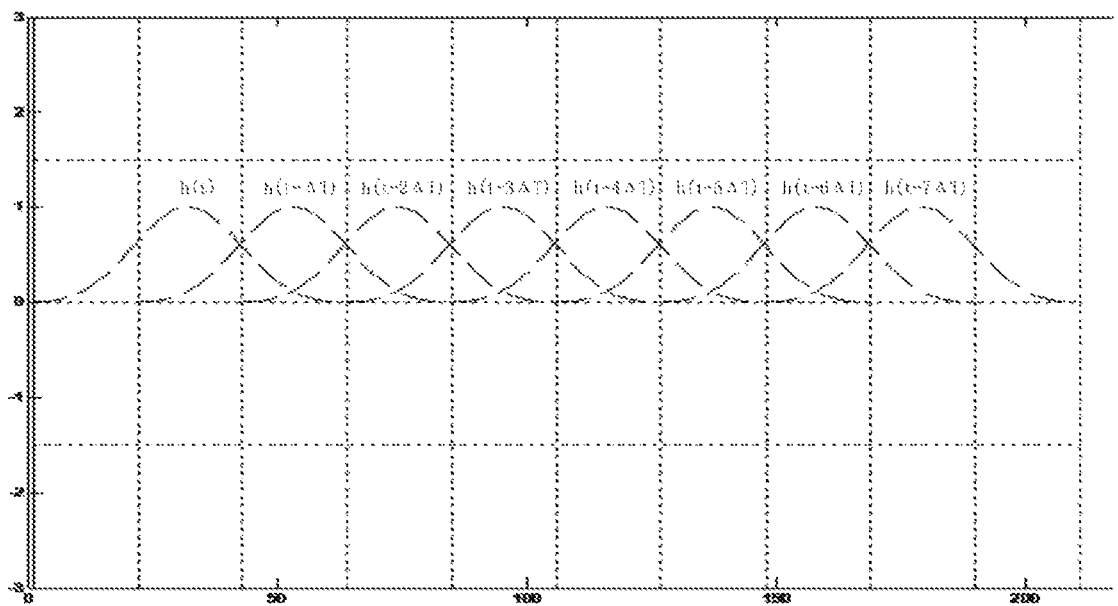
FIG. 9 is a diagram of envelope waveforms of various moments obtained after a Chebyshev window is shifted according to an embodiment of the disclosure.

(2) Shift the Chebyshev envelope waveform h(t) designed in (1) in the time domain at a preset shift interval, where the shift interval is a time interval ΔT (ΔT=L/K=21). After shifting, offset envelope waveforms h(t-i*ΔT) of transmit signals at various moments are formed (because N=8, i is an integer from 0 to 7). The offset envelope waveforms of transmit signals at various moments that are obtained after shifting are shown in FIG. 9.

(3) Convert an input digital signal sequence into a positive-negative symbol sequence.

Specifically, 0 and 1 in the input digital signal sequence may be converted into +A and -A respectively, to obtain the positive-negative symbol sequence, where a value of A is a non-zero arbitrary number. For example, when A is 1, an input {0, 1} bit sequence is converted into a {+1, -1} symbol sequence through BPSK modulation.

Figures 10, 11:
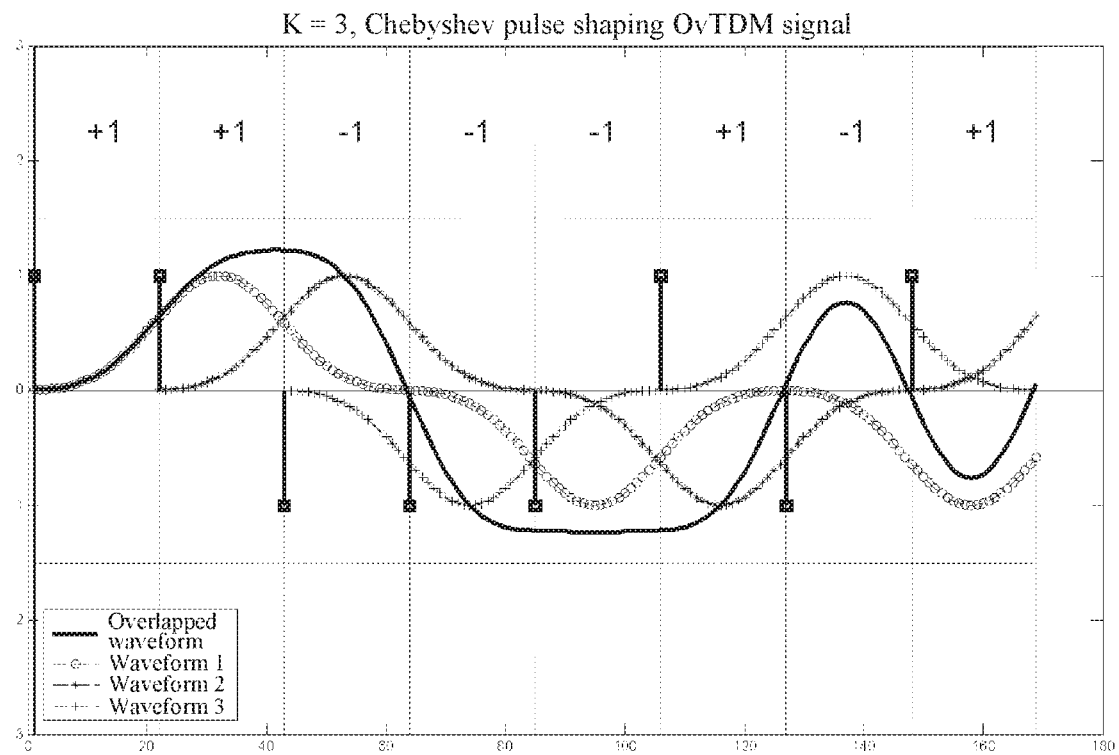
FIG. 10 is a schematic diagram of superimposition of to-be-sent waveforms when a Chebyshev envelope waveform is used according to an embodiment of the disclosure.
FIG. 11 is a schematic principle diagram of multiplexing of K waveforms.

(4) Multiply the positive-negative symbol sequence $x_i$ (in this embodiment, $x_i=\{+1\ +1\ -1\ -1\ -1\ +1\ -1\ +1\}$) by the offset envelope waveforms h(t-i*ΔT) of transmit signals at various moments that are generated in (2), to obtain modulated envelope waveforms $x_i$h(t-i*ΔT) of the moments. Formed waveforms are shown in FIG. 10, where three different dashed lines represent three waveforms obtained after multiplication.

(5) Superimpose the modulated envelope waveforms $x_i$h(t-i*ΔT) of the moments that are formed in (4) in the time domain, to obtain a complex modulated envelope waveform carrying an output signal sequence, namely, a transmit signal. A waveform of the transmit signal is shown by a solid-line waveform in FIG. 10.

The transmit signal may be represented as follows:

$$s(t) = \sum_i x_i h(t - i \times \Delta T)$$

Specifically, the output signal sequence is determined in the following manner:

when a modulated envelope waveform is obtained after a positive symbol is multiplied by an envelope waveform at the moment, determining an operation value of the modulated envelope waveform as +A; or when a modulated envelope waveform is obtained after a negative symbol is multiplied by an envelope waveform at the moment, determining an operation value of the modulated envelope waveform as -A; and for each shift interval, superimposing operation values of modulated envelope waveforms in the shift interval, to obtain output signals of the shift interval and form the output signal sequence.

Therefore, in this embodiment, when the value of A is 1, output signals (the output signal sequence) obtained after superimposition are: s(t)={+1 +2 +1 -1 -3 -1 -1 +1}.

Referring to FIG. 11, FIG. 11 is a schematic principle diagram of multiplexing of K waveforms. The diagram is in a shape of a parallelogram. Each row represents a to-be-sent signal waveform $x_i$h(t-i*ΔT) obtained after a to-be-sent symbol $x_i$ is multiplied by an envelope waveform h(t-i*ΔT) of a corresponding moment. $a_0$ to $a_{k-1}$ represent a coefficient value of each part obtained after each window function waveform (an envelope waveform) is segmented for K times, and are specifically a coefficient related to an amplitude.

When the input digital signal sequence is converted into the positive-negative symbol sequence, 0 and 1 in the input digital signal sequence are converted into ±A, to obtain the positive-negative symbol sequence, where the value of A is a non-zero arbitrary number. For example, when the value of A is 1, the input {0, 1} bit sequence is converted into the {+1, -1} symbol sequence through BPSK modulation, to obtain the positive-negative symbol sequence. Therefore, FIG. 12 is a schematic principle diagram of a symbol superimposition procedure of K waveforms. In the superimposition procedure in FIG. 12, left three numbers in a first row represent a first input symbol +1, left three numbers in a second row represent a second input symbol +1, left three numbers in a third row represent a third input symbol -1, middle three numbers in the first row represent a fourth input symbol -1, middle three numbers in the second row represent a fifth input symbol -1, middle three numbers in the third row represent a sixth input symbol +1, right three numbers in the first row represent a seventh input symbol −1, and right three numbers in the second row represent an eighth input symbol +1. Therefore, after three waveforms are superimposed, obtained output symbols are {+1 +2 +1 −1 −3 −1 −1 +1}.

Certainly, if the input symbol length is another value, superimposition may be performed based on the manners shown in FIG. 11 and FIG. 12, to obtain output symbols.

The Chebyshev envelope waveform starts from 0 (0.0028, approximately 0) in the time domain and has a smooth waveform. Therefore, a waveform obtained after superimposition is relatively smooth, and frequency-domain bandwidth is relatively narrow. As a result, spectrum efficiency of the waveform obtained after superimposition is relatively high, and transmit power required for transmitting a signal is relatively low. In addition, because side lobe attenuation of the Chebyshev envelope waveform may be designed freely, flexible configuration can be performed in an actual system based on a system performance indicator.

Referring to FIG. 6 and FIG. 7, a signal receiving procedure includes the following steps:

(1) First, synchronize received signals, including carrier synchronization, frame synchronization, symbol time synchronization, and the like.

(2) Perform digital processing on received signals in each frame based on a sampling theorem.

(3) Cut a received waveform based on a waveform transmit time interval.

(4) Perform data sequence detection on the received signals in a time domain, to perform decision output, that is, decode the waveform obtained after cutting based on a decoding algorithm.

After the foregoing preprocessing steps (1) and (2), a received symbol sequence obtained after the waveform cutting is: s(t)={+1 +2 +1 −1 −3 −1 −1 +1}. The symbols in the symbol sequence are compared based on the input-output relationship tree diagram in FIG. 13 and the node state transition relationship diagram in FIG. 14, to obtain a node transition path.

Figure 13:
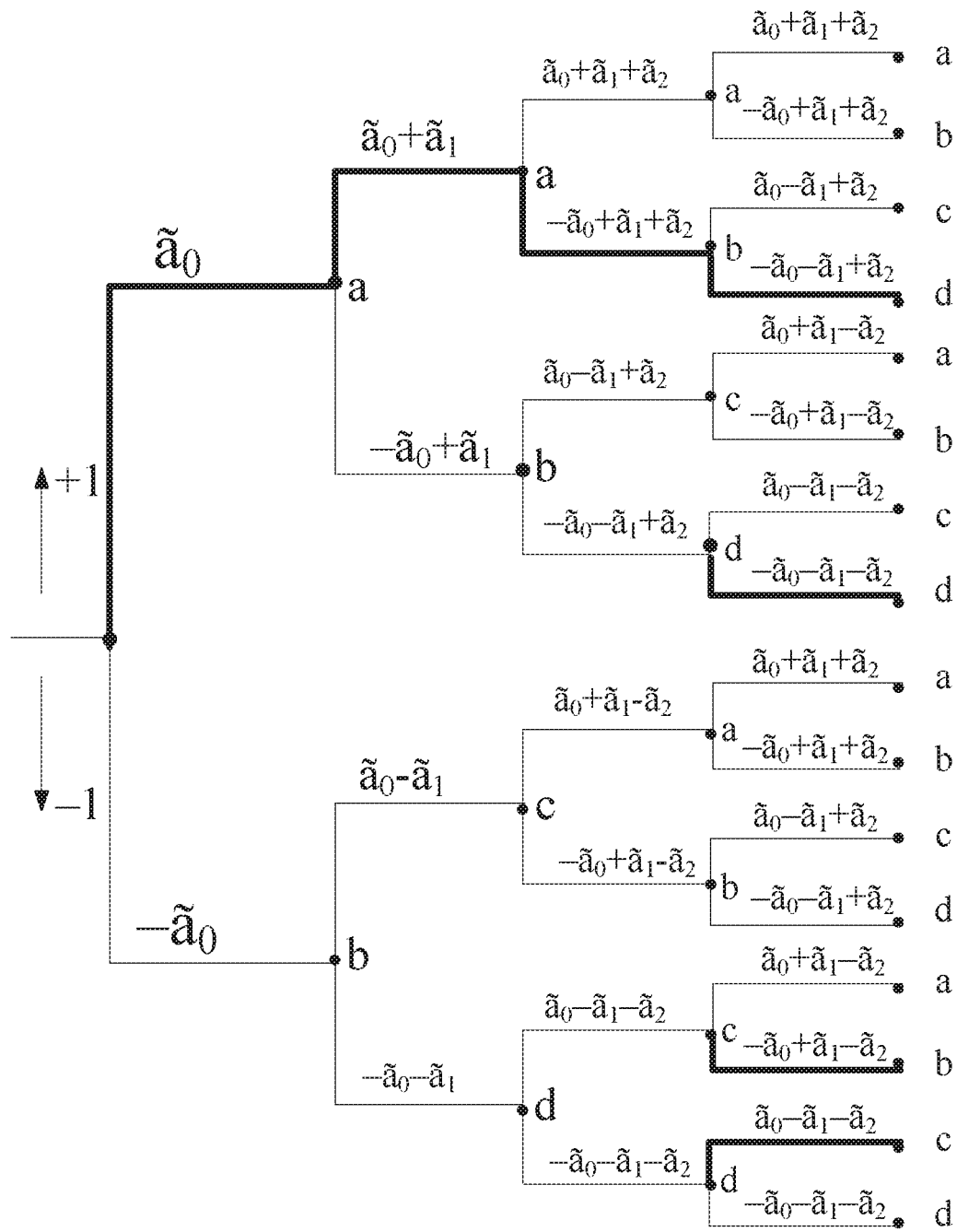
FIG. 13 is an input-output relationship tree diagram of an overlapped time division multiplexing system when K=3.
Figure 14:
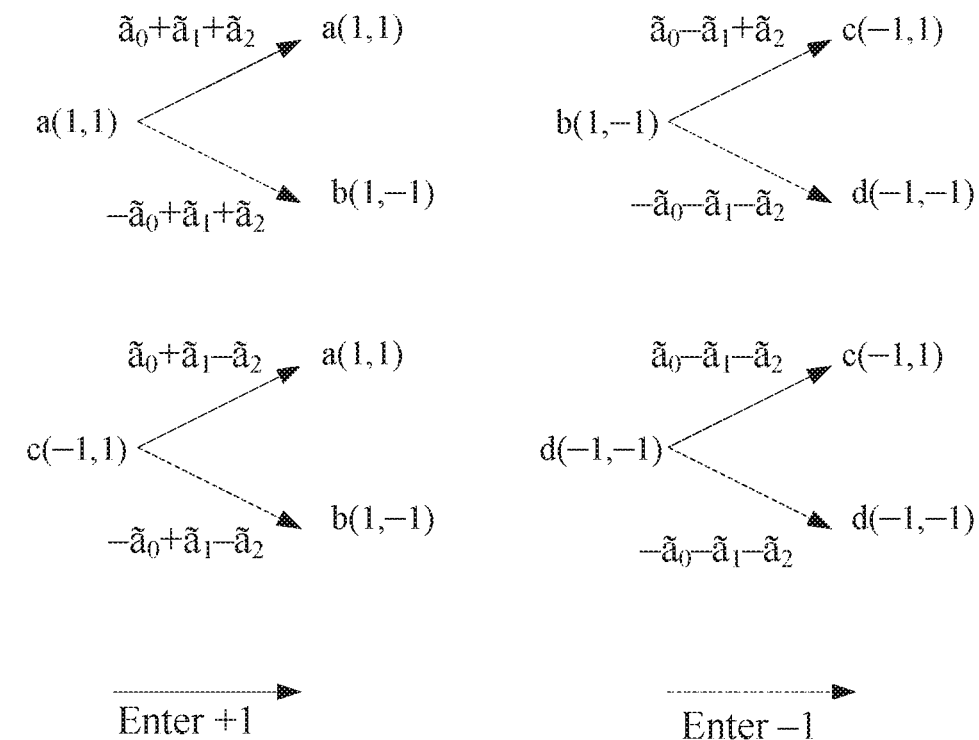
FIG. 14 is a node state transition relationship diagram.

In FIG. 13, an upward branch is +1 input, and a downward branch is −1 input. After a third branch, the tree diagram becomes duplicate, because branches radiated from a node marked as a have same output. This conclusion is also applicable to nodes b, c, and d. Several possibilities of the nodes are shown in FIG. 14. It can be learned from FIG. 14 that transition can be made from the node a only to the node a (by entering +1) and the node b (by entering −1), from b only to c (by entering +1) and d (by entering −1), from c only to a (by entering +1) and b (by entering −1), and from d only to c (by entering +1) and d (by entering −1). A reason of this phenomenon is quite simple: Only adjacent K (specifically, 3 in this example) symbols have mutual interference. Therefore, when $K^{th}$ data enters a channel, earliest first data has moved out of a rightmost shift unit. Therefore, in addition to data input at a current moment, channel output further depends on input of first $(K-1)^{th}$ data.

Node state transition in this case is shown by a black bold line in FIG. 13. Because a first symbol of s(t) is +1, the node transition path is: +1->a->a->b->d->d->c->b->c. Based on the transition relationship, an input symbol sequence is obtained: {+1 +1 −1 −1 −1 +1 −1 +1}.

In this embodiment, the Chebyshev envelope waveform is relatively smooth in the time domain, and side lobe attenuation is relatively fast. Therefore, required transmit power is relatively low, waveform cutting precision is higher, and the received symbol sequence is more accurate.

Figure 15:
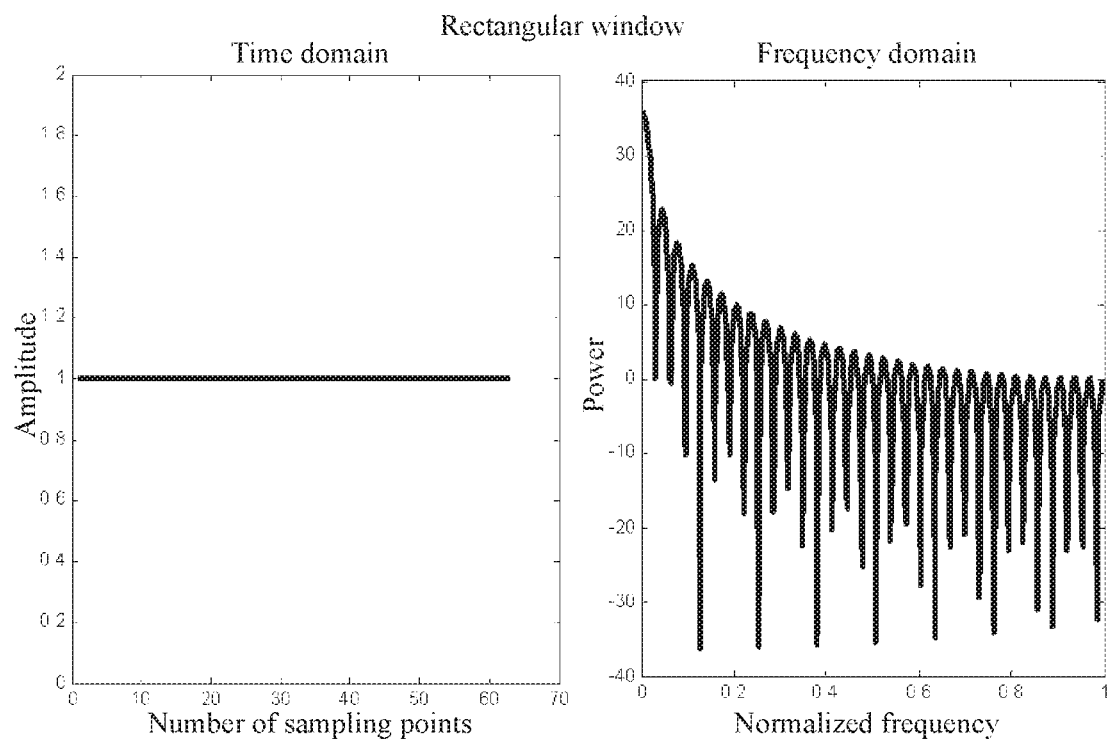
FIG. 15 is a diagram of time-domain and frequency-domain waveforms of a rectangular wave.

Referring to FIG. 15, FIG. 15 is a diagram of time-domain and frequency-domain waveforms of a rectangular wave. When a rectangular wave envelope waveform is selected as an initial envelope waveform, signals generated based on the foregoing signal generation procedure and a waveform obtained after superimposition are shown in FIG. 16, where three different dashed lines represent three waveforms, and a solid line represents the waveform obtained after superimposition.

Figure 16:
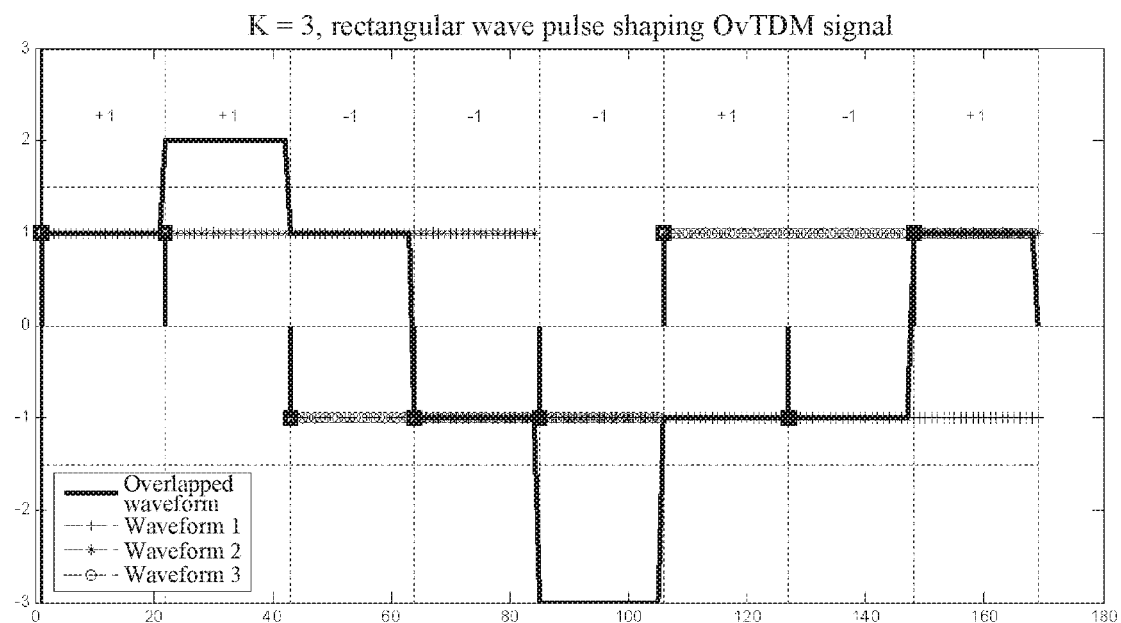
FIG. 16 is a diagram of signals generated when a rectangular wave envelope waveform is selected as an envelope waveform and a waveform obtained after superimposition.

It can be learned from FIG. 16 that a rectangular wave starts from 1 in the time domain and has relatively wide bandwidth, and has slow side lobe attenuation in a frequency domain. Therefore, after superimposition, a time-domain waveform is not smooth, frequency-domain bandwidth is relatively wide, and it is difficult to distinguish between valid signals and invalid signals. Consequently, transmit power required in the signal transmission and receiving procedures increases, and waveform cutting accuracy and an encoding/decoding capability are reduced in the signal receiving procedure. In an actual system, when a transmission rate and spectrum efficiency are the same, both required transmit power and a bit error rate are high if a rectangular wave is used.

However, the Chebyshev window used in this embodiment starts from 0 (0.0028, approximately 0) in the time domain, the side lobe attenuation is relatively fast, the waveform obtained after signal superimposition is smooth, and the frequency-domain bandwidth is relatively narrow. This improves accuracy of a waveform cutting procedure and an error correction capability of an encoding/decoding procedure, and reduces signal transmit power. Therefore, when spectrum efficiency is kept unchanged, a relatively high transmission rate can be achieved with relatively low transmit power. In addition, because side lobe attenuation of the Chebyshev window may be designed freely, flexible configuration can be performed in an actual system based on a system performance indicator.

In addition, in another embodiment, various envelope waveforms of functions evolved from the Chebyshev window function may be selected as the initial envelope waveform, including envelope waveforms of functions such as continuous multiplication, various-order derivatives, and a sum of various-order derivatives of Chebyshev pulse shaping. These envelope waveforms are also smooth in the time domain. Therefore, when these envelope waveforms are used, an effect similar to that achieved when the Chebyshev envelope waveform is used can be achieved.

This embodiment may also be applied to an overlapped frequency division multiplexing system. An only difference lies in: A Chebyshev envelope waveform is a frequency-domain function waveform. That is, as shown in FIG. 8, a diagram on the left shows frequency-domain sampling, and a diagram on the right shows a time-domain normalization function. Other modulation and demodulation method steps are similar, and details are not described herein again.

Embodiment 2

In this embodiment, OvTDM signal transmission and receiving procedures are described by using an example in which an initial envelope waveform is a Blackman first-order derivative or Blackman-Harris first-order derivative multiplexing waveform, times of overlapped multiplexing K=3, an input symbol length N=8, and an input symbol $x_i$={+1 +1 −1 −1 −1 +1 −1 +1}.

Still referring to FIG. 5, a signal generation procedure includes the following steps:

(1) First, generate, based on design parameters, an envelope waveform h(t) of a transmit signal, that is corresponding to a Blackman first-order derivative or Blackman-Harris first-order derivative.

Figure 17:
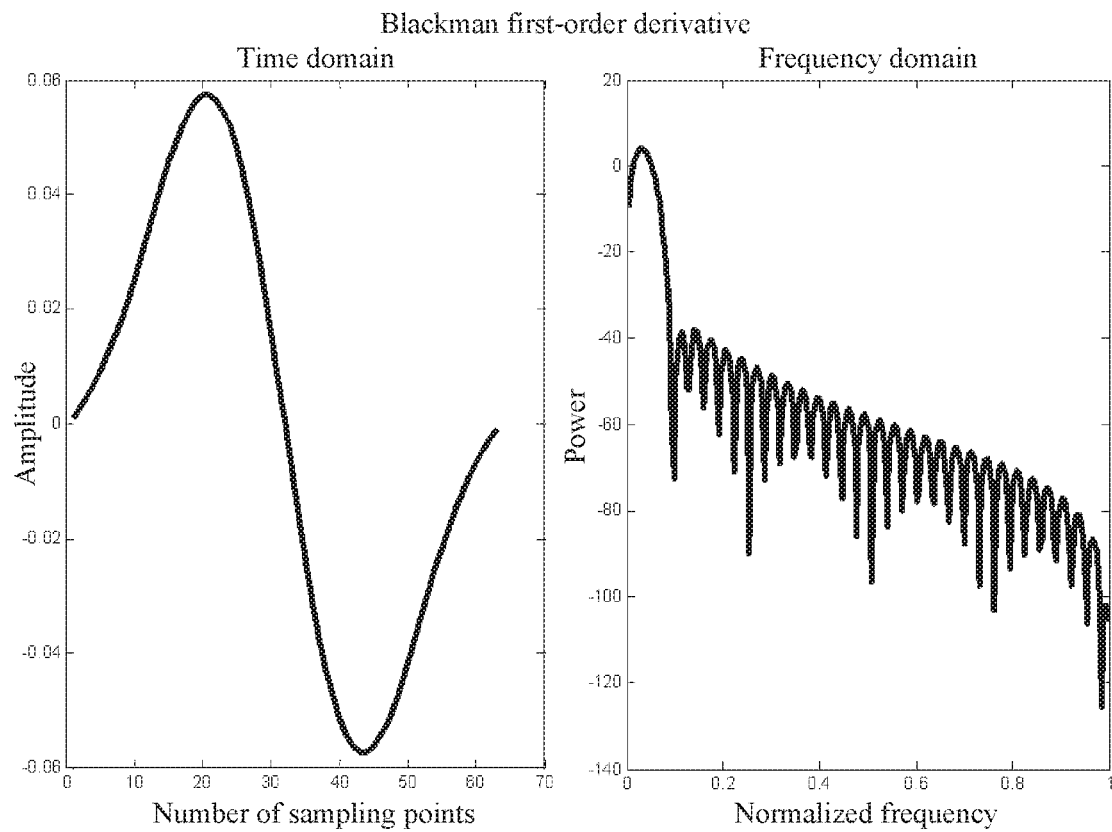
FIG. 17 is a diagram of a time-domain waveform and a frequency-domain waveform of a Blackman first-order derivative envelope waveform according to an embodiment of the disclosure.
Figure 18:
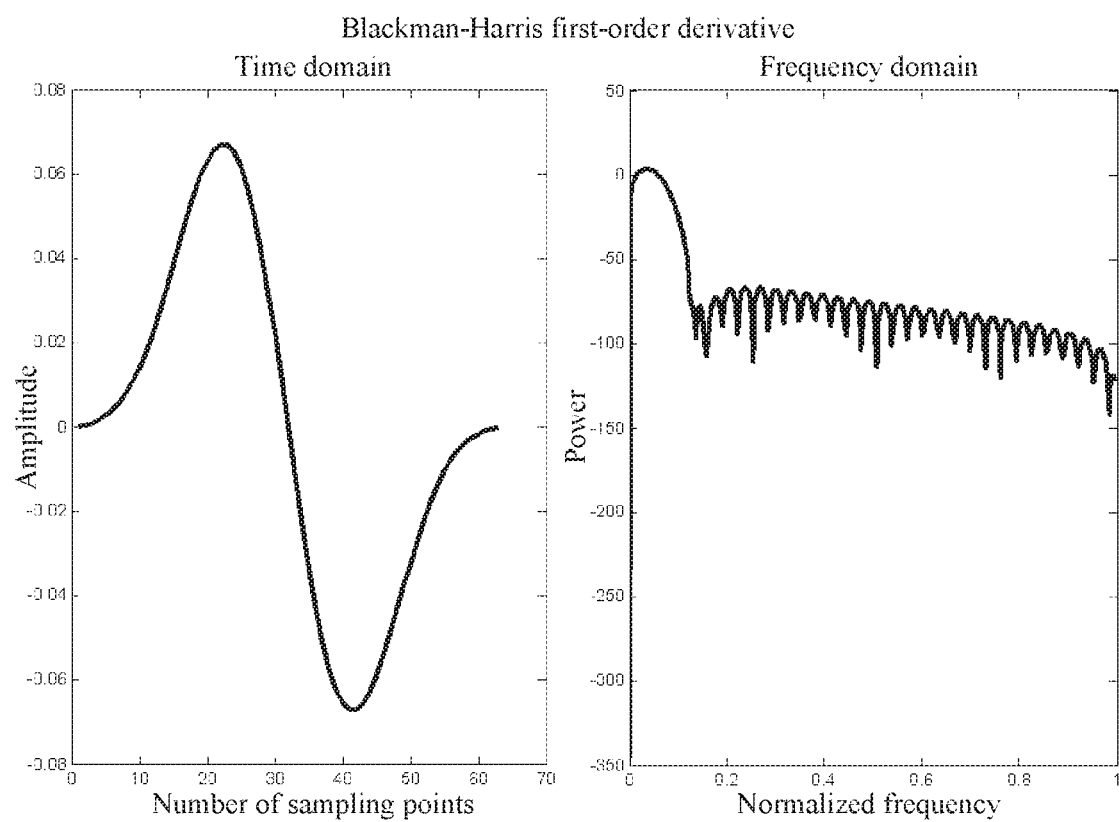
FIG. 18 is a diagram of a time-domain waveform and a frequency-domain waveform of a Blackman-Harris first-order derivative envelope waveform according to an embodiment of the disclosure.

In this embodiment, in the design parameter, a window length L=63, and a corresponding time-domain waveform and frequency-domain waveform are respectively shown in FIG. 17 and FIG. 18.

It can be learned from FIG. 17 that the envelope waveform of the Blackman first-order derivative starts from approximately 0 in a time domain, an amplitude becomes negative in a second half part, the waveform approaches a sine wave, and a frequency-domain side lobe attenuation is about 40 dB.

It can be learned from FIG. 18 that the envelope waveform of the Blackman-Harris first-order derivative starts from approximately 0 in the time domain, an amplitude becomes negative in a second half part, the waveform approaches a sine wave, and a frequency-domain side lobe attenuation is about 100 dB.

Specifically, a Blackman window function may be represented by using the following formula:

ω(n)=0.42−0.5 cos(2πn/(N−1))+0.08 cos(4πn/(N−1)).

N is a window length, 0≤n≤M−1, and when N is an even number, M=N/2, or when N is an odd number, M=(N+1)/2.

It should be noted that in the foregoing formula, when 0≤n≤M−1, an obtained waveform is a first half of the Blackman window. A waveform of a second half of the Blackman window (that is, when M≤n≤N−1) is axisymmetric to the waveform of the first half part along a straight line n=M. That is, the waveform of the second half part can be obtained by horizontally turning over the waveform of the first half part along the straight line n=M.

Specifically, a Blackman-Harris window function (a symmetric function) may be represented by using the following formula:

(n)=a0−a1 cos(2πn/(N−1))+a2 cos(4πn/(N−1))+a3 cos(6πn/(N−1)).

A Blackman-Harris window function (a periodic function) may be represented by using the following formula:

ω(n)=a0−a1 cos 2πn/N+a2 cos 4πn/N+a3 cos 6πn/N.

N is a window length, 0≤n≤N−1, a0=0.35875, a1=0.48829, a2=0.14128, and a3=0.01168. It should be noted that n in the foregoing formula merely represents a function variable in the formula.

(2) Shift the Blackman first-order derivative or Blackman-Harris first-order derivative envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7).

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when the value of A is 1, an input {0, 1} bit sequence is converted into a {+1, −1} symbol sequence through BPSK modulation.

Figure 19:
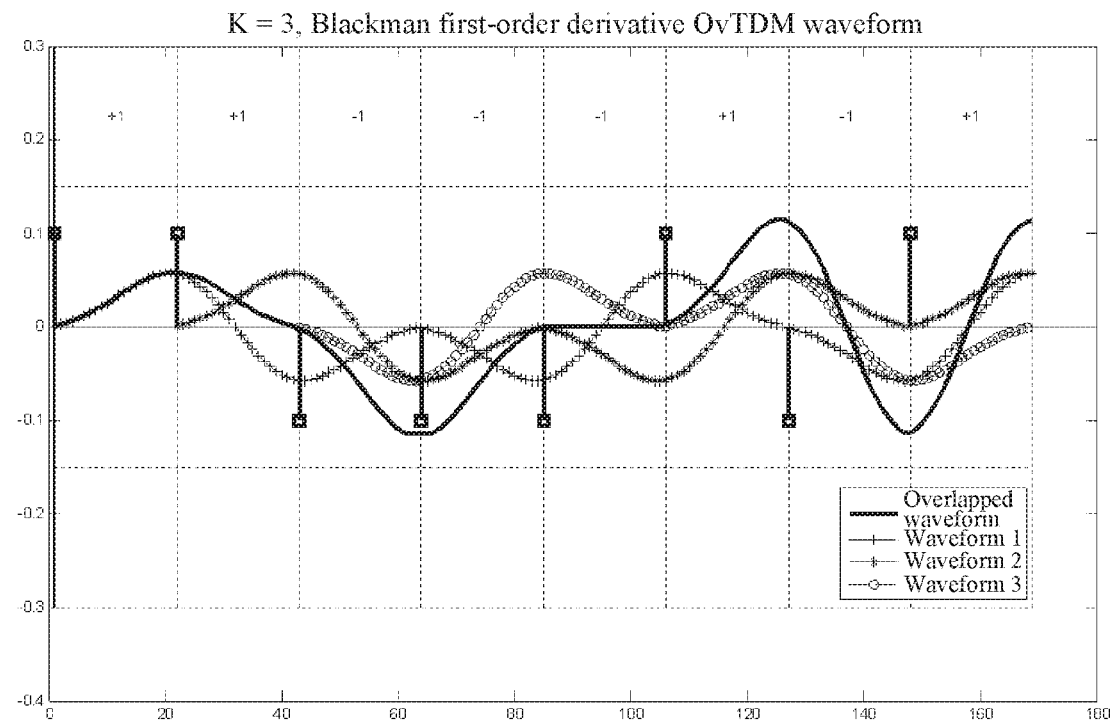
FIG. 19 is a schematic diagram of superimposition of to-be-sent waveforms when a Blackman first-order derivative envelope waveform is used according to an embodiment of the disclosure.
Figure 20:
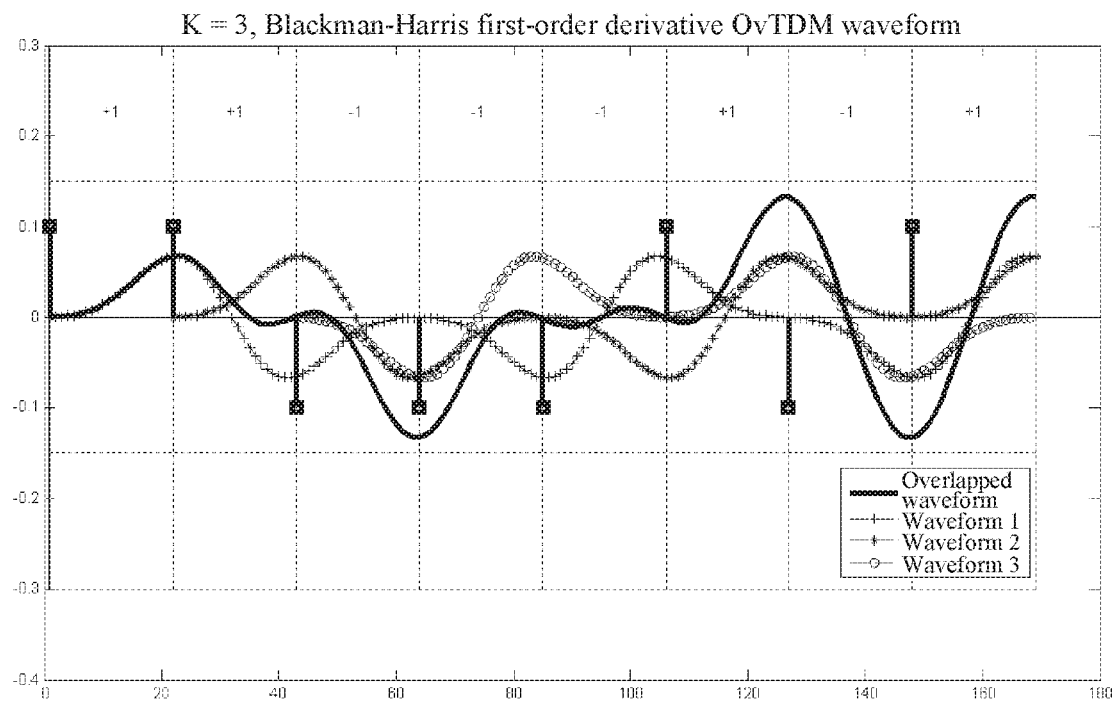
FIG. 20 is a schematic diagram of superimposition of to-be-sent waveforms when a Blackman-Harris first-order derivative envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 19 and FIG. 20, where three different dashed lines represent three waveforms obtained after multiplication.

(5) Superimpose the modulated envelope waveforms $x_i$h(t−i*ΔT) of the moments that are formed in (4) in the time domain, to obtain a complex modulated envelope waveform carrying an output signal sequence, namely, a transmit signal. Waveforms of the transmit signal are shown by solid-line waveforms in FIG. 19 and FIG. 20.

The transmit signal may be represented as follows:

$$s(t) = \sum_i x_i h(t - i \times \Delta T)$$

Specifically, the output signal sequence is determined in the following manner:

when a modulated envelope waveform is obtained after a positive symbol is multiplied by an envelope waveform at the moment, determining an operation value of the modulated envelope waveform as +A; or when a modulated envelope waveform is obtained after a negative symbol is multiplied by an envelope waveform at the moment, determining an operation value of the modulated envelope waveform as −A; and for each shift interval, superimposing operation values of modulated envelope waveforms in the shift interval, to obtain output signals of the shift interval and form the output signal sequence.

Therefore, in this embodiment, when the value of A is 1, output signals (the output signal sequence) obtained after superimposition are: s(t)={+1 +2 +1 −1 −3 −1 −1 +1}.

When the initial envelope waveform is the Blackman first-order derivative or Blackman-Harris first-order derivative multiplexing waveform, a principle of waveform multiplexing and a principle of a symbol superimposition procedure are the same as those in Embodiment 1. Refer to FIG. 11 and FIG. 12.

In this embodiment, a signal receiving procedure is the same as the signal receiving procedure in Embodiment 1 when the Chebyshev envelope waveform is used. Therefore, details are not described in this embodiment again.

In this embodiment, the Blackman first-order derivative and Blackman-Harris first-order derivative multiplexing waveforms are relatively smooth in the time domain, and side lobe attenuation is relatively fast. Therefore, required transmit power is relatively low, waveform cutting precision is higher, and the received symbol sequence is more accurate.

A characteristic of a rectangular wave is that main lobes are relatively centralized. A disadvantage is that a side lobe is relatively high and there are negative side lobes. Consequently, high-frequency interference and leakage are brought in transformation, and even a negative spectrum occurs, so that amplitude recognition precision is lowest. Characteristics of the Blackman first-order derivative and Blackman-Harris first-order derivative multiplexing waveforms are: A main lobe is wide, a side lobe is relatively low, amplitude recognition precision is highest, and selectivity is better.

In the OvTDM procedure using the Blackman first-order derivative or Blackman-Harris first-order derivative multiplexing waveform, in the signal transmission procedure, a time-domain waveform is smooth, frequency-domain bandwidth is relatively narrow, transmit power required for transmitting a signal is relatively low, and both spectrum utilization and a transmission rate are relatively high. In the signal receiving procedure, because a waveform is relatively smooth in the time domain, waveform cutting accuracy is higher, a system bit error rate is reduced, and system perform is greatly improved compared with that when the rectangular wave is used.

In addition, in another embodiment, a Blackman window prototype or various envelope waveforms of functions evolved from the Blackman window function may be selected as the initial envelope waveform, including envelope waveforms of functions such as continuous multiplication, various-order derivatives, and a sum of various-order derivatives of Blackman pulse shaping. When these envelope waveforms are used, an effect similar to that achieved when the Blackman first-order derivative waveform is used can be achieved.

Alternatively, a Blackman-Harris window prototype or various envelope waveforms of functions evolved from the Blackman-Harris window function may be selected as the initial envelope waveform, including envelope waveforms of functions such as continuous multiplication, various-order derivatives, and a sum of various-order derivatives of Blackman-Harris pulse shaping. These envelope waveforms are also smooth in the time domain. Therefore, when these envelope waveforms are used, an effect similar to that achieved when the Blackman-Harris first-order derivative waveform is used can be achieved.

This embodiment may also be applied to an overlapped frequency division multiplexing system. An only difference lies in: A Blackman envelope waveform is a frequency-domain function waveform. That is, as shown in FIG. 17 and FIG. 18, a diagram on the left shows frequency-domain sampling, and a diagram on the right shows a time-domain normalization function. Other modulation and demodulation method steps are similar, and details are not described herein again.

Embodiment 3

In this embodiment, modulation and demodulation are performed by using a Bartlett envelope waveform in an OvTDM system. In this embodiment, an initial envelope waveform is a Bartlett envelope waveform or an envelope waveform of an evolved window function of the Bartlett envelope waveform.

The following further describes this application assuming that an initial envelope waveform is a Bartlett envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Bartlett envelope waveform h(t) of a transmit signal based on design parameters.

Figure 21:
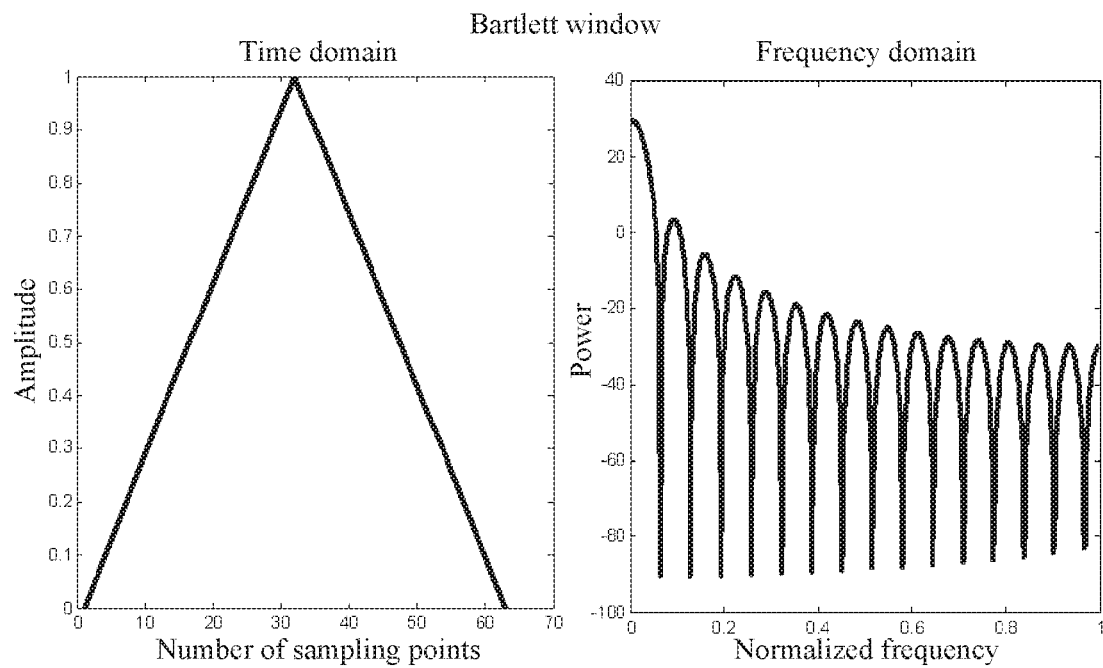
FIG. 21 is a diagram of a time-domain waveform and a frequency-domain waveform of a Bartlett envelope waveform according to an embodiment of the disclosure.

In this embodiment, in the design parameter, a window length L=63, and a time-domain waveform and a frequency-domain waveform thereof are shown in FIG. 21. It can be learned from FIG. 21 that a Bartlett window starts from 0 in a time domain, and a frequency-domain out-of-band attenuation is approximately 30 dB.

Specifically, a Bartlett window function may be represented by using the following formula:

$$w(n) = \begin{cases} \frac{2n}{N}, & 0 \le n \le \frac{N}{2} \\ 2 - \frac{2n}{N}, & \frac{N}{2} \le n \le N \end{cases}$$

A window length of the Bartlett window is: L=N+1. It should be noted that n in the foregoing formula merely represents a function variable in the formula.

Based on the foregoing embodiments, it can be learned that when this embodiment is applied to an OvFDM system, a Bartlett envelope waveform is a frequency-domain function waveform. That is, as shown in FIG. 21, a diagram on the left shows frequency-domain sampling, and a diagram on the right shows a time-domain normalization function. Other modulation and demodulation method steps are similar, and details are not described herein again.

Figure 22:
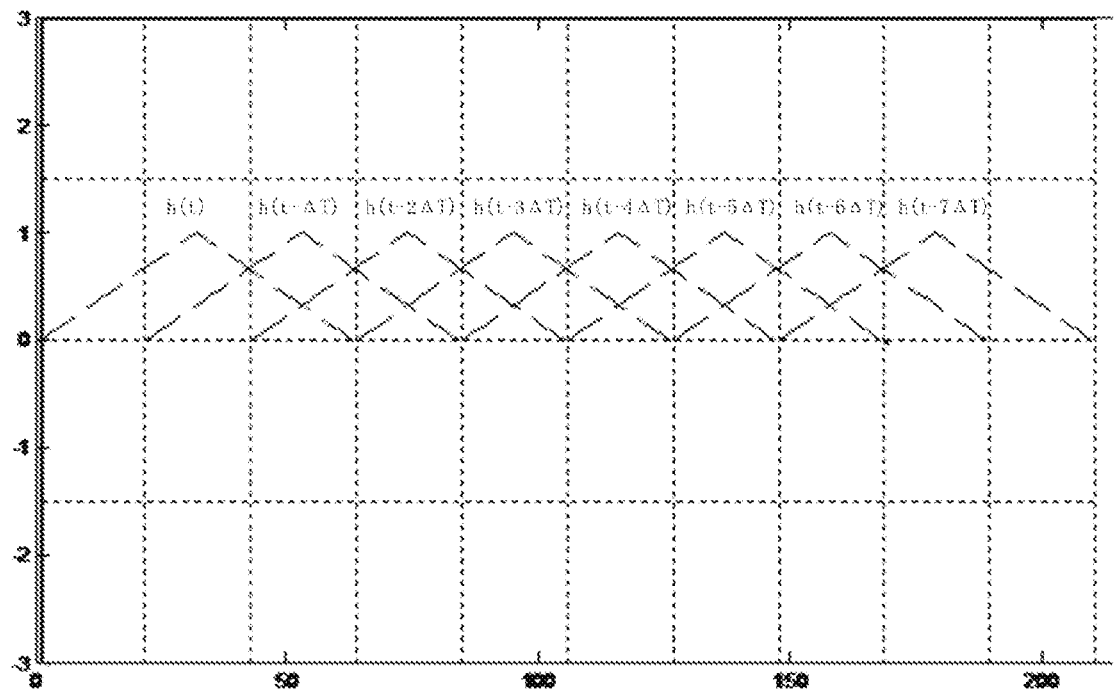
FIG. 22 is a diagram of envelope waveforms of various moments obtained after a Bartlett window is shifted according to an embodiment of the disclosure.

(2) Shift the Bartlett envelope waveform h(t) designed in (1) in the time domain at a preset shift interval, where the shift interval is a time interval $\Delta T$ ($\Delta T = L/K = 21$). After shifting, offset envelope waveforms $h(t - i*\Delta T)$ of transmit signals at various moments are formed (because N=8, i is an integer from 0 to 7). The offset envelope waveforms of transmit signals at various moments that are obtained after shifting are shown in FIG. 22.

(3) Convert an input digital signal sequence into a positive-negative symbol sequence.

Specifically, 0 and 1 in the input digital signal sequence may be converted into +1 and −1 respectively, to obtain the positive-negative symbol sequence. For example, an input {0, 1} bit sequence is converted into a {+1, −1} symbol sequence through BPSK modulation.

Figure 23:
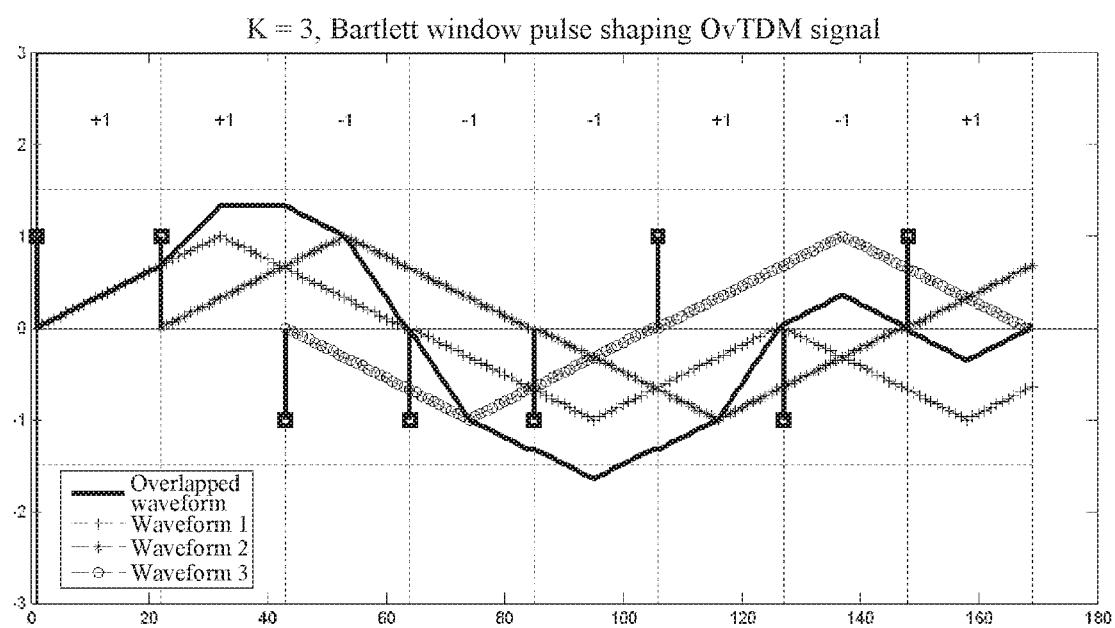
FIG. 23 is a schematic diagram of superimposition of to-be-sent waveforms when a Bartlett envelope waveform is used according to an embodiment of the disclosure.

(4) Multiply the positive-negative symbol sequence $x_i$ (in this embodiment, $x_i = \{+1\ +1\ -1\ -1\ -1\ +1\ -1\ +1\}$) by the offset envelope waveforms $h(t - i*\Delta T)$ of transmit signals at various moments that are generated in (2), to obtain modulated envelope waveforms $x_i h(t - i*\Delta T)$ of the moments. Formed waveforms are shown in FIG. 23, where three different dashed lines represent three waveforms obtained after multiplication.

(5) Superimpose the modulated envelope waveforms $x_i h(t - i*\Delta T)$ of the moments that are formed in (4) in the time domain, to obtain a complex modulated envelope waveform carrying an output signal sequence, namely, a transmit signal. A waveform of the transmit signal is shown by a solid-line waveform in FIG. 23.

A signal receiving method is similar to the method in the foregoing embodiments, and details are not described herein again.

Embodiment 4

The following further describes this application assuming that an initial envelope waveform is a Gaussian envelope waveform. OvTDM signal transmission and receiving procedures are described by using an example in which times of overlapped multiplexing K=3, an input symbol length N=8, and an input symbol $x_i = \{+1\ +1\ -1\ -1\ -1\ +1\ -1\ +1\}$. The input symbol length is a length for transmitting a frame of signal.

A signal generation procedure includes the following steps:

(1) First, generate a Gaussian envelope waveform h(t) of a transmit signal based on design parameters.

Figure 24:
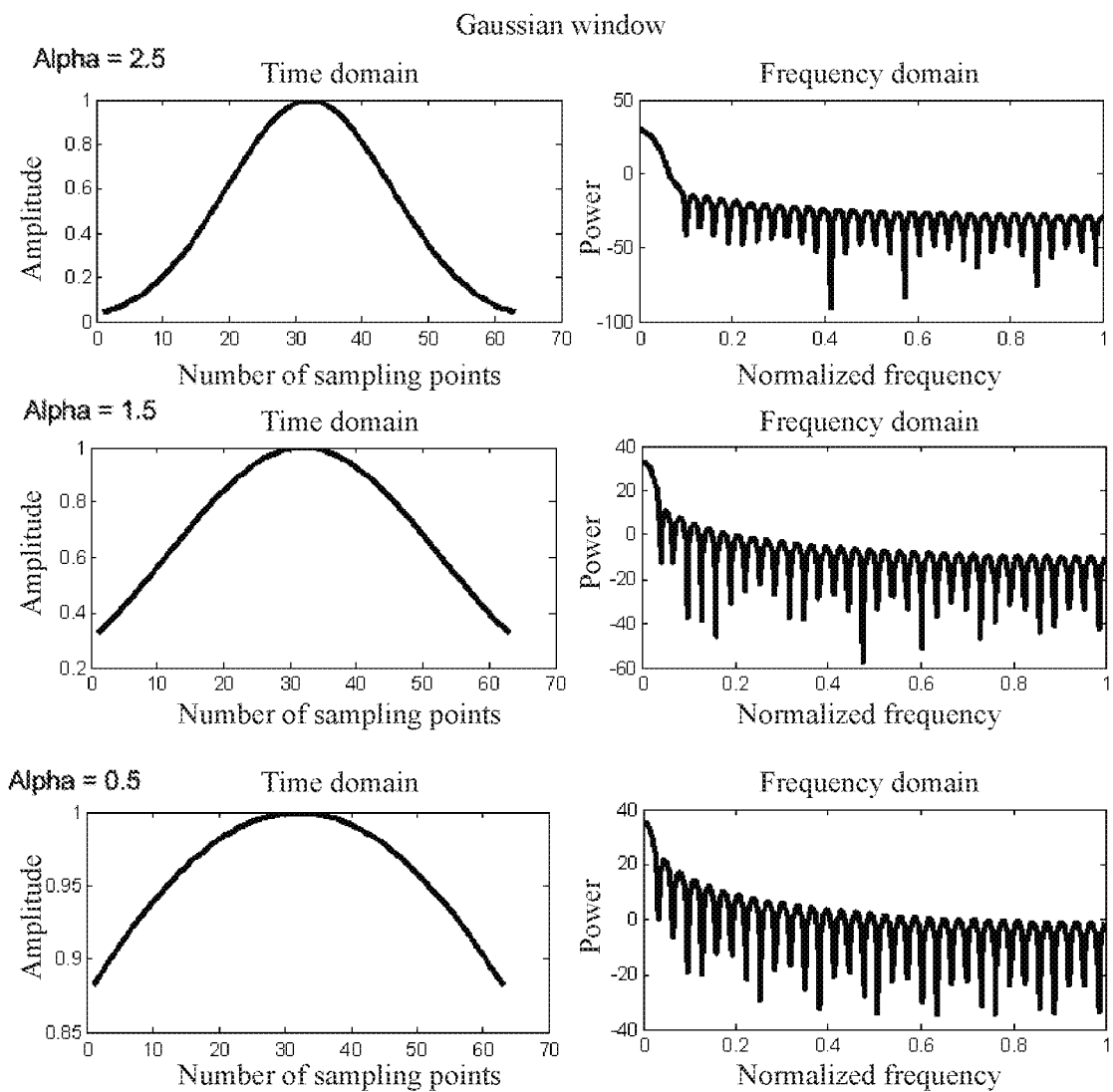
FIG. 24 is a diagram of a time-domain waveform and a frequency-domain waveform of a Gaussian envelope waveform according to an embodiment of the disclosure.

In this embodiment, in the design parameter, a window length L=63, and Alpha=2.5. A time-domain waveform and a frequency-domain waveform thereof are shown in FIG. 24. It can be learned from FIG. 24 that a Gaussian window in the time-domain waveform starts from approximately 0, and a frequency-domain side lobe attenuation is approximately 50 dB.

Specifically, a Gaussian window function may be represented by using the following formula:

$$w(n) = e^{-\frac{1}{2}(\alpha \frac{n}{N/2})^2}.$$

N is a window length, $-N/2 \leq n \leq N/2$, and $\alpha$ is a preset parameter. FIG. 24 shows time-domain waveforms and frequency-domain waveforms of the Gaussian window when $\alpha$ is respectively 2.5, 1.5, and 0.5.

Based on the foregoing embodiments, it can be learned that when this embodiment is applied to an OvFDM system, a Gaussian envelope waveform is a frequency-domain function waveform. That is, as shown in FIG. 24, a diagram on the left shows frequency-domain sampling, and a diagram on the right shows a time-domain normalization function. Other modulation and demodulation method steps are similar, and details are not described herein again.

Figure 25:
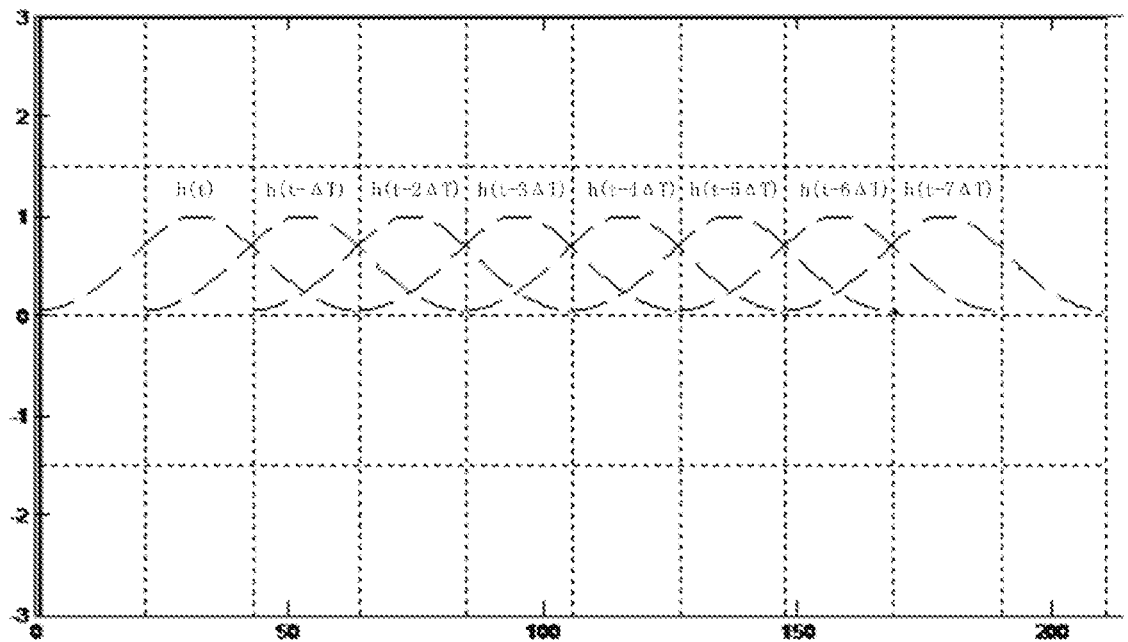
FIG. 25 is a diagram of envelope waveforms of various moments obtained after a Gaussian window is shifted according to an embodiment of the disclosure.

(2) Shift the Gaussian envelope waveform h(t) designed in (1) in the time domain at a preset shift interval, where the shift interval is a time interval $\Delta T$ ($\Delta T = L/K = 21$). After shifting, offset envelope waveforms $h(t-i*\Delta T)$ of transmit signals at various moments are formed (because N=8, i is an integer from 0 to 7). The offset envelope waveforms of transmit signals at various moments that are obtained after shifting are shown in FIG. 25.

(3) Convert an input digital signal sequence into a positive-negative symbol sequence.

Specifically, 0 and 1 in the input digital signal sequence may be converted into +A and −A respectively, to obtain the positive-negative symbol sequence. For example, when the value of A is 1, an input {0, 1} bit sequence is converted into a {+1, −1} symbol sequence through BPSK modulation.

Figure 26:
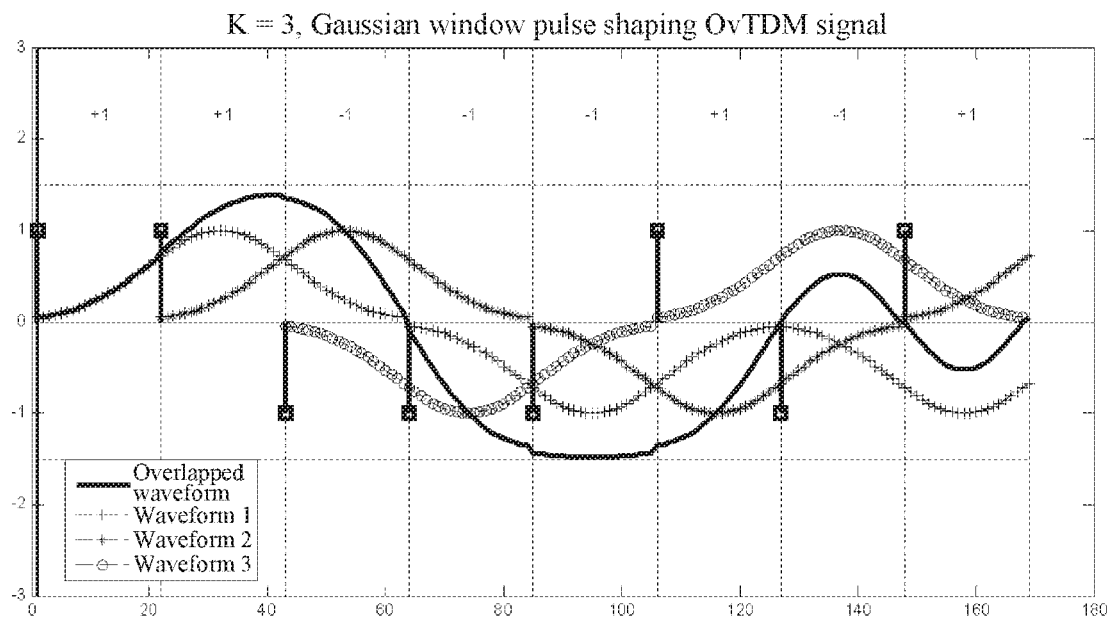
FIG. 26 is a schematic diagram of superimposition of to-be-sent waveforms when a Gaussian envelope waveform is used according to an embodiment of the disclosure.

(4) Multiply the positive-negative symbol sequence $x_i$ (in this embodiment, $x_i = \{+1\ +1\ -1\ -1\ -1\ +1\ -1\ +1\}$) by the offset envelope waveforms $h(t-i*\Delta T)$ of transmit signals at various moments that are generated in (2), to obtain modulated envelope waveforms $x_i h(t-i*\Delta T)$ of the moments. Formed waveforms are shown in FIG. 26, where three different dashed lines represent three waveforms obtained after multiplication.

(5) Superimpose the modulated envelope waveforms $x_i h(t-i*\Delta T)$ of the moments that are formed in (4) in the time domain, to obtain a complex modulated envelope waveform carrying an output signal sequence, namely, a transmit signal. A waveform of the transmit signal is shown by a solid-line waveform in FIG. 26.

A signal receiving method is similar to the method in the foregoing embodiments, and details are not described herein again.

Embodiment 5

In this embodiment, an initial envelope waveform is a Hanning envelope waveform or an envelope waveform of an evolved window function of the Hanning envelope waveform.

The following further describes this application assuming that an initial envelope waveform is a Hanning envelope waveform. OvTDM signal transmission and receiving procedures are described by using an example in which times of overlapped multiplexing K=3, an input symbol length N=8, and an input symbol $x_i = \{+1\ +1\ -1\ -1\ -1\ +1\ -1\ +1\}$. The input symbol length is a length for transmitting a frame of signal.

A signal generation procedure includes the following steps:

(1) First, generate a Hanning envelope waveform h(t) of a transmit signal based on design parameters.

Figure 27:
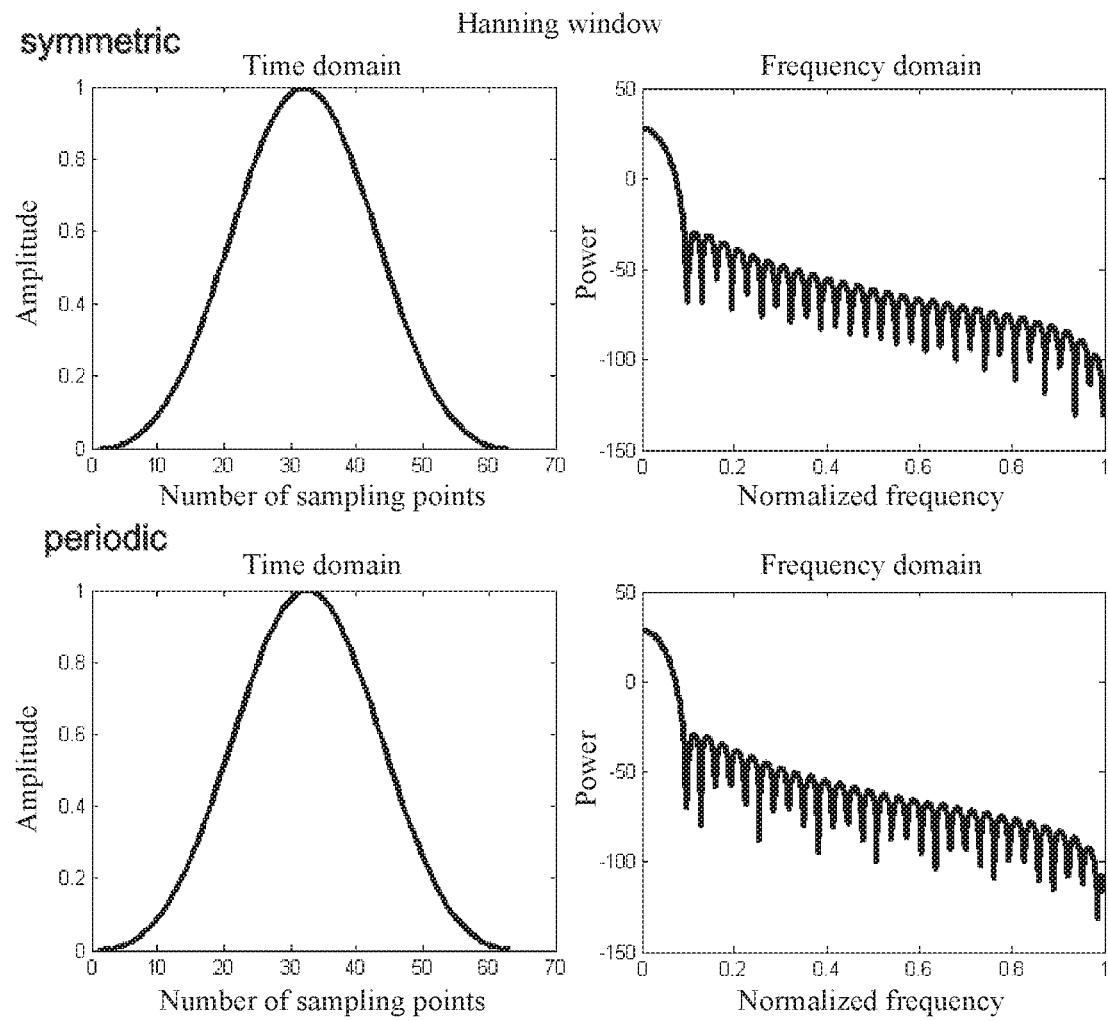
FIG. 27 is a diagram of a time-domain waveform and a frequency-domain waveform of a Hanning envelope waveform according to an embodiment of the disclosure.

In this embodiment, in the design parameter, a window length L=63, and a time-domain waveform and a frequency-domain waveform thereof are shown in FIG. 27. It can be learned from FIG. 27 that a Hanning window in the time-domain waveform starts from approximately 0, and a frequency-domain side lobe attenuation is approximately 80 dB. In addition, FIG. 27 shows time-domain waveforms and frequency-domain waveforms of the Hanning window when symmetric sampling and periodic sampling are respectively used.

Specifically, a Hanning window function may be represented by using the following formula:

$\omega(n) = 0.5(1-\cos(2\pi n/N))$.

$0 \leq n \leq N$, and a window length L=N+1. It should be noted that n in the foregoing formula merely represents a function variable in a general expression.

Based on the foregoing embodiments, it can be learned that when this embodiment is applied to an OvFDM system, a Hanning envelope waveform is a frequency-domain function waveform. That is, as shown in FIG. 27, a diagram on the left shows frequency-domain sampling, and a diagram on the right shows a time-domain normalization function. Other modulation and demodulation method steps are similar, and details are not described herein again.

Figure 28:
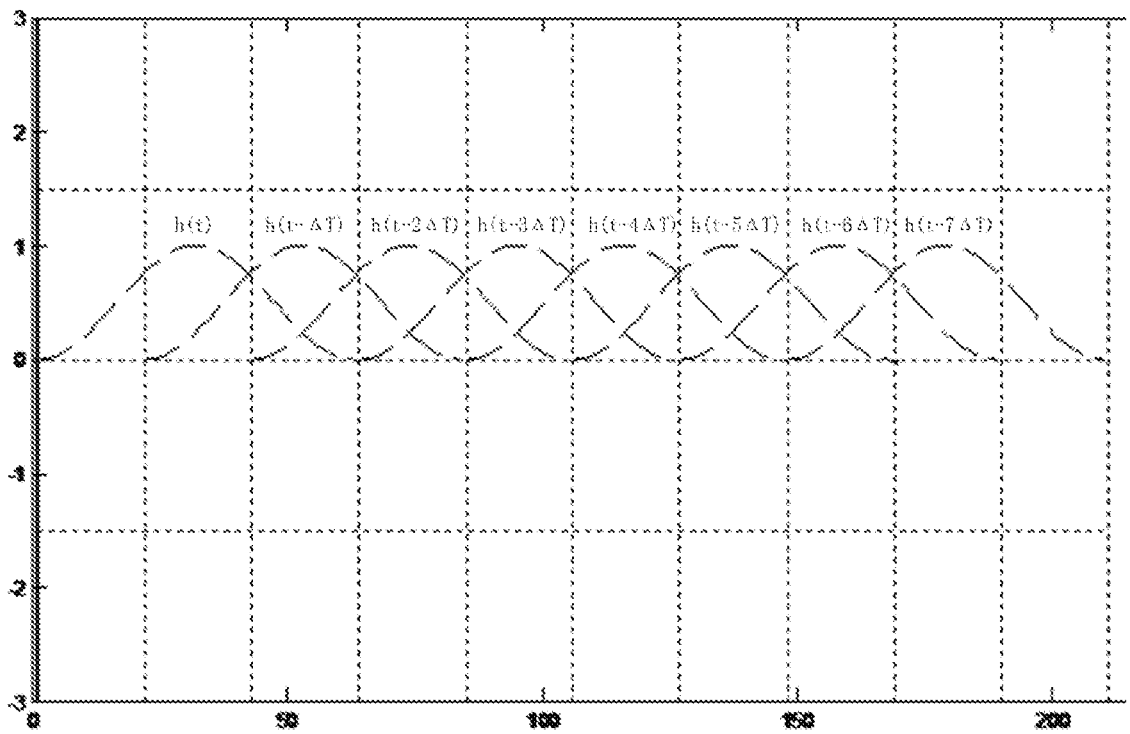
FIG. 28 is a diagram of envelope waveforms of various moments obtained after a Hanning window is shifted according to an embodiment of the disclosure.

(2) Shift the Hanning envelope waveform h(t) designed in (1) in the time domain at a preset shift interval, where the shift interval is a time interval $\Delta T$ ($\Delta T = L/K = 21$). After shifting, offset envelope waveforms $h(t-i*\Delta T)$ of transmit signals at various moments are formed (because N=8, i is an integer from 0 to 7). The offset envelope waveforms of transmit signals at various moments that are obtained after shifting are shown in FIG. 28.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 29:
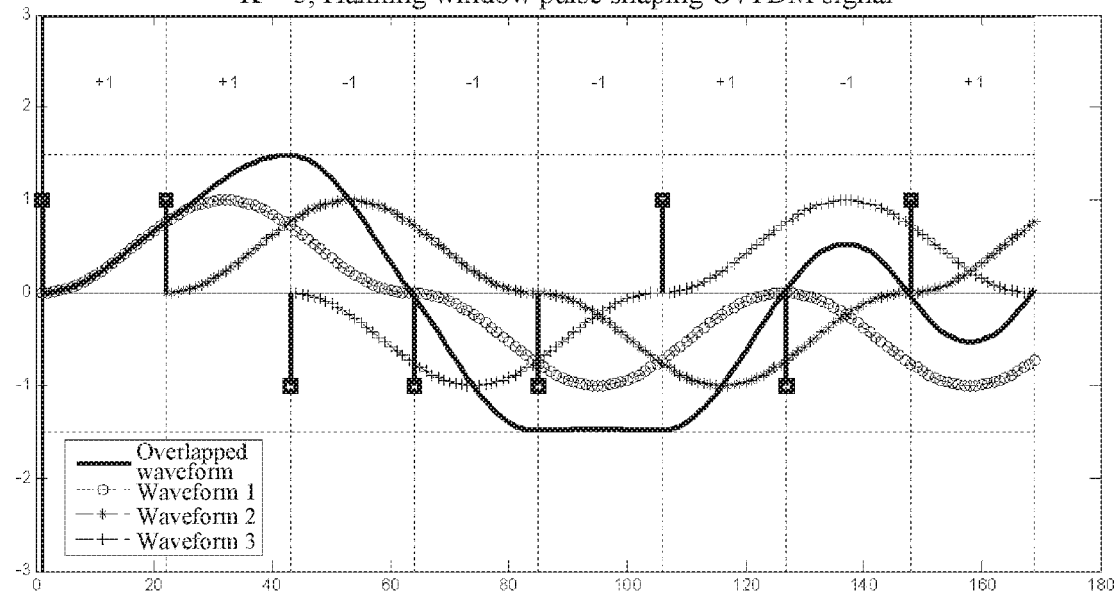
FIG. 29 is a schematic diagram of superimposition of to-be-sent waveforms when a Hanning envelope waveform is used according to an embodiment of the disclosure.

(4) Multiply the positive-negative symbol sequence $x_i$ (in this embodiment, $x_i = \{+1\ +1\ -1\ -1\ -1\ +1\ -1\ +1\}$) by the offset envelope waveforms $h(t-i*\Delta T)$ of transmit signals at various moments that are generated in (2), to obtain modulated envelope waveforms $x_i h(t-i*\Delta T)$ of the moments. Formed waveforms are shown in FIG. 29, where three different dashed lines represent three waveforms obtained after multiplication.

(5) Superimpose the modulated envelope waveforms $x_i h(t-i*\Delta T)$ of the moments that are formed in (4) in the time domain, to obtain a complex modulated envelope waveform carrying an output signal sequence, namely, a transmit signal.

A signal receiving method is similar to the method in the foregoing embodiments, and details are not described herein again.

Embodiment 6

The following further describes this application assuming that an initial envelope waveform is a Kaiser envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Kaiser envelope waveform h(t) of a transmit signal based on design parameters.

Figure 30:
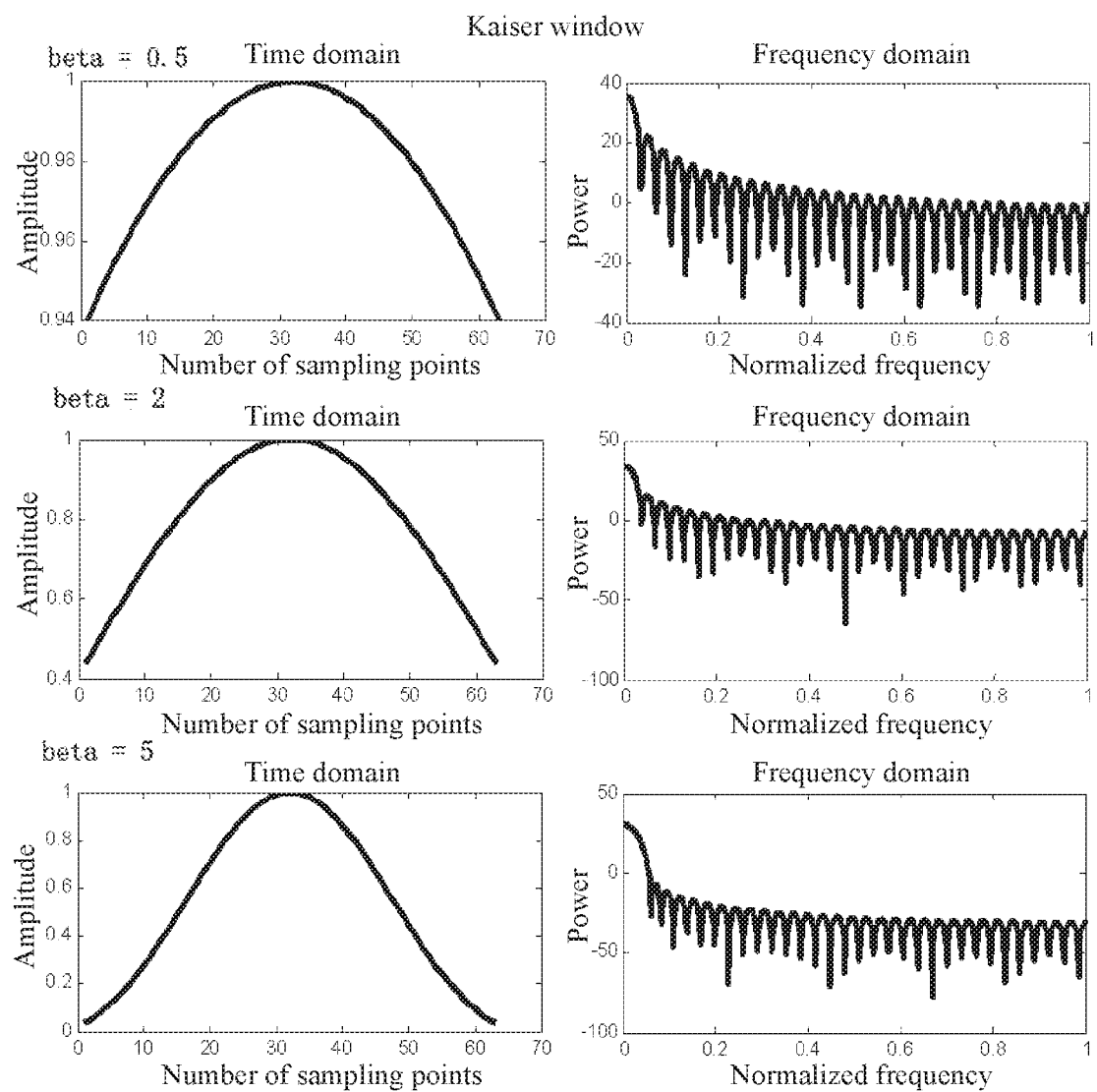
FIG. 30 is a diagram of a time-domain waveform and a frequency-domain waveform of a Kaiser envelope waveform according to an embodiment of the disclosure.

In this embodiment, in the design parameter, a window length L=63, and beta is respectively 0.5, 2, and 5. A time-domain waveform and a frequency-domain waveform thereof are shown in FIG. 30. It can be learned from FIG. 30 that as beta increases, a start point of the time-domain waveform gradually approaches 0, the waveform is more smooth, and side lobe attenuation of the frequency-domain waveform is faster. Therefore, better performance is achieved after superimposition is performed in the following steps. FIG. 30 respectively shows a time-domain waveform and a frequency-domain waveform of a Kaiser window when beta is 0.5, 2, or 5.

Specifically, a Kaiser window function may be represented by using the following formula:

$$w[n] = \frac{I_0\left[\beta\sqrt{1-\left(\frac{2n}{N-1}-1\right)^2}\right]}{I_0\beta}.$$

$I_0(\beta)$ is a zeroth-order modified Bessel function of the first kind. $\beta$ is a shape parameter of the window function, and is determined by using the following formula:

$$\beta = \begin{cases} 0.1102(\alpha - 8.7), & \alpha > 50 \\ 0.5842(\alpha - 21)^{0.4} + 0.07886(\alpha - 21), & 50 \geq \alpha \geq 21 \\ 0, & \alpha < 21 \end{cases}.$$

$\alpha$ is a difference (dB) between a main lobe value and a side lobe value of the Kaiser window function. A main lobe width and side lobe attenuation may be freely selected based on a value change of $\beta$. As a value of $\beta$ increases, the side lobe value of a window function spectrum becomes smaller, and the main lobe width becomes wider. It should be noted that n in the foregoing formula merely represents a function variable in the formula.

Based on the foregoing embodiments, it can be learned that when this embodiment is applied to an OvFDM system, a Kaiser envelope waveform is a frequency-domain function waveform. That is, as shown in FIG. 30, a diagram on the left shows frequency-domain sampling, and a diagram on the right shows a time-domain normalization function. Other modulation and demodulation method steps are similar, and details are not described herein again.

Figure 31:
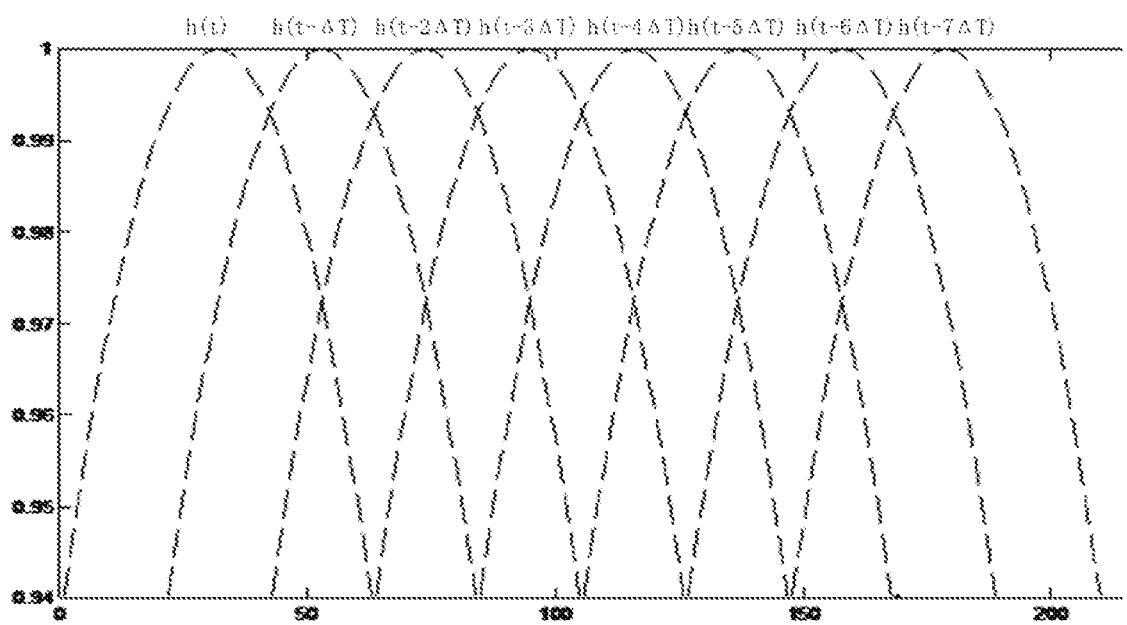
FIG. 31 is a diagram of envelope waveforms of various moments obtained after a Kaiser window is shifted according to an embodiment of the disclosure.

(2) Shift the Kaiser envelope waveform h(t) designed in (1) in the time domain at a preset shift interval, where the shift interval is a time interval $\Delta T$ ($\Delta T=L/K=21$). After shifting, offset envelope waveforms h(t−i*$\Delta T$) of transmit signals at various moments are formed (because N=8, i is an integer from 0 to 7). The offset envelope waveforms of transmit signals at various moments that are obtained after shifting are shown in FIG. 31.

(3) Convert an input digital signal sequence into a positive-negative symbol sequence.

Specifically, 0 and 1 in the input digital signal sequence may be converted into +A and −A respectively, to obtain the positive-negative symbol sequence. For example, A=1, and an input {0, 1} bit sequence is converted into a {+1, −1} symbol sequence through BPSK modulation.

Figure 32A:
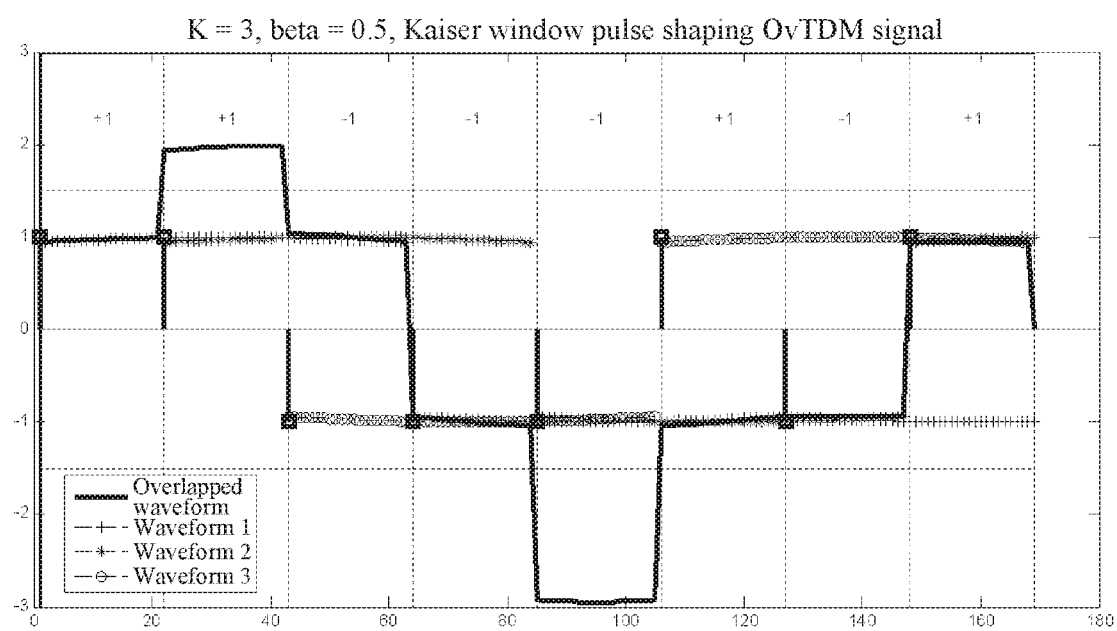
FIG. 32A is a schematic diagram of superimposition of to-be-sent waveforms when a Kaiser envelope waveform is used and beta=0.5 according to an embodiment of the disclosure.
Figure 32B:
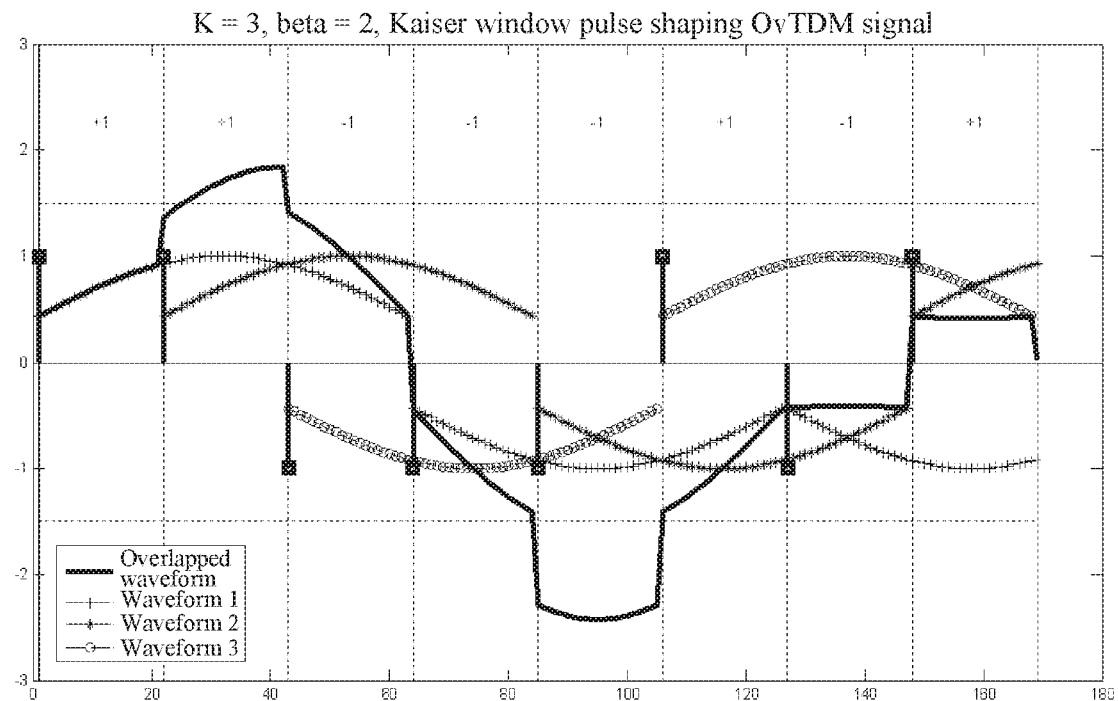
FIG. 32B is a schematic diagram of superimposition of to-be-sent waveforms when a Kaiser envelope waveform is used and beta=2 according to an embodiment of the disclosure.
Figure 32C:
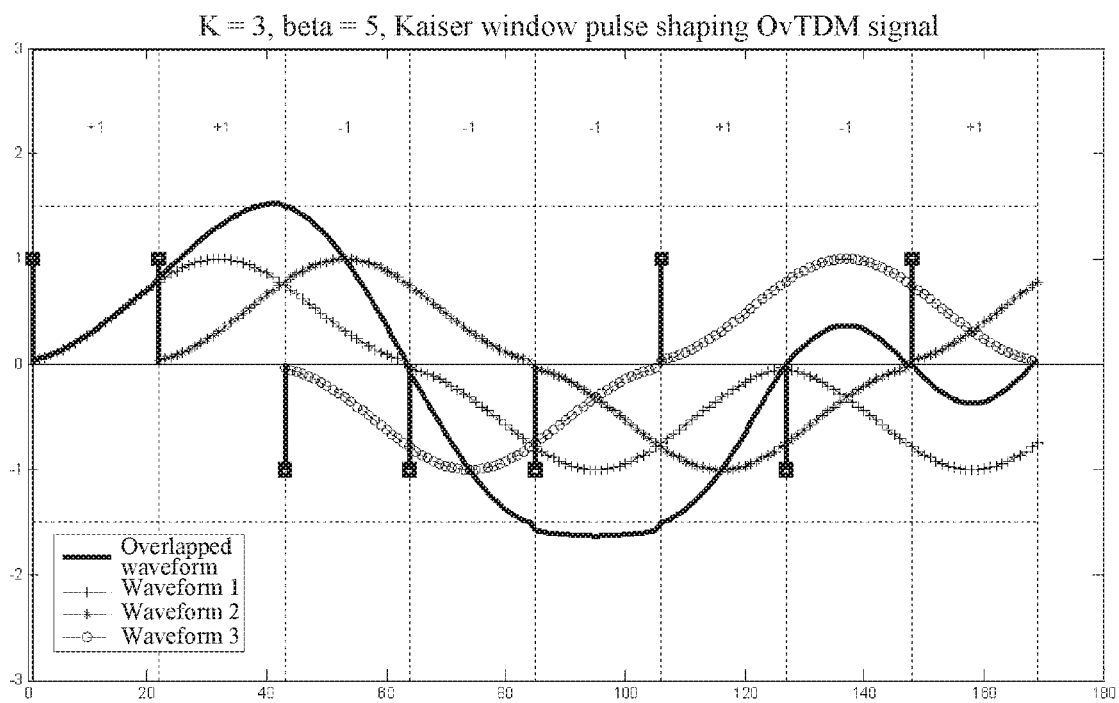
FIG. 32C is a schematic diagram of superimposition of to-be-sent waveforms when a Kaiser envelope waveform is used and beta=5 according to an embodiment of the disclosure.

(4) Multiply the positive-negative symbol sequence $x_i$ (in this embodiment, $x_i=\{+1\ +1\ -1\ -1\ -1\ +1\ -1\ +1\}$) by the offset envelope waveforms h(t−i*$\Delta T$) of transmit signals at various moments that are generated in (2), to obtain modulated envelope waveforms $x_i$h(t−i*$\Delta T$) of the moments. Formed waveforms are shown in FIG. 32 (FIG. 32A to FIG. 32C), where three different dashed lines represent three waveforms obtained after multiplication.

(5) Superimpose the modulated envelope waveforms $x_i$h(t−i*$\Delta T$) of the moments that are formed in (4) in the time domain, to obtain a complex modulated envelope waveform carrying an output signal sequence, namely, a transmit signal.

Embodiment 7

The following further describes this application assuming that an initial envelope waveform is a Hamming envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Hamming envelope waveform h(t) of a transmit signal based on design parameters.

Figure 33:
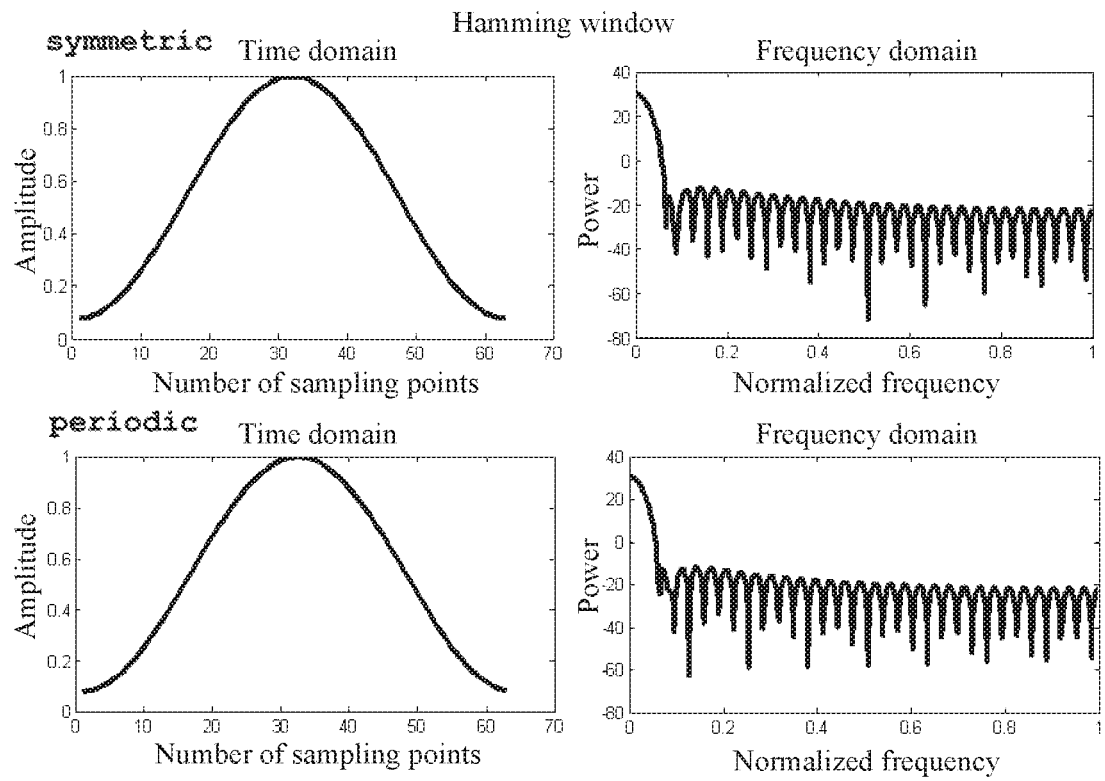
FIG. 33 is a diagram of a time-domain waveform and a frequency-domain waveform of a Hamming envelope waveform according to an embodiment of the disclosure.

In this embodiment, in the design parameter, a window length L=63, and a time-domain waveform and a frequency-domain waveform thereof are shown in FIG. 33. It can be learned from FIG. 33 that a Hamming window in the time-domain waveform starts from approximately 0 (0.08), and a frequency-domain side lobe attenuation is approximately 50 dB. In addition, FIG. 33 shows time-domain waveforms and frequency-domain waveforms of the Hamming window when symmetric sampling and periodic sampling are respectively used.

Specifically, a Hamming window function may be represented by using the following formula:

$$\omega(n)=0.54-0.46\cos(2\pi n/N).$$

$0 \leq n \leq N$, and a window length L=N+1. It should be noted that n in the foregoing formula merely represents a function variable in the formula.

Based on the foregoing embodiments, it can be learned that when this embodiment is applied to an OvFDM system, a Hamming envelope waveform is a frequency-domain function waveform. That is, as shown in FIG. 33, a diagram on the left shows frequency-domain sampling, and a diagram on the right shows a time-domain normalization function. Other modulation and demodulation method steps are similar, and details are not described herein again.

Figure 34:
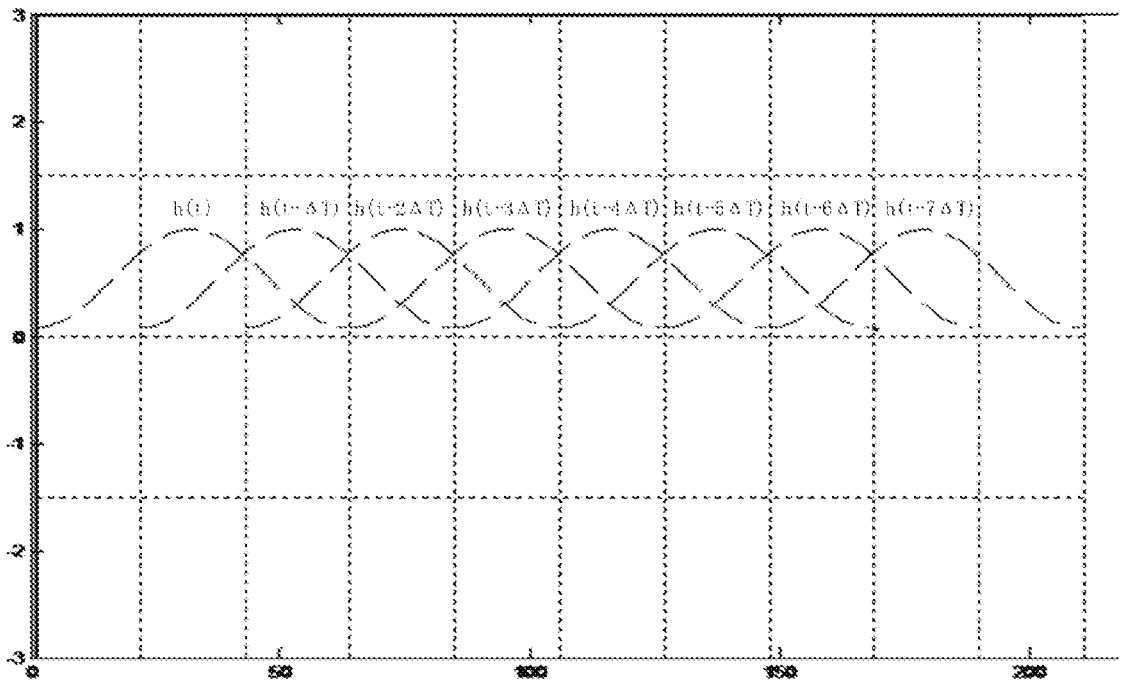
FIG. 34 is a diagram of envelope waveforms of various moments obtained after a Hamming window is shifted according to an embodiment of the disclosure.

(2) Shift the Hamming envelope waveform h(t) designed in (1) in the time domain at a preset shift interval, where the shift interval is a time interval $\Delta T$ ($\Delta T=L/K=21$). After shifting, offset envelope waveforms h(t−i*$\Delta T$) of transmit signals at various moments are formed (because N=8, i is an integer from 0 to 7). The offset envelope waveforms of transmit signals at various moments that are obtained after shifting are shown in FIG. 34.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 35:
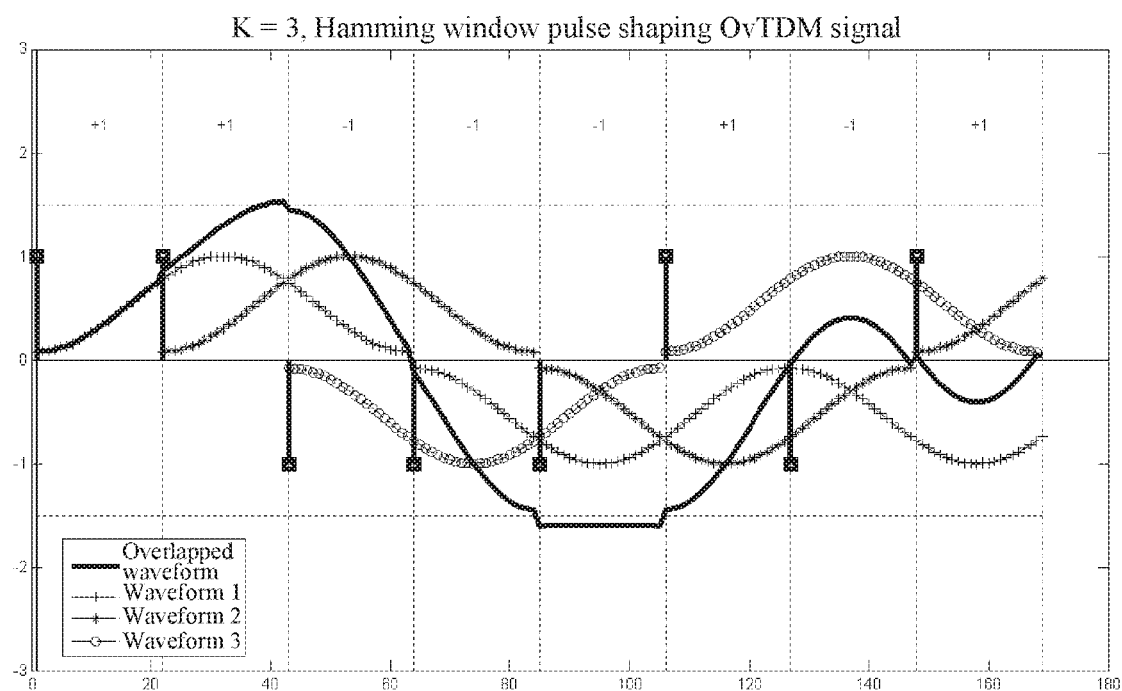
FIG. 35 is a schematic diagram of superimposition of to-be-sent waveforms when a Hamming envelope waveform is used according to an embodiment of the disclosure.

(4) Multiply the positive-negative symbol sequence $x_i$ (in this embodiment, $x_i=\{+1\ +1\ -1\ -1\ -1\ +1\ -1\ +1\}$) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 35, where three different dashed lines represent three waveforms obtained after multiplication.

(5) Superimpose the modulated envelope waveforms $x_i$h(t−i*ΔT) of the moments that are formed in (4) in the time domain, to obtain a complex modulated envelope waveform carrying an output signal sequence, namely, a transmit signal.

Embodiment 8

The following further describes this application assuming that an initial envelope waveform is a Bartlett-Hanning envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Bartlett-Hanning envelope waveform h(t) of a transmit signal based on design parameters.

Figure 36:
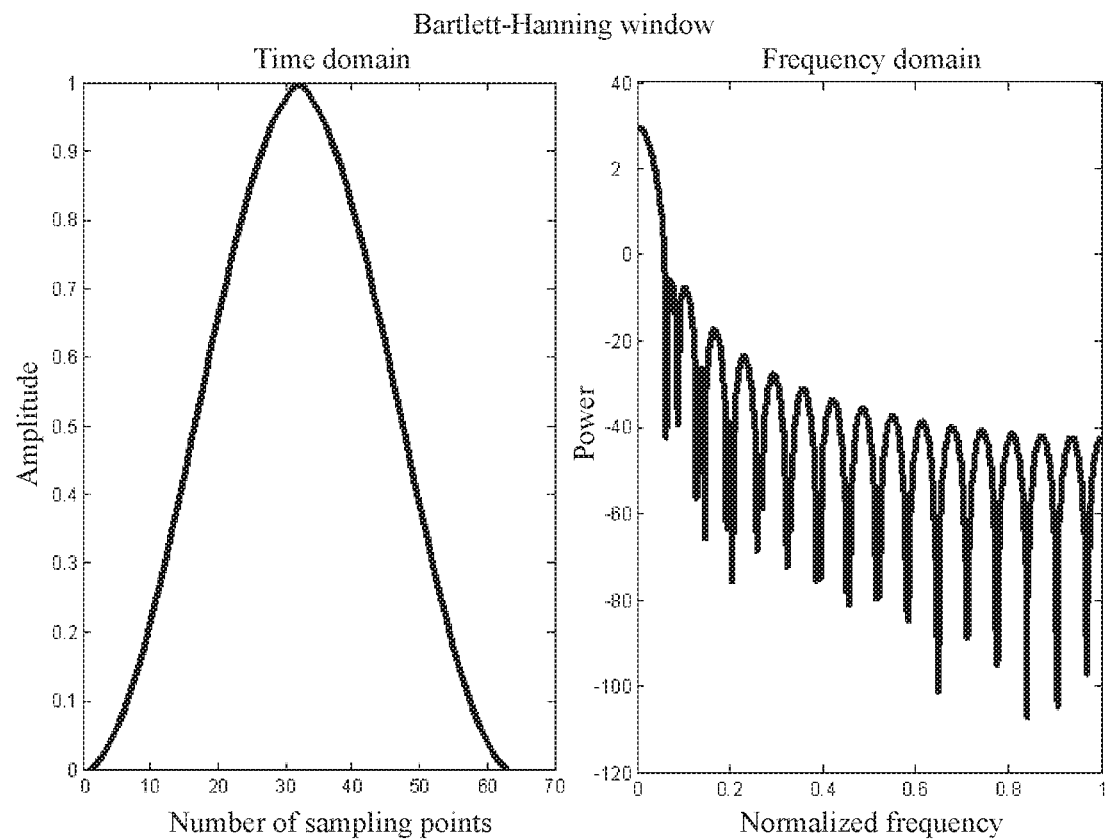
FIG. 36 is a diagram of a time-domain waveform and a frequency-domain waveform of a Bartlett-Hanning envelope waveform according to an embodiment of the disclosure.

In this embodiment, in the design parameter, a window length L=63, and a time-domain waveform and a frequency-domain waveform thereof are shown in FIG. 36. It can be learned from FIG. 36 that a Bartlett-Hanning window in the time-domain waveform starts from 0, and a frequency-domain side lobe attenuation is approximately 40 dB.

Specifically, a Bartlett-Hanning window function may be represented by using the following formula:

$$\omega(n)=0.62-0.48|n/N-0.5|+0.38\cos(2\pi(n/N-0.5)).$$

0≤n≤N, and a window length L=N+1. It should be noted that n in the foregoing formula merely represents a function variable in the formula.

Based on the foregoing embodiments, it can be learned that when this embodiment is applied to an OvFDM system, a Bartlett-Hanning envelope waveform is a frequency-domain function waveform. That is, as shown in FIG. 36, a diagram on the left shows frequency-domain sampling, and a diagram on the right shows a time-domain normalization function. Other modulation and demodulation method steps are similar, and details are not described herein again.

Figure 37:
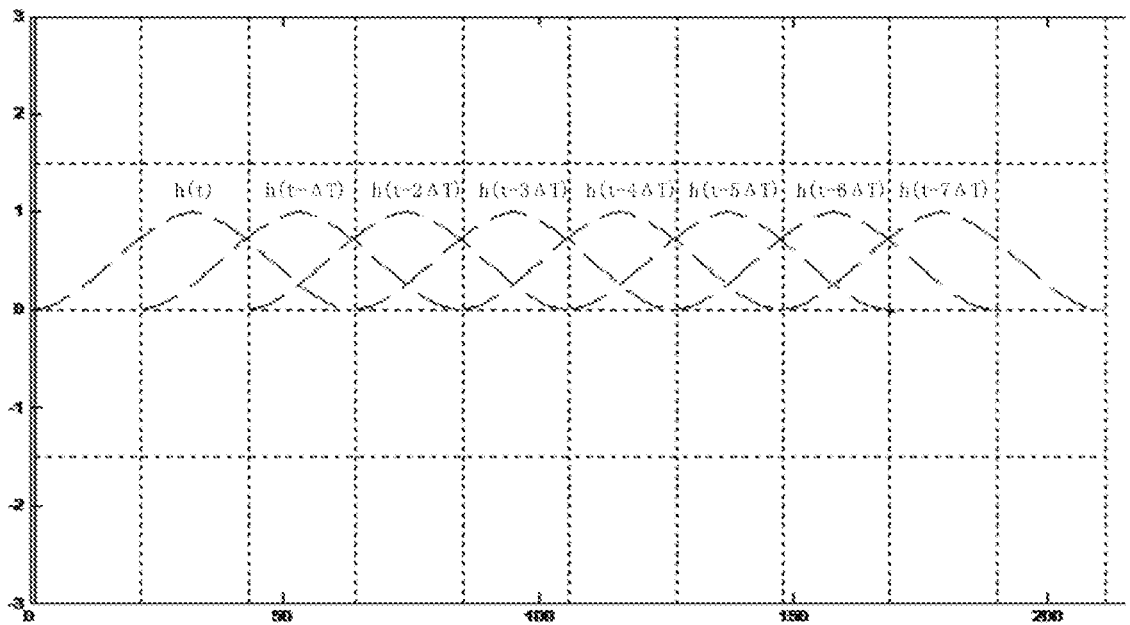
FIG. 37 is a diagram of envelope waveforms of various moments obtained after a Bartlett-Hanning window is shifted according to an embodiment of the disclosure.

(2) Shift the Bartlett-Hanning envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 37.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 38:
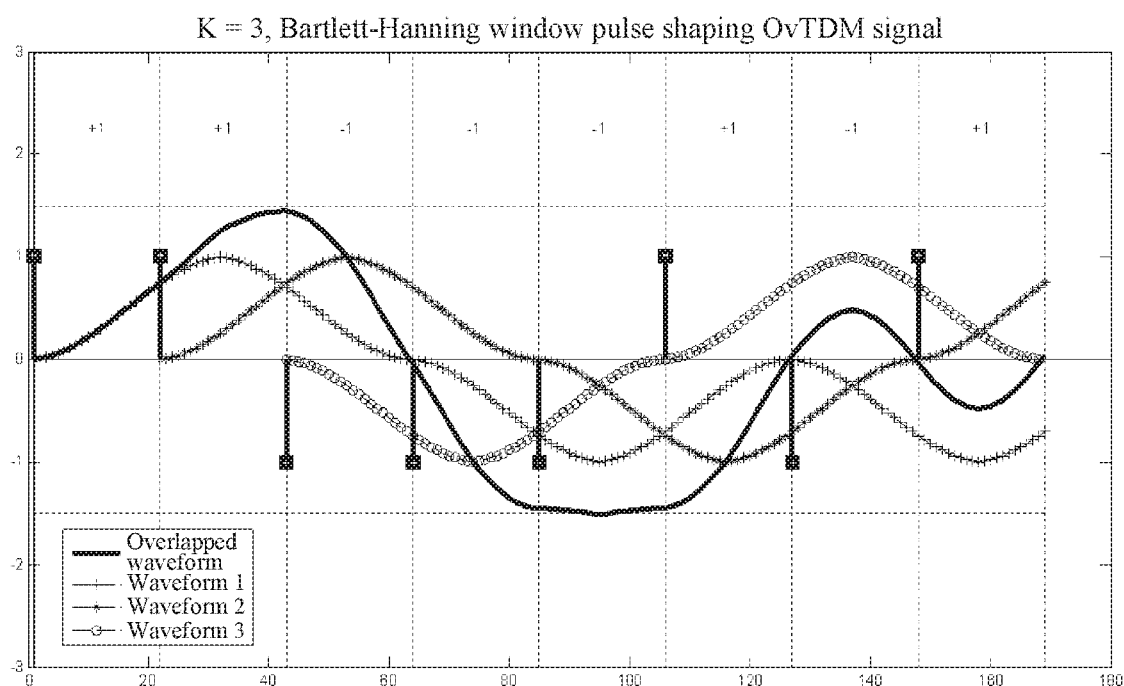
FIG. 38 is a schematic diagram of superimposition of to-be-sent waveforms when a Bartlett-Hanning envelope waveform is used according to an embodiment of the disclosure.

(4) Multiply the positive-negative symbol sequence $x_i$ (in this embodiment, $x_i=\{+1\ +1\ -1\ -1\ -1\ +1\ -1\ +1\}$) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 38, where three different dashed lines represent three waveforms obtained after multiplication.

(5) Superimpose the modulated envelope waveforms $x_i$h(t−i*ΔT) of the moments that are formed in (4) in the time domain, to obtain a complex modulated envelope waveform carrying an output signal sequence, namely, a transmit signal.

Embodiment 9

The following further describes this application assuming that an initial envelope waveform is a Blackman envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Blackman envelope waveform h(t) of a transmit signal based on design parameters.

Figure 39:
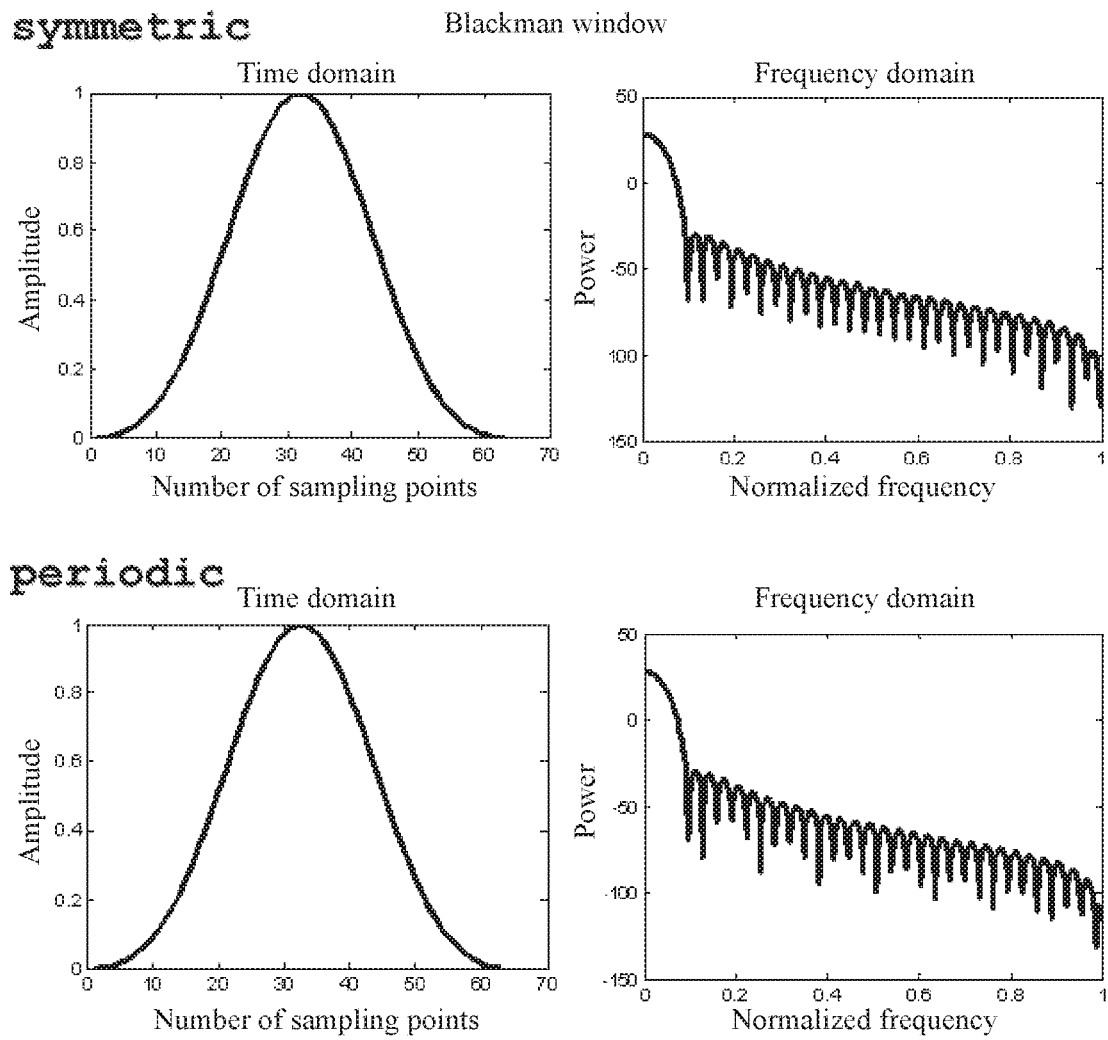
FIG. 39 is a diagram of a time-domain waveform and a frequency-domain waveform of a Blackman envelope waveform according to an embodiment of the disclosure.

In this embodiment, in the design parameter, a window length L=63, and a time-domain waveform and a frequency-domain waveform thereof are shown in FIG. 39. It can be learned from FIG. 39 that a Blackman window in the time-domain waveform starts from 0, and a frequency-domain side lobe attenuation is approximately 80 dB.

Specifically, a Blackman window function may be represented by using the following formula:

$$\omega(n)=0.42-0.5\cos(2\pi n/(N-1))+0.08\cos(4\pi n/(N-1)).$$

N is a window length, 0≤n≤M−1, and when N is an even number, M=N/2, or when N is an odd number, M=(N+1)/2. It should be noted that n in the foregoing formula merely represents a function variable in the formula.

It should be noted that in the foregoing formula, when 0≤n≤M−1, an obtained waveform is a first half of the Blackman window. A waveform of a second half of the Blackman window (that is, when M≤n≤N−1) is axisymmetric to the waveform of the first half part along a straight line n=M. That is, the waveform of the second half part can be obtained by horizontally turning over the waveform of the first half part along the straight line n=M. In addition, FIG. 39 shows time-domain waveforms and frequency-domain waveforms of the Blackman window when symmetric sampling and periodic sampling are respectively used.

Based on the foregoing embodiments, it can be learned that when this embodiment is applied to an OvFDM system, a Blackman envelope waveform is a frequency-domain function waveform. That is, as shown in FIG. 39, a diagram on the left shows frequency-domain sampling, and a diagram on the right shows a time-domain normalization function. Other modulation and demodulation method steps are similar, and details are not described herein again.

Figure 40:
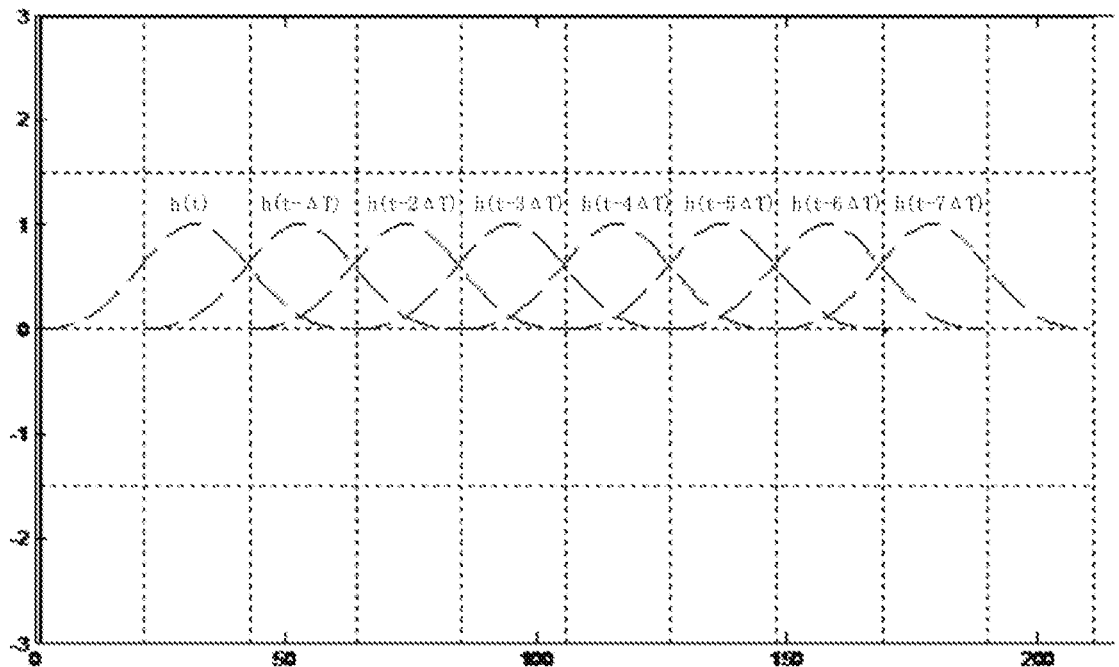
FIG. 40 is a diagram of envelope waveforms of various moments obtained after a Blackman window is shifted according to an embodiment of the disclosure.

(2) Shift the Blackman envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 40.

(3) Convert an input digital signal sequence into a positive-negative symbol sequence.

Specifically, 0 and 1 in the input digital signal sequence may be converted into +A and −A respectively, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 41:
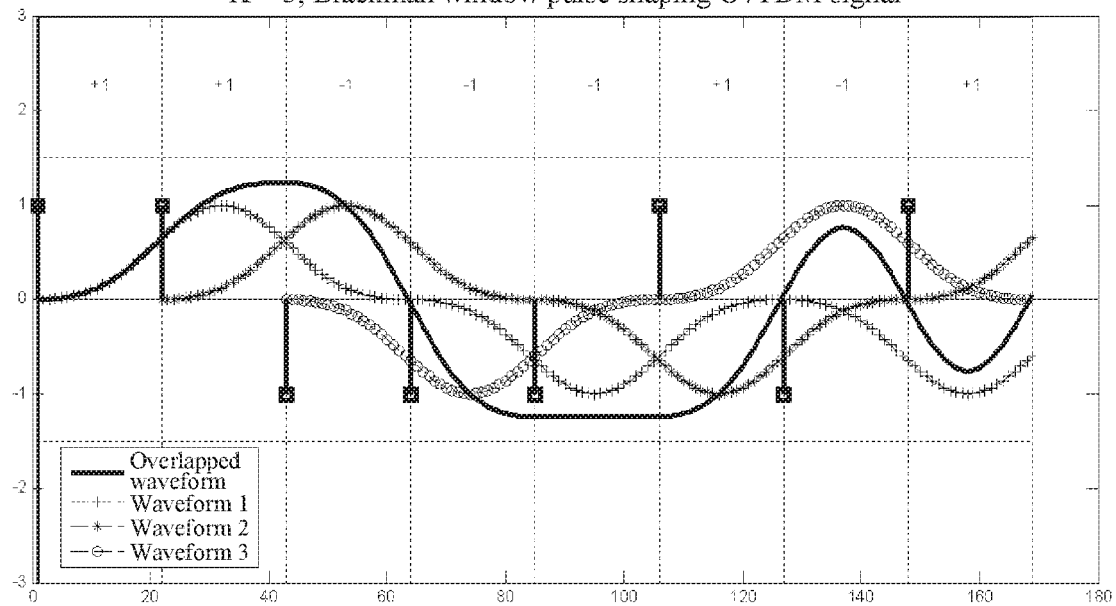
FIG. 41 is a schematic diagram of superimposition of to-be-sent waveforms when a Blackman envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 41, where three different dashed lines represent three waveforms obtained after multiplication.

(5) Superimpose the modulated envelope waveforms $x_i$h (t−i*ΔT) of the moments that are formed in (4) in the time domain, to obtain a complex modulated envelope waveform carrying an output signal sequence, namely, a transmit signal.

Embodiment 10

The following further describes this application assuming that an initial envelope waveform is a Bohman envelope waveform. OvTDM signal transmission and receiving procedures are described by using an example in which times of overlapped multiplexing K=3, an input symbol length N=8, and an input symbol $x_i$={+1 +1 −1 −1 −1 +1 −1 +1}. The input symbol length is a length for transmitting a frame of signal.

A signal generation procedure includes the following steps:

(1) First, generate a Bohman envelope waveform h(t) of a transmit signal based on design parameters.

Figure 42:
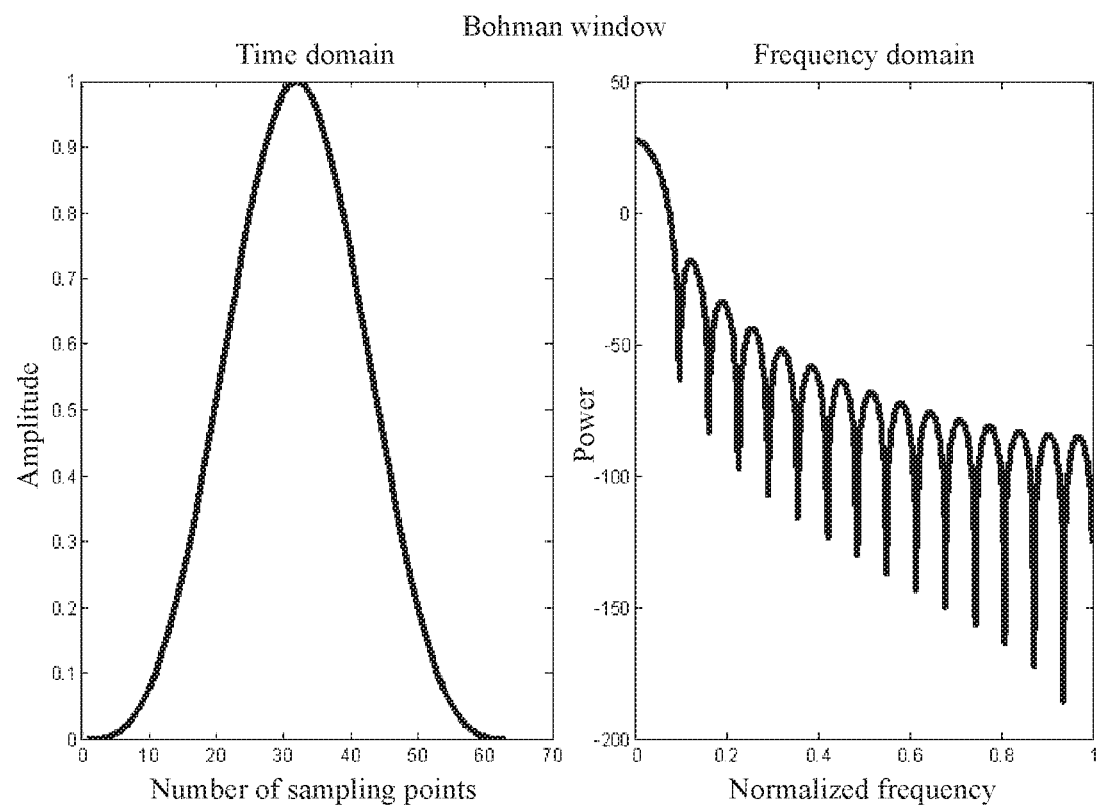
FIG. 42 is a diagram of a time-domain waveform and a frequency-domain waveform of a Bohman envelope waveform according to an embodiment of the disclosure.

In this embodiment, in the design parameter, a window length L=63, and a time-domain waveform and a frequency-domain waveform thereof are shown in FIG. 42. It can be learned from FIG. 42 that a Bohman window in the time-domain waveform starts from 0, and a frequency-domain out-of-band attenuation is approximately 60 dB.

Specifically, a Bohman window function (a symmetric function) may be represented by using the following formula:

$$\omega(x)=(1-|x|)\cos(\pi|x|)+(1/\pi)\sin(\pi|x|).$$

−1≤x≤1. It should be noted that x in the foregoing formula merely represents a function variable in the formula.

Based on the foregoing embodiments, it can be learned that when this embodiment is applied to an OvFDM system, a Bohman envelope waveform is a frequency-domain function waveform. That is, as shown in FIG. 42, a diagram on the left shows frequency-domain sampling, and a diagram on the right shows a time-domain normalization function. Other modulation and demodulation method steps are similar, and details are not described herein again.

Figure 43:
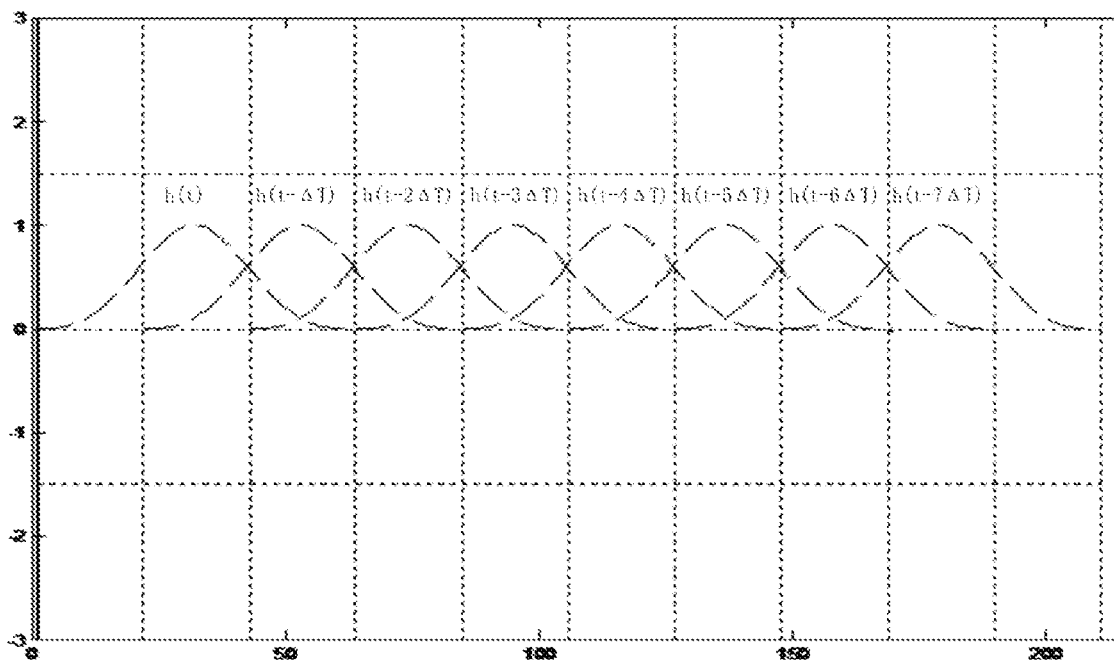
FIG. 43 is a diagram of envelope waveforms of various moments obtained after a Bohman window is shifted according to an embodiment of the disclosure.

(2) Shift the Bohman envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 43.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 44:
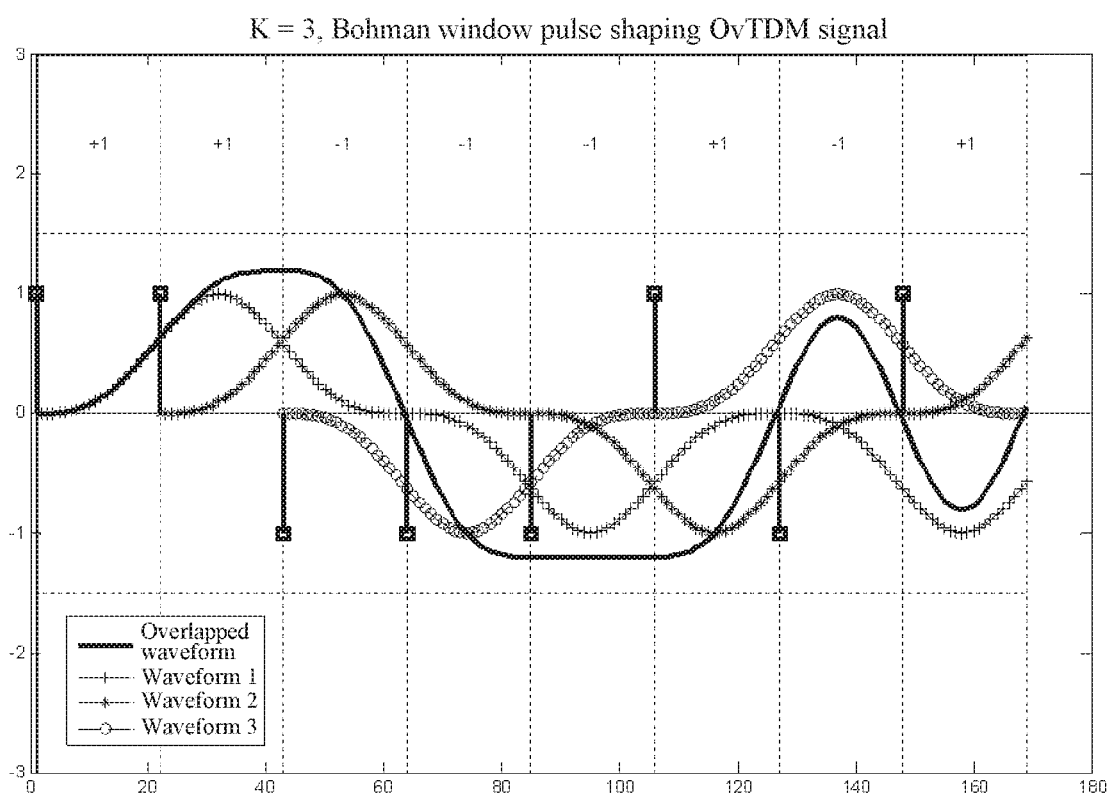
FIG. 44 is a schematic diagram of superimposition of to-be-sent waveforms when a Bohman envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 44, where three different dashed lines represent three waveforms obtained after multiplication.

(5) Superimpose the modulated envelope waveforms $x_i$h (t−i*ΔT) of the moments that are formed in (4) in the time domain, to obtain a complex modulated envelope waveform carrying an output signal sequence, namely, a transmit signal.

Embodiment 11

The following further describes this application assuming that an initial envelope waveform is a flat top envelope waveform. OvTDM signal transmission and receiving procedures are described by using an example in which times of overlapped multiplexing K=3, an input symbol length N=8, and an input symbol $x_i$={+1 +1 −1 −1 −1 +1 −1 +1}. The input symbol length is a length for transmitting a frame of signal.

A signal generation procedure includes the following steps:

(1) First, generate a flat top envelope waveform h(t) of a transmit signal based on design parameters.

Figure 45:
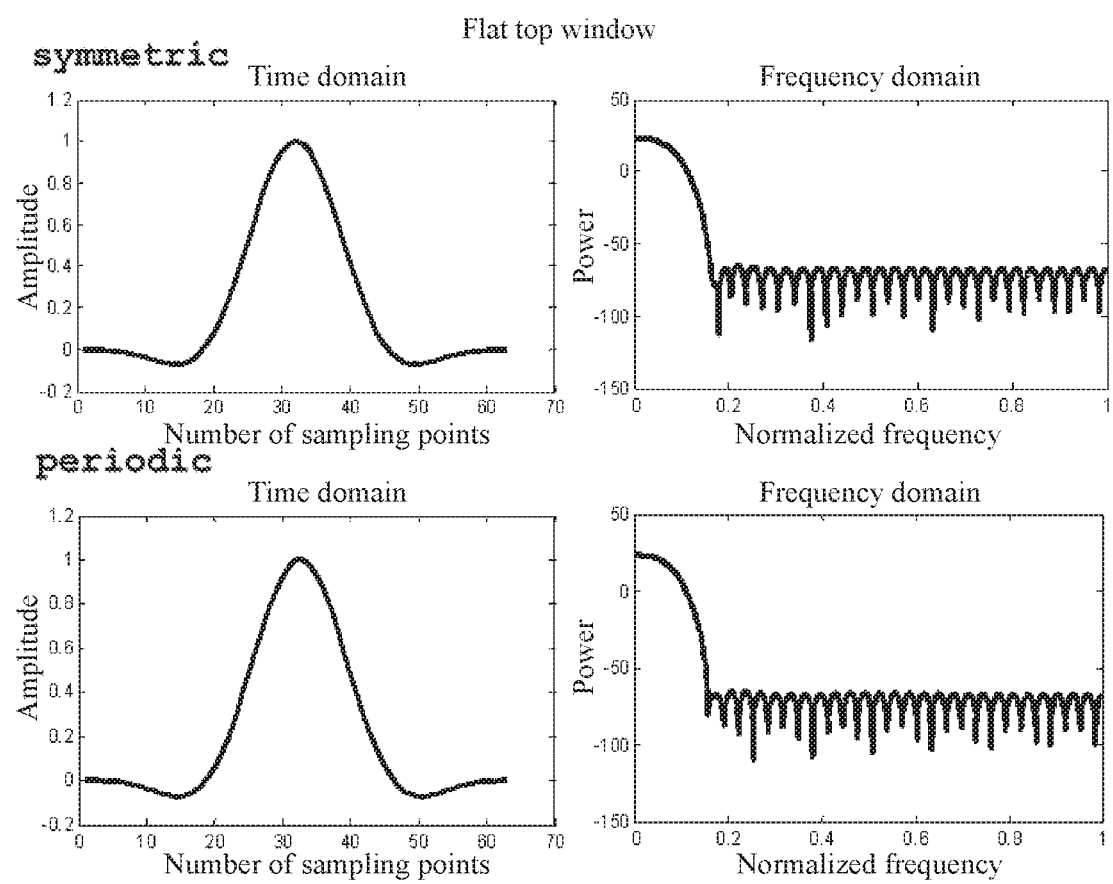
FIG. 45 is a diagram of a time-domain waveform and a frequency-domain waveform of a flat top envelope waveform according to an embodiment of the disclosure.

In this embodiment, in the design parameter, a window length L=63, and a time-domain waveform and a frequency-domain waveform thereof are shown in FIG. 45. It can be learned from FIG. 45 that a flat top window in the time-domain waveform starts from approximately 0 (−0.0004), and a frequency-domain side lobe attenuation is approximately 100 dB. In addition, FIG. 45 shows time-domain waveforms and frequency-domain waveforms of the flat top window when symmetric sampling and periodic sampling are respectively used.

Specifically, a flat top window function may be represented by using the following formula:

$$\omega(n)=a_0-a_1\cos(2\pi n/N)+a_2\cos(4\pi n/N)-a_3\cos(6\pi n/N)+a_4\cos(8\pi n/N).$$

0≤n≤N, a window length L=N+1, $a_0$=0.21557895, $a_1$=0.41663185, $a_2$=0.277263185, $a_3$=0.083578947, and $a_4$=0.006947368. It should be noted that n in the foregoing formula merely represents a function variable in the formula.

Based on the foregoing embodiments, it can be learned that when this embodiment is applied to an OvFDM system, a flat top envelope waveform is a frequency-domain function waveform. That is, as shown in FIG. 45, a diagram on the left shows frequency-domain sampling, and a diagram on the right shows a time-domain normalization function. Other modulation and demodulation method steps are similar, and details are not described herein again.

Figure 46:
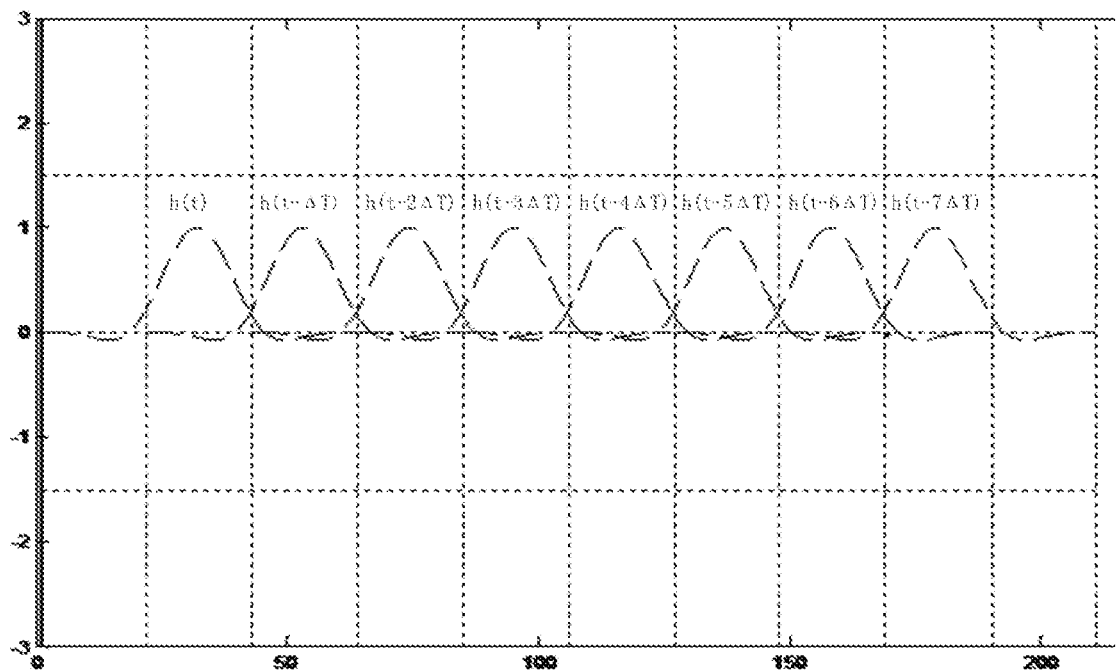
FIG. 46 is a diagram of envelope waveforms of various moments obtained after a flat top window is shifted according to an embodiment of the disclosure.

(2) Shift the flat top envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 46.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 47:
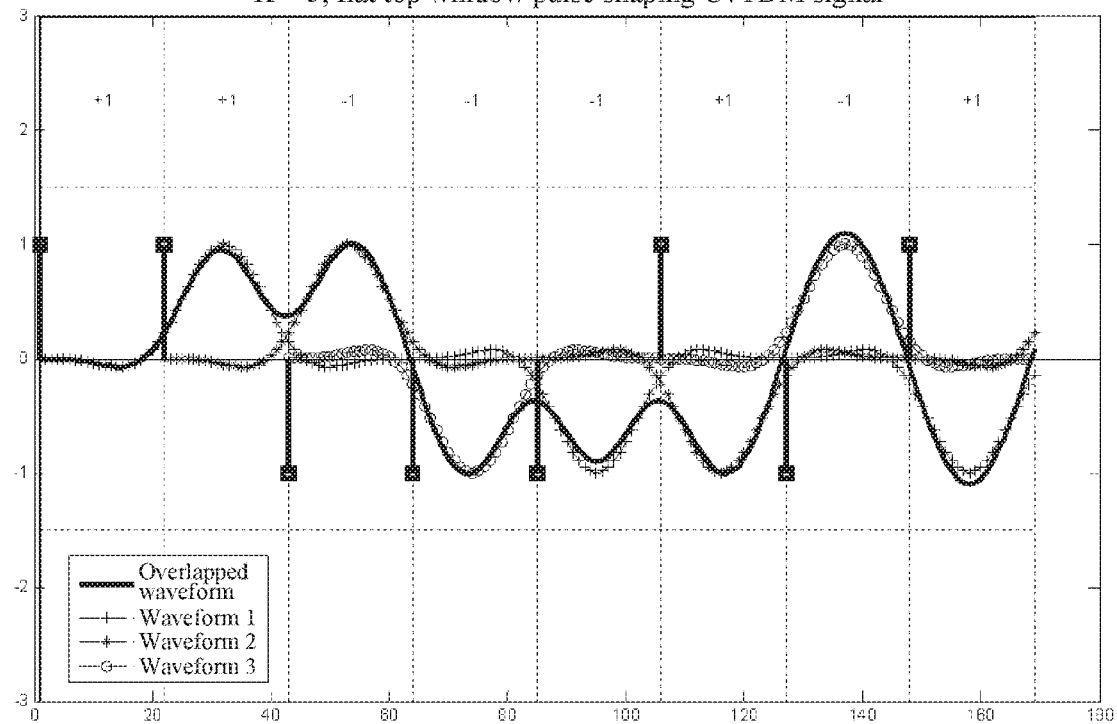
FIG. 47 is a schematic diagram of superimposition of to-be-sent waveforms when a flat top envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 47, where three different dashed lines represent three waveforms obtained after multiplication.

(5) Superimpose the modulated envelope waveforms $x_i$h (t−i*ΔT) of the moments that are formed in (4) in the time domain, to obtain a complex modulated envelope waveform carrying an output signal sequence, namely, a transmit signal.

Embodiment 12

The following further describes this application assuming that an initial envelope waveform is a Nuttall envelope waveform. OvTDM signal transmission and receiving procedures are described by using an example in which times of overlapped multiplexing K=3, an input symbol length N=8, and an input symbol $x_i$={+1 +1 −1 −1 −1 +1 −1 +1}. The input symbol length is a length for transmitting a frame of signal.

A signal generation procedure includes the following steps:

(1) First, generate a Nuttall envelope waveform h(t) of a transmit signal based on design parameters.

Figure 48:
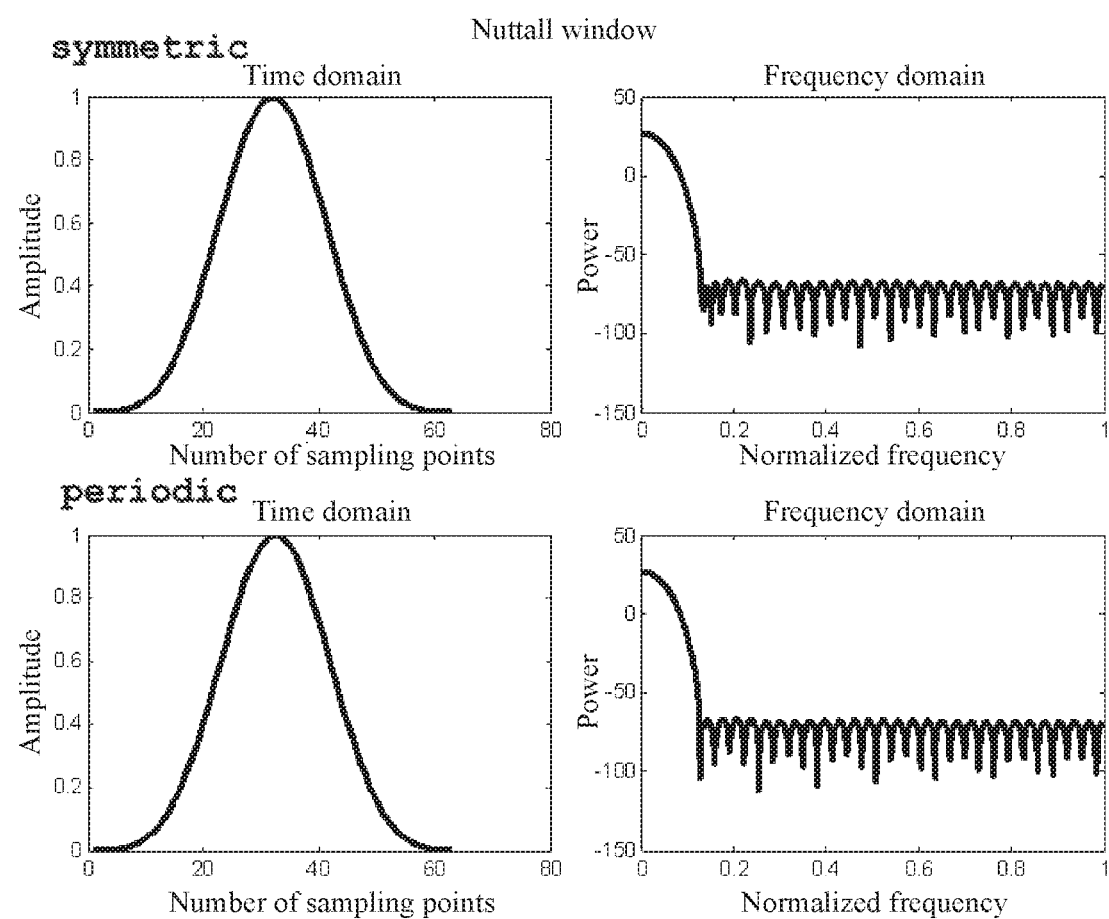
FIG. 48 is a diagram of a time-domain waveform and a frequency-domain waveform of a Nuttall envelope waveform according to an embodiment of the disclosure.

In this embodiment, in the design parameter, a window length L=63, and a time-domain waveform and a frequency-domain waveform thereof are shown in FIG. 48. It can be learned from FIG. 48 that a Nuttall window in the time-domain waveform starts from approximately 0 (0.0004), and a frequency-domain side lobe attenuation is approximately 100 dB. In addition, FIG. 48 shows time-domain waveforms and frequency-domain waveforms of the Nuttall window when symmetric sampling and periodic sampling are respectively used.

Specifically, a Nuttall window function (a symmetric function) may be represented by using the following formula:

$$\omega(n)=a_0-a_1 \cos(2\pi n/(N-1))+a_2 \cos(4\pi n/(N-1))-a_3 \cos(6\pi n/(N-1)).$$

Specifically, a Nuttall window function (a periodic function) may be represented by using the following formula:

$$\omega(n)=a_0-a_1 \cos(2\pi n/N)+a_2 \cos(4\pi n/N)-a_3 \cos(6\pi n/N).$$

n=0, 1, 2, 3, . . . , N−1. It should be noted that n in the foregoing formula merely represents a function variable in the formula.

Based on the foregoing embodiments, it can be learned that when this embodiment is applied to an OvFDM system, a Nuttall envelope waveform is a frequency-domain function waveform. That is, as shown in FIG. 48, a diagram on the left shows frequency-domain sampling, and a diagram on the right shows a time-domain normalization function. Other modulation and demodulation method steps are similar, and details are not described herein again.

Figure 49:
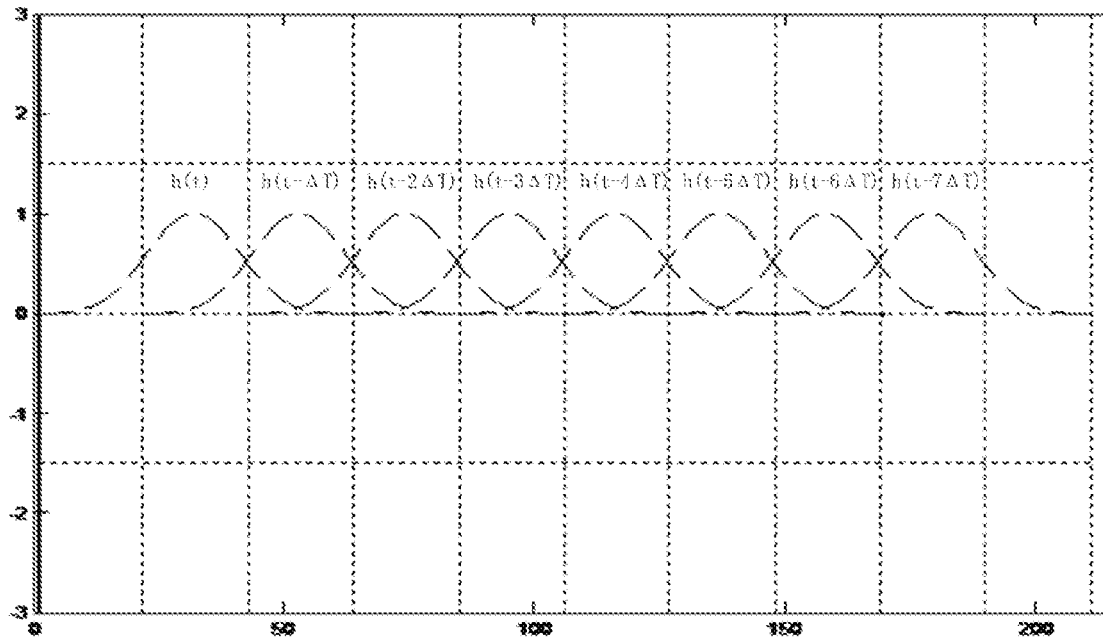
FIG. 49 is a diagram of envelope waveforms of various moments obtained after a Nuttall window is shifted according to an embodiment of the disclosure.

(2) Shift the Nuttall envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 49.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 50:
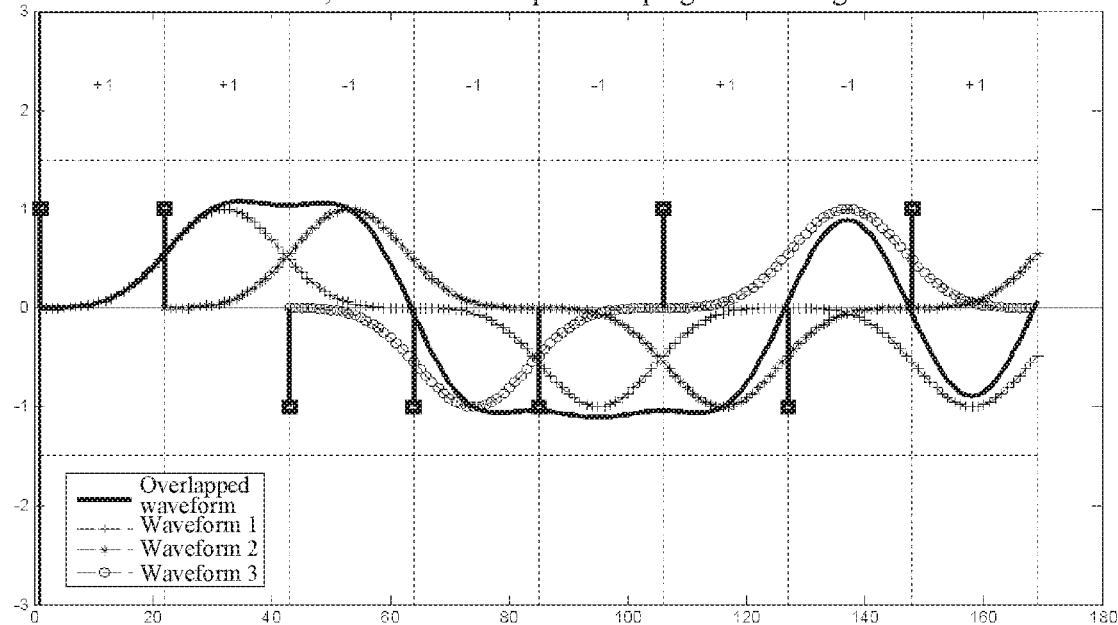
FIG. 50 is a schematic diagram of superimposition of to-be-sent waveforms when a Nuttall envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 50, where three different dashed lines represent three waveforms obtained after multiplication.

(5) Superimpose the modulated envelope waveforms $x_i$h (t−i*ΔT) of the moments that are formed in (4) in the time domain, to obtain a complex modulated envelope waveform carrying an output signal sequence, namely, a transmit signal.

Embodiment 13

The following further describes this application assuming that an initial envelope waveform is a triangular envelope waveform. OvTDM signal transmission and receiving procedures are described by using an example in which times of overlapped multiplexing K=3, an input symbol length N=8, and an input symbol $x_i$={+1 +1 −1 −1 −1 +1 −1 +1}. The input symbol length is a length for transmitting a frame of signal.

A signal generation procedure includes the following steps:

(1) First, generate a triangular envelope waveform h(t) of a transmit signal based on design parameters.

Figure 51:
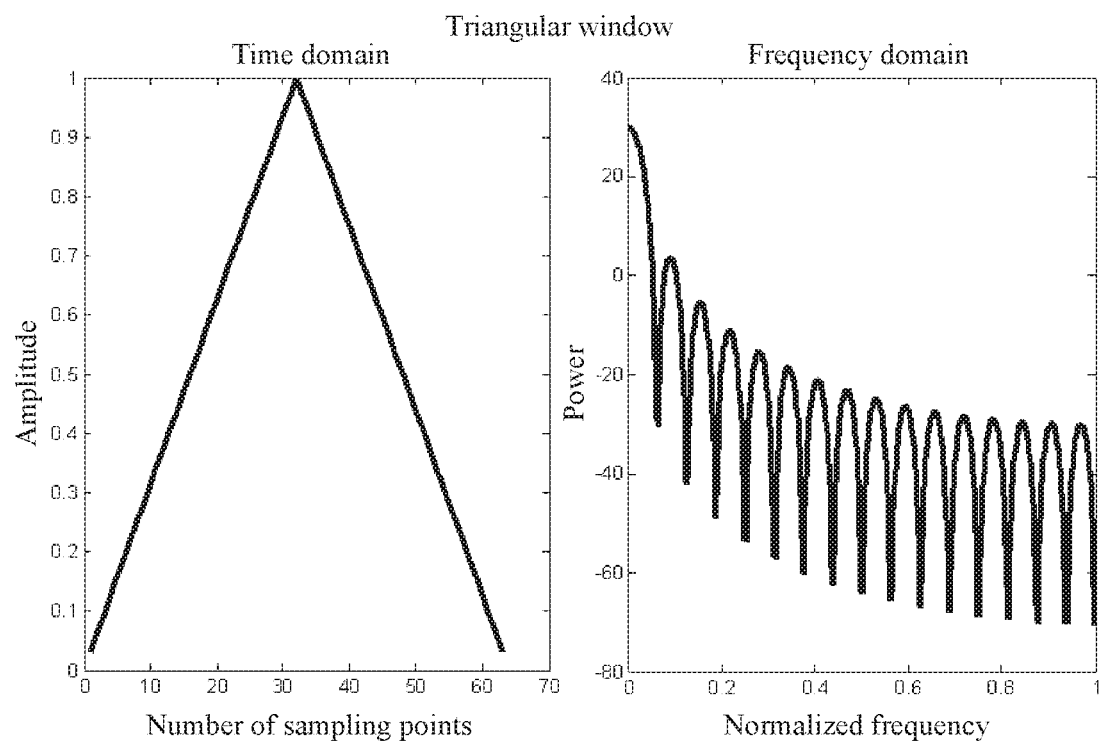
FIG. 51 is a diagram of a time-domain waveform and a frequency-domain waveform of a triangular envelope waveform according to an embodiment of the disclosure.

In this embodiment, in the design parameter, a window length L=63, and a time-domain waveform and a frequency-domain waveform thereof are shown in FIG. 51. It can be learned from FIG. 51 that a triangular window in the time-domain waveform starts from 0, and a frequency-domain side lobe attenuation is approximately 30 dB.

Specifically, a triangular window function may be represented by using the following formula:
when the window length L is an odd number:

$$w(n) = \begin{cases} \dfrac{2n}{L+1}, & 1 \le n \le \dfrac{L+1}{2} \\ \dfrac{2(L-n+1)}{L+1}, & \dfrac{L+1}{2} < n \le L \end{cases} ;$$

when the window length L is an even number:

$$w(n) = \begin{cases} \dfrac{2n}{L}, & 1 \le n \le \dfrac{L+1}{2} \\ \dfrac{2(L-n+1)}{L}, & \dfrac{L}{2}+1 \le n \le L \end{cases}.$$

It should be noted that n in the foregoing formula merely represents a function variable in the formula.

Based on the foregoing embodiments, it can be learned that when this embodiment is applied to an OvFDM system, a triangular envelope waveform is a frequency-domain function waveform. That is, as shown in FIG. 51, a diagram on the left shows frequency-domain sampling, and a diagram on the right shows a time-domain normalization function. Other modulation and demodulation method steps are similar, and details are not described herein again.

Figure 52:
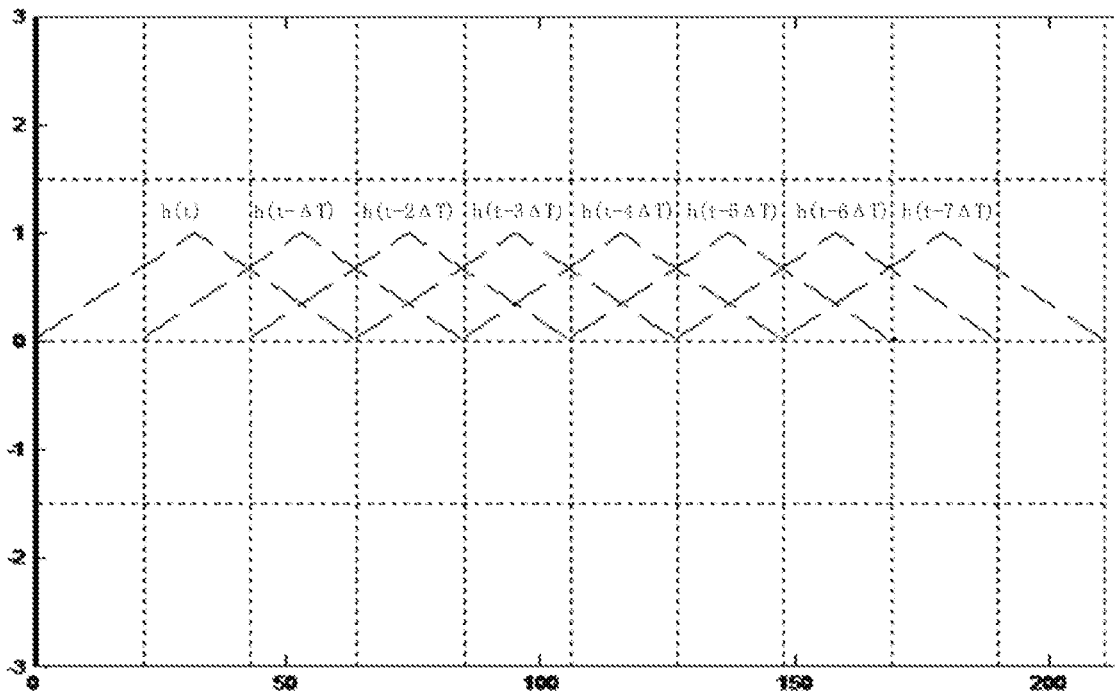
FIG. 52 is a diagram of envelope waveforms of various moments obtained after a triangular window is shifted according to an embodiment of the disclosure.

(2) Shift the triangular envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 52.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 53:
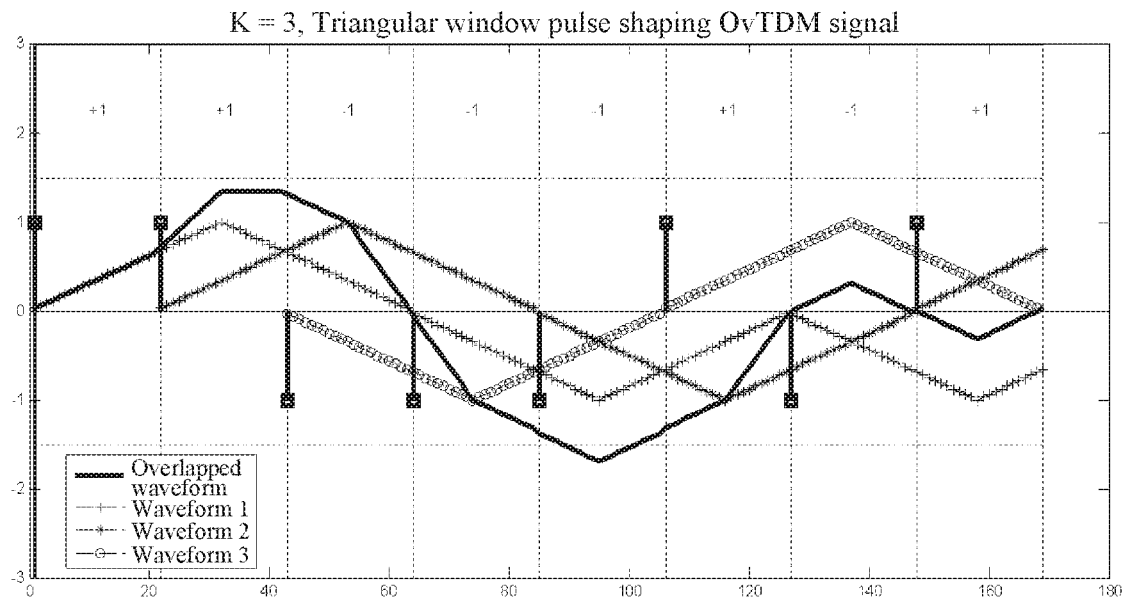
FIG. 53 is a schematic diagram of superimposition of to-be-sent waveforms when a triangular envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 53, where three different dashed lines represent three waveforms obtained after multiplication.

(5) Superimpose the modulated envelope waveforms $x_i$h(t−i*ΔT) of the moments that are formed in (4) in the time domain, to obtain a complex modulated envelope waveform carrying an output signal sequence, namely, a transmit signal.

Embodiment 14

The following further describes this application assuming that an initial envelope waveform is a Parzen envelope waveform. OvTDM signal transmission and receiving procedures are described by using an example in which times of overlapped multiplexing K=3, an input symbol length N=8, and an input symbol $x_i$={+1 +1 −1 −1 −1 +1 −1 +1}. The input symbol length is a length for transmitting a frame of signal.

A signal generation procedure includes the following steps:

(1) First, generate a Parzen envelope waveform h(t) of a transmit signal based on design parameters.

Figure 54:
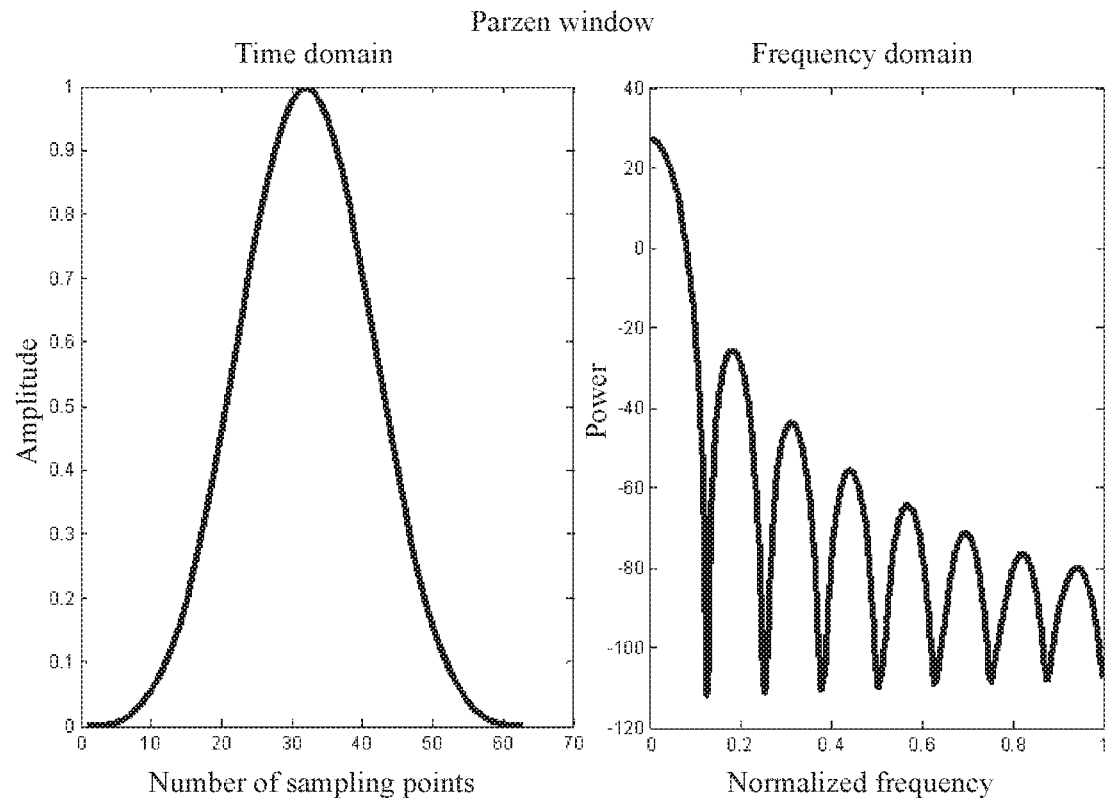
FIG. 54 is a diagram of a time-domain waveform and a frequency-domain waveform of a Parzen envelope waveform according to an embodiment of the disclosure.

In this embodiment, in the design parameter, a window length L=63, and a time-domain waveform and a frequency-domain waveform thereof are shown in FIG. 54. It can be learned from FIG. 54 that a Parzen window in the time-domain waveform starts from 0, and a frequency-domain out-of-band attenuation is approximately 60 dB.

Specifically, a Parzen window function may be represented by using the following formula:

$$w(n) = \begin{cases} 1 - 6\left(\dfrac{|n|}{N/2}\right)^2 + 6\left(\dfrac{|n|}{N/2}\right)^3 & 0 \le |n| \le (N-1)/4 \\ 2\left(1 - \dfrac{|n|}{N/2}\right)^3 & (N-1)/4 < |n| \le (N-1)/2 \end{cases}.$$

−(N−1)/2≤n≤(N−1)/2. It should be noted that n in the foregoing formula merely represents a function variable in the formula.

Based on the foregoing embodiments, it can be learned that when this embodiment is applied to an OvFDM system, a Parzen envelope waveform is a frequency-domain function waveform. That is, as shown in FIG. 54, a diagram on the left shows frequency-domain sampling, and a diagram on the right shows a time-domain normalization function. Other modulation and demodulation method steps are similar, and details are not described herein again.

Figure 55:
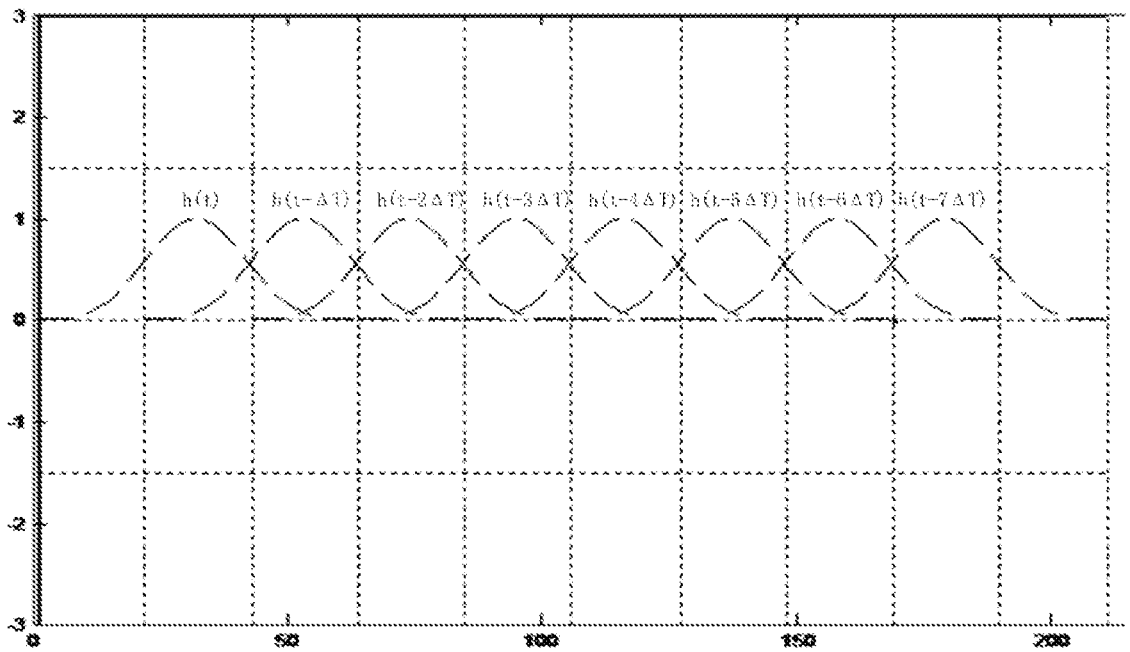
FIG. 55 is a diagram of envelope waveforms of various moments obtained after a Parzen window is shifted according to an embodiment of the disclosure.

(2) Shift the Parzen envelope waveform h(t) designed in (1) in the time domain at a preset shift interval, where the shift interval is a time interval ΔT (ΔT=L/K=21). After shifting, offset envelope waveforms h(t−i*ΔT) of transmit signals at various moments are formed (because N=8, i is an integer from 0 to 7). The offset envelope waveforms of transmit signals at various moments that are obtained after shifting are shown in FIG. 55.

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 56:
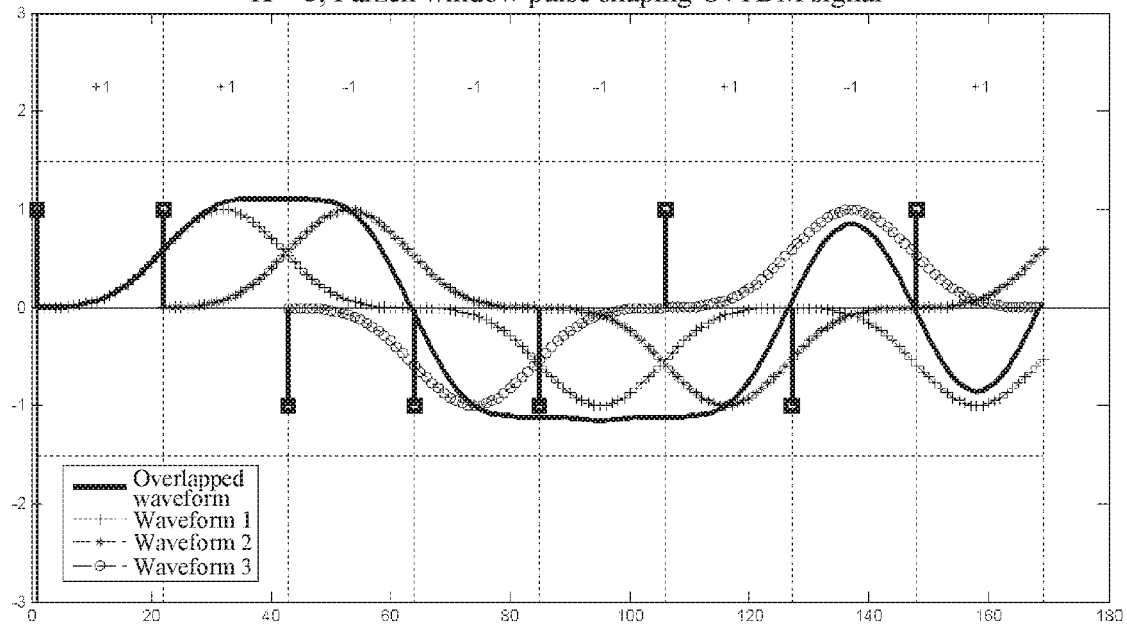
FIG. 56 is a schematic diagram of superimposition of to-be-sent waveforms when a Parzen envelope waveform is used according to an embodiment of the disclosure.

(4) Multiply the positive-negative symbol sequence $x_i$ (in this embodiment, $x_i$={+1 +1 −1 −1 −1 +1 −1 +1}) by the offset envelope waveforms h(t−i*ΔT) of transmit signals at various moments that are generated in (2), to obtain modulated envelope waveforms $x_i$h(t−i*ΔT) of the moments. Formed waveforms are shown in FIG. 56, where three different dashed lines represent three waveforms obtained after multiplication.

(5) Superimpose the modulated envelope waveforms $x_i$h(t−i*ΔT) of the moments that are formed in (4) in the time domain, to obtain a complex modulated envelope waveform carrying an output signal sequence, namely, a transmit signal.

Embodiment 15

The following further describes this application assuming that an initial envelope waveform is a Tukey envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Tukey envelope waveform h(t) of a transmit signal based on design parameters.

Figure 57:
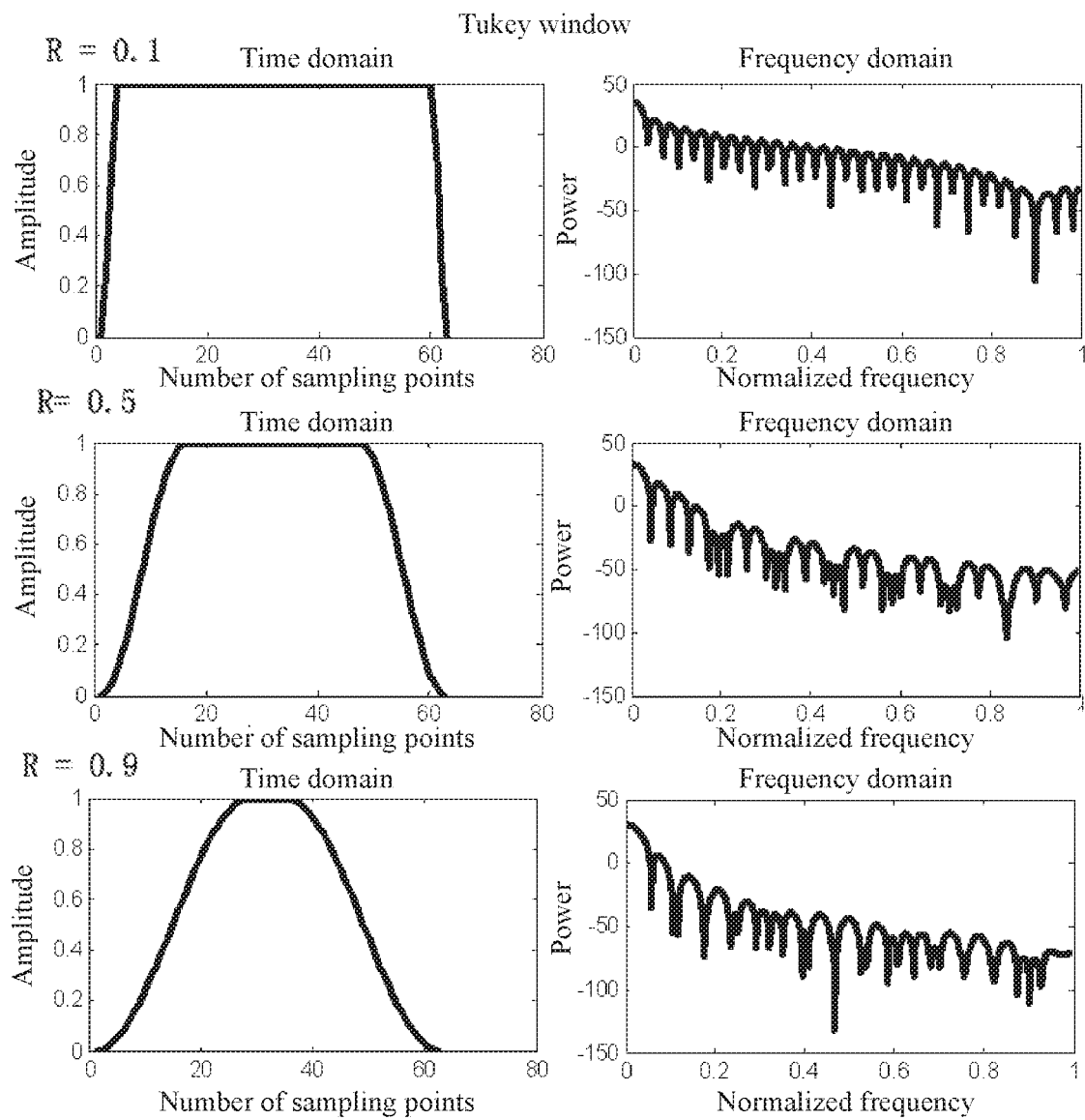
FIG. 57 is a diagram of a time-domain waveform and a frequency-domain waveform of a Tukey envelope waveform according to an embodiment of the disclosure.

In this embodiment, in the design parameter, a window length L=63, and R is respectively 0.1, 0.5, and 0.9 for example. A time-domain waveform and a frequency-domain waveform thereof are shown in FIG. 57. R is a ratio of a taper area to a constant value, and ranges from 0 to 1. When R is an extremum, a Tukey window evolves to another common window. When R=1, the Tukey window is equivalent to a Hanning window. When R=0, the Tukey window is equivalent to a rectangular window.

It can be learned from FIG. 57 that the time-domain waveform starts from 0; and as R increases, the taper area expands, the waveform is more smooth, and side lobe attenuation of the frequency-domain waveform is faster. Therefore, better performance is achieved after superimposition.

Specifically, a Tukey window function may be represented by using the following formula:

$$w(x) = \begin{cases} \frac{1}{2}\left\{1+\cos\left(\frac{2\pi}{\alpha}[x-\alpha/2]\right)\right\} & 0 \le x < \frac{\alpha}{2} \\ 1 & \frac{\alpha}{2} \le x < 1-\frac{\alpha}{2} \\ \frac{1}{2}\left\{1+\cos\left(\frac{2\pi}{\alpha}[x-1+\alpha/2]\right)\right\} & 1-\frac{\alpha}{2} \le x \le 1 \end{cases}$$

a in the formula is the foregoing R value. It should be noted that x in the foregoing formula merely represents a function variable in the formula.

Based on the foregoing embodiments, it can be learned that when this embodiment is applied to an OvFDM system, a Tukey envelope waveform is a frequency-domain function waveform. That is, as shown in FIG. 57, a diagram on the left shows frequency-domain sampling, and a diagram on the right shows a time-domain normalization function. Other modulation and demodulation method steps are similar, and details are not described herein again.

Figure 58:
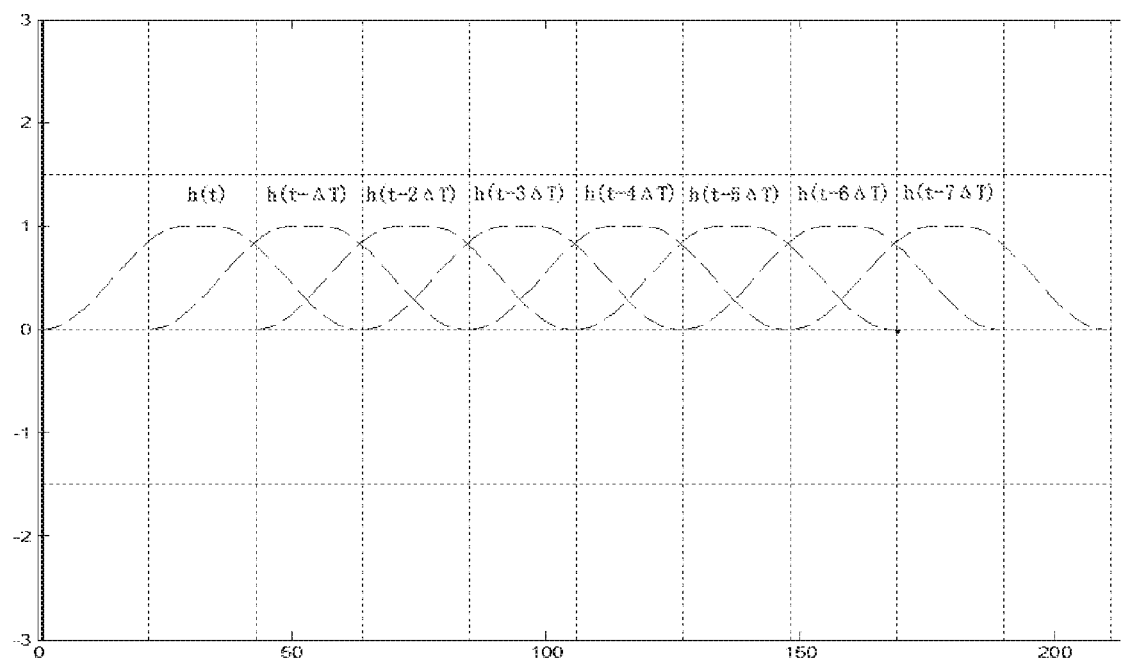
FIG. 58 is a diagram of envelope waveforms of various moments obtained after a Tukey window is shifted according to an embodiment of the disclosure.

(2) Shift the Tukey envelope waveform h(t) designed in (1) in the time domain at a preset shift interval, where the shift interval is a time interval $\Delta T$ ($\Delta T=L/K=21$). After shifting, offset envelope waveforms $h(t-i*\Delta T)$ of transmit signals at various moments are formed (because N=8, i is an integer from 0 to 7). The offset envelope waveforms of transmit signals at various moments that are obtained after shifting are shown in FIG. 58.

(3) Convert an input digital signal sequence into a positive-negative symbol sequence.

Specifically, 0 and 1 in the input digital signal sequence may be converted into +A and −A respectively, to obtain the positive-negative symbol sequence. For example, A=1, and an input {0, 1} bit sequence is converted into a {+1, −1} symbol sequence through BPSK modulation.

Figure 59A:
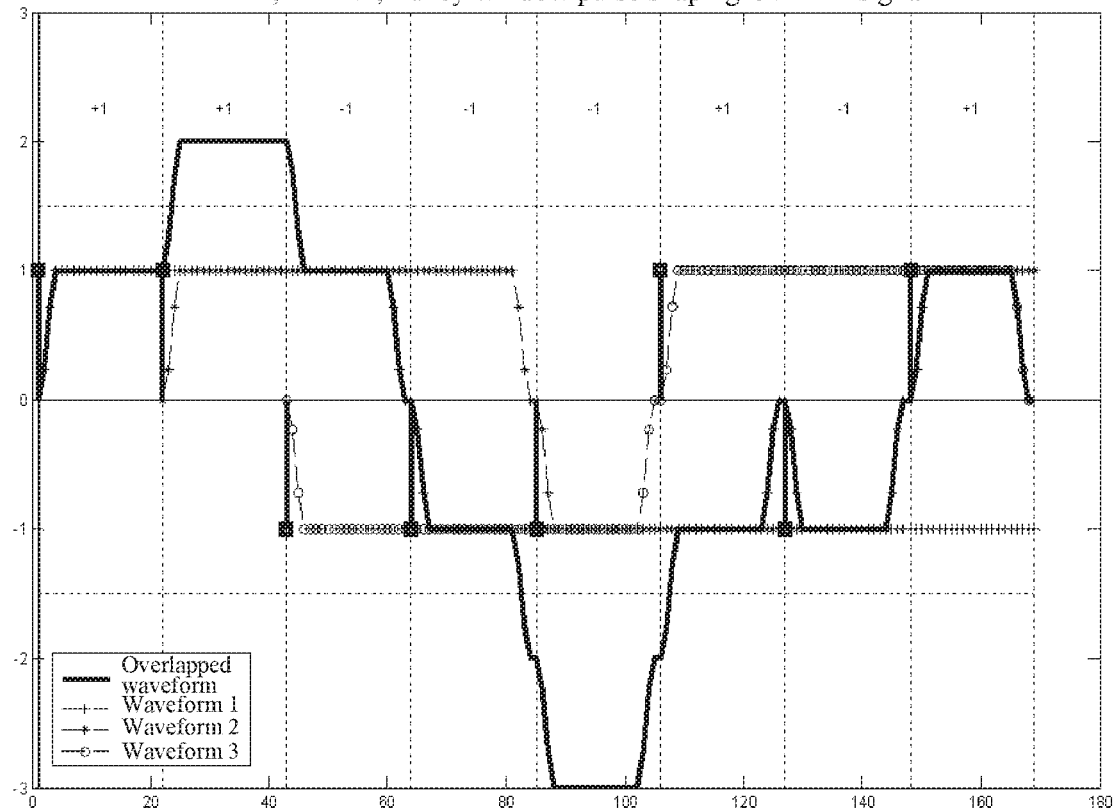
FIG. 59A is a schematic diagram of superimposition of to-be-sent waveforms when a Tukey envelope waveform is used and R=0.1 according to an embodiment of the disclosure.
Figure 59B:
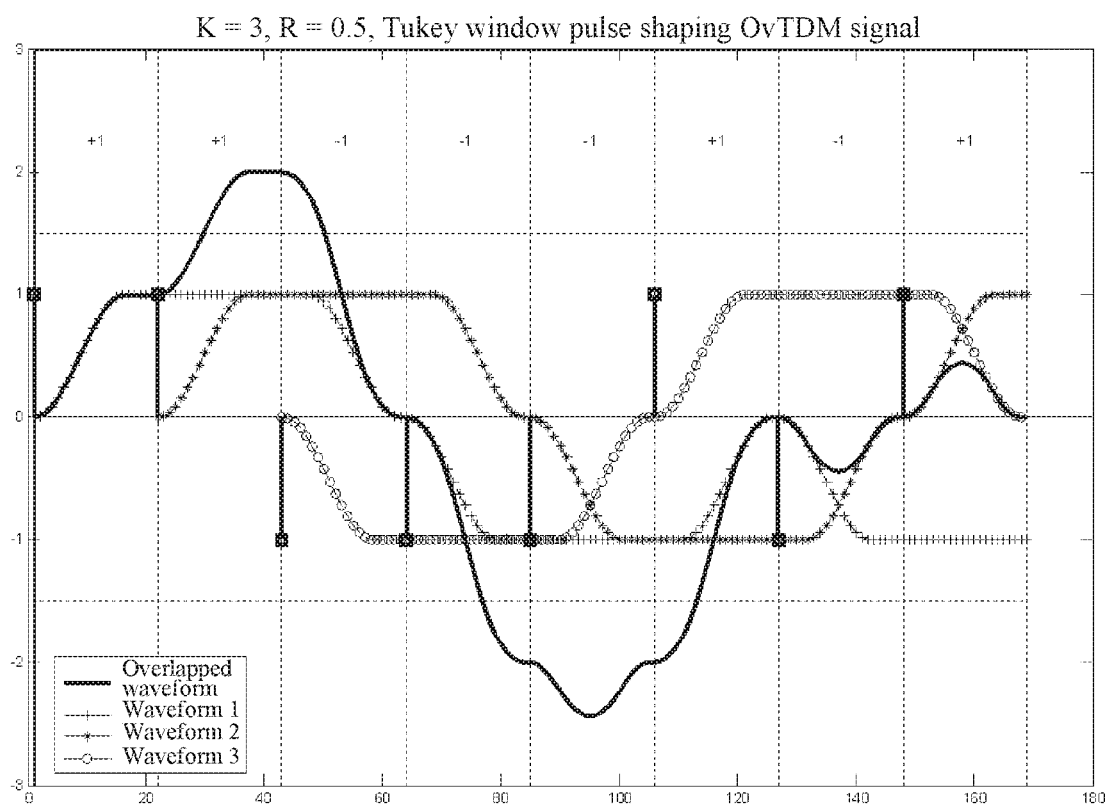
FIG. 59B is a schematic diagram of superimposition of to-be-sent waveforms when a Tukey envelope waveform is used and R=0.5 according to an embodiment of the disclosure.
Figure 59C:
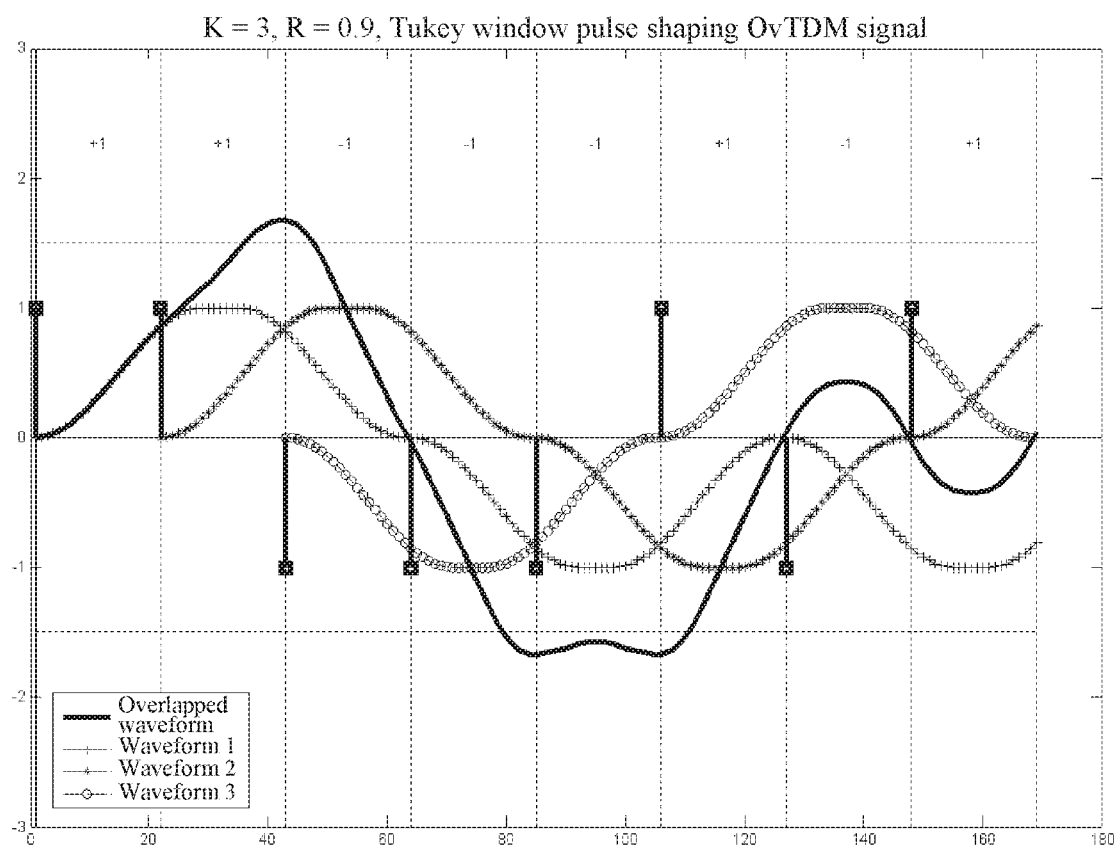
FIG. 59C is a schematic diagram of superimposition of to-be-sent waveforms when a Tukey envelope waveform is used and R=0.9 according to an embodiment of the disclosure.

(4) Multiply the positive-negative symbol sequence $x_i$ (in this embodiment, $x_i=\{+1\ +1\ -1\ -1\ -1\ +1\ -1\ +1\}$) by the offset envelope waveforms $h(t-i*\Delta T)$ of transmit signals at various moments that are generated in (2), to obtain modulated envelope waveforms $x_i h(t-i*\Delta T)$ of the moments. Formed waveforms are shown in FIG. 59 (FIG. 59A to FIG. 59C), where three different dashed lines represent three waveforms obtained after multiplication.

(5) Superimpose the modulated envelope waveforms $x_i h(t-i*\Delta T)$ of the moments that are formed in (4) in the time domain, to obtain a complex modulated envelope waveform carrying an output signal sequence, namely, a transmit signal.

Embodiment 16

The following further describes this application assuming that an initial envelope waveform is a Taylor envelope waveform. OvTDM signal transmission and receiving procedures are described by using an example in which times of overlapped multiplexing K=3, an input symbol length N=8, and an input symbol $x_i=\{+1\ +1\ -1\ -1\ -1\ +1\ -1\ +1\}$. The input symbol length is a length for transmitting a frame of signal.

A signal generation procedure includes the following steps:

(1) First, generate a Taylor envelope waveform h(t) of a transmit signal based on design parameters.

Figure 60:
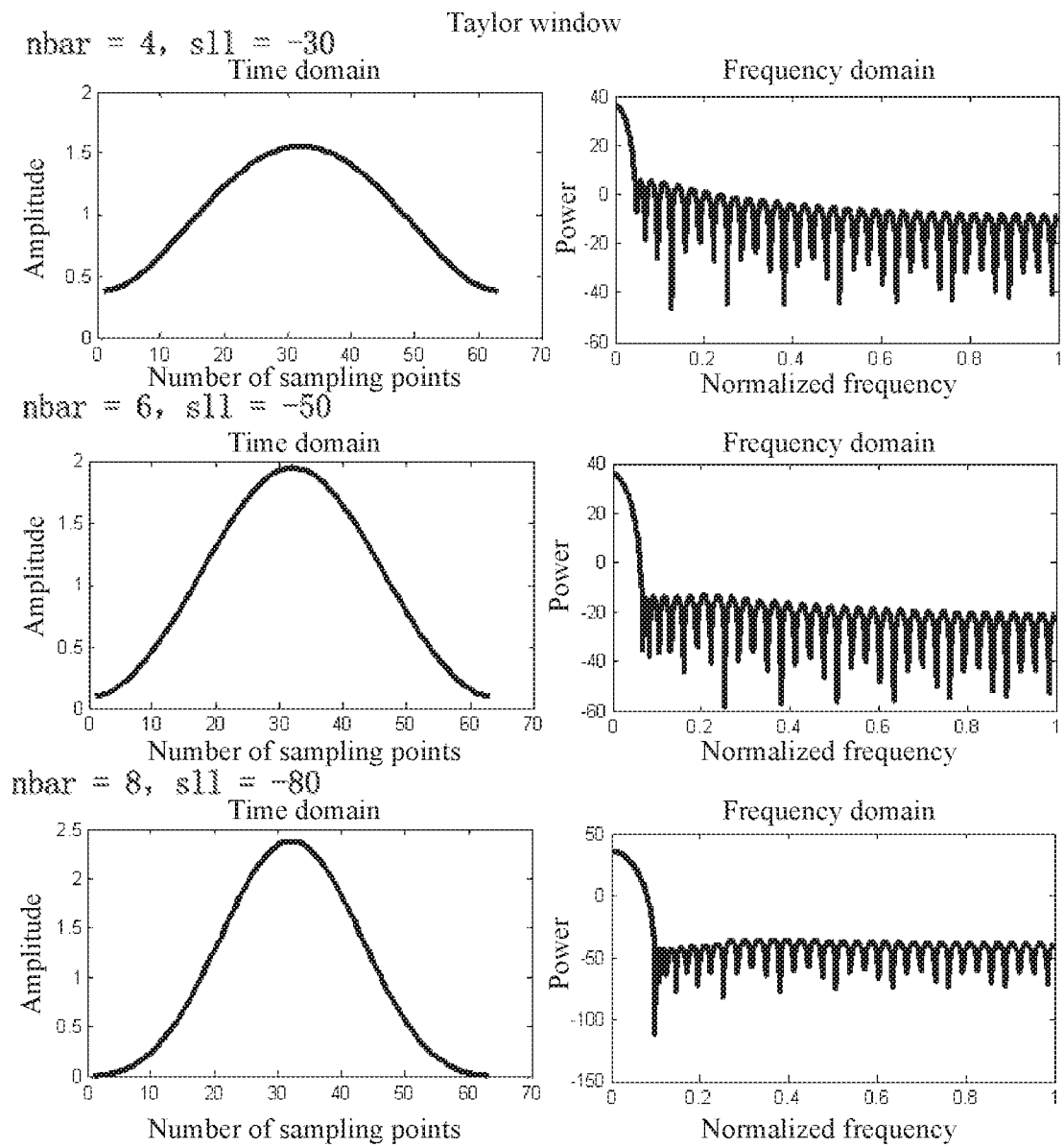
FIG. 60 is a diagram of a time-domain waveform and a frequency-domain waveform of a Taylor envelope waveform according to an embodiment of the disclosure.

In this embodiment, a matlab Taylor function, w=taylorwin(n,nbar,sll), is used to generate a required Taylor window. In this embodiment, in the design parameter, a window length L=63, and three groups of parameters are used as an example: nbar=4, sll=−30; nbar=6, sll=−50; and nbar=8, sll=−80. A time-domain waveform and a frequency-domain waveform thereof are shown in FIG. 60. It can learned from a frequency-domain diagram that side lobe attenuation is corresponding to sll values, which are respectively 30 dB, 50 dB, and 80 dB. As nbar increases, a start point of the time-domain waveform more approaches 0, a value of a highest point is larger, and the waveform is more smooth. Therefore, better performance is achieved after superimposition. nbar affects a start point location of the time-domain waveform, and sll affects the frequency-domain side lobe attenuation value.

Based on the foregoing embodiments, it can be learned that when this embodiment is applied to an OvFDM system, a Taylor envelope waveform is a frequency-domain function waveform. That is, as shown in FIG. 60, a diagram on the left shows frequency-domain sampling, and a diagram on the right shows a time-domain normalization function. Other modulation and demodulation method steps are similar, and details are not described herein again.

Figure 61:
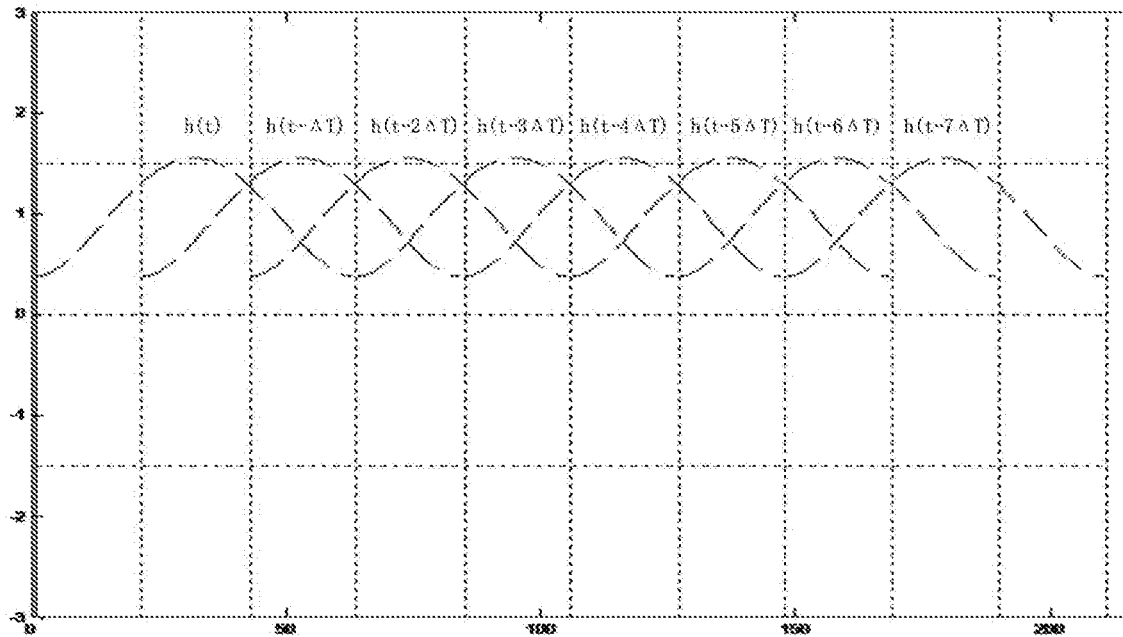
FIG. 61 is a diagram of envelope waveforms of various moments obtained after a Taylor window is shifted according to an embodiment of the disclosure.

(2) Shift the Taylor envelope waveform h(t) designed in (1) in the time domain at a preset shift interval, where the shift interval is a time interval $\Delta T$ ($\Delta T=L/K=21$). After shifting, offset envelope waveforms $h(t-i*\Delta T)$ of transmit signals at various moments are formed (because N=8, i is an integer from 0 to 7). The offset envelope waveforms of transmit signals at various moments that are obtained after shifting are shown in FIG. 61 (nbar=4, sll=−30).

(3) Convert an input digital signal sequence into a positive-negative symbol sequence.

Specifically, 0 and 1 in the input digital signal sequence may be converted into ±A, to obtain the positive-negative symbol sequence, where a value of A is a non-zero arbitrary number. For example, when A is 1, an input {0, 1} bit sequence is converted into a {+1, −1} symbol sequence through BPSK modulation.

Figure 62A:
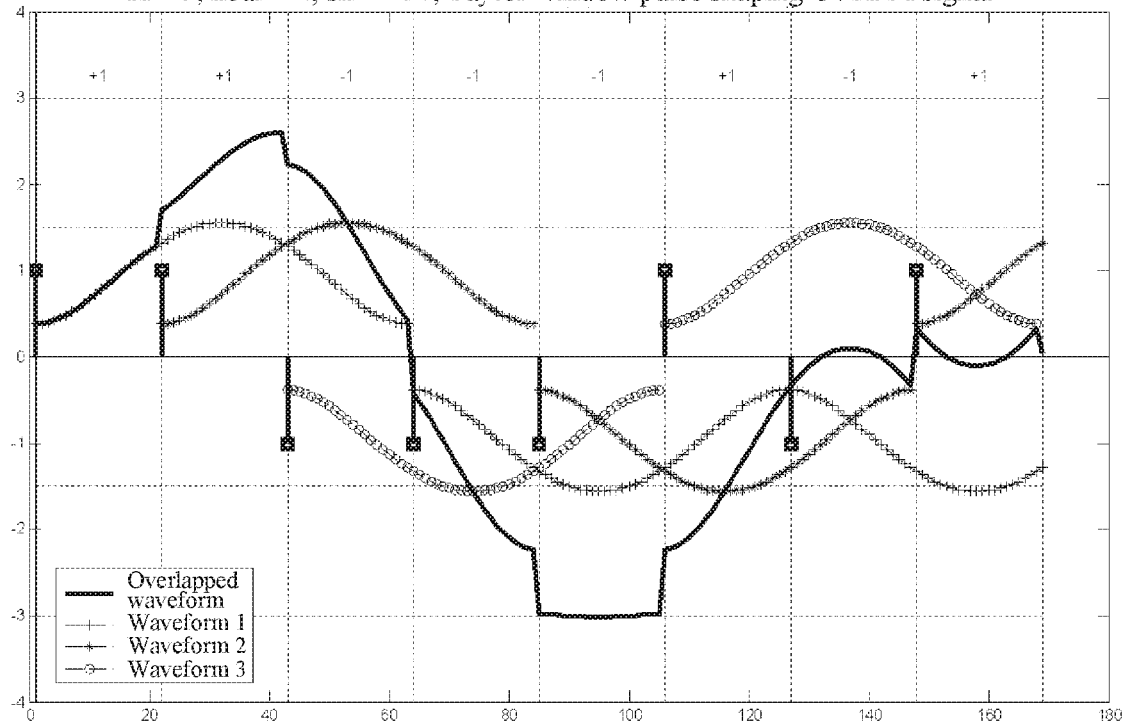
FIG. 62A is a schematic diagram of superimposition of to-be-sent waveforms when a Taylor envelope waveform is used, nbar=4, and sll=−30 according to an embodiment of the disclosure.
Figure 62B:
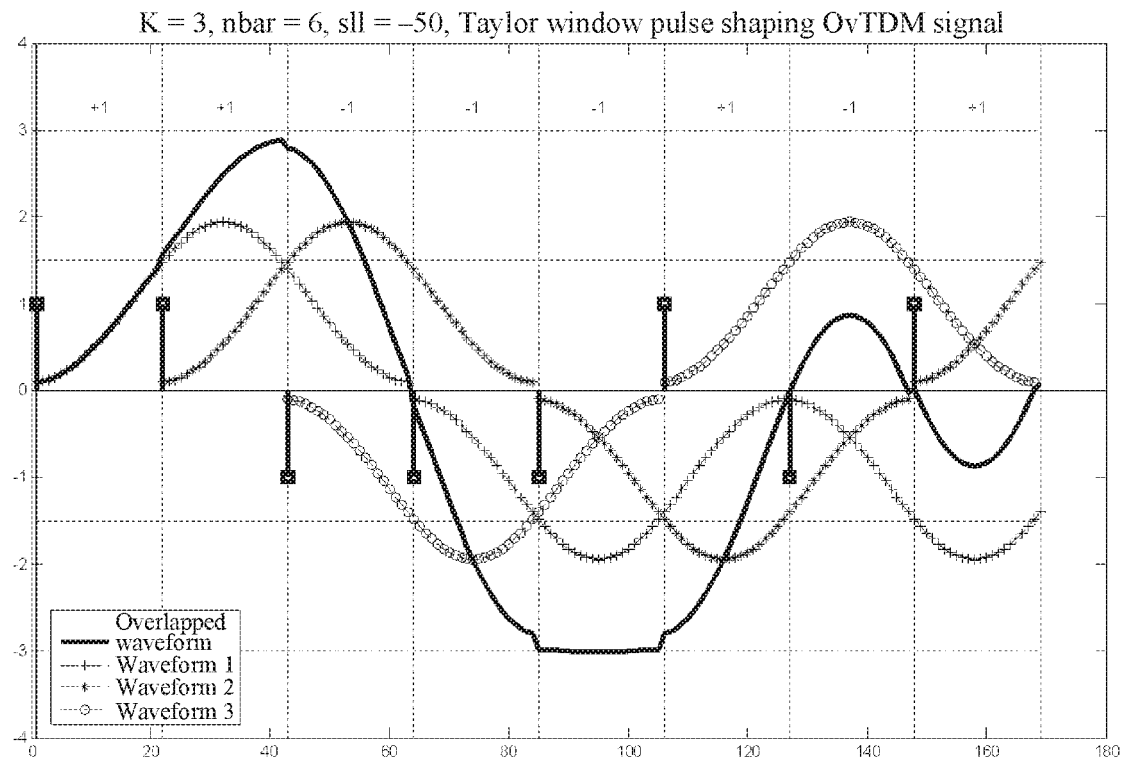
FIG. 62B is a schematic diagram of superimposition of to-be-sent waveforms when a Taylor envelope waveform is used, nbar=6, and sll=−50 according to an embodiment of the disclosure.
Figure 62C:
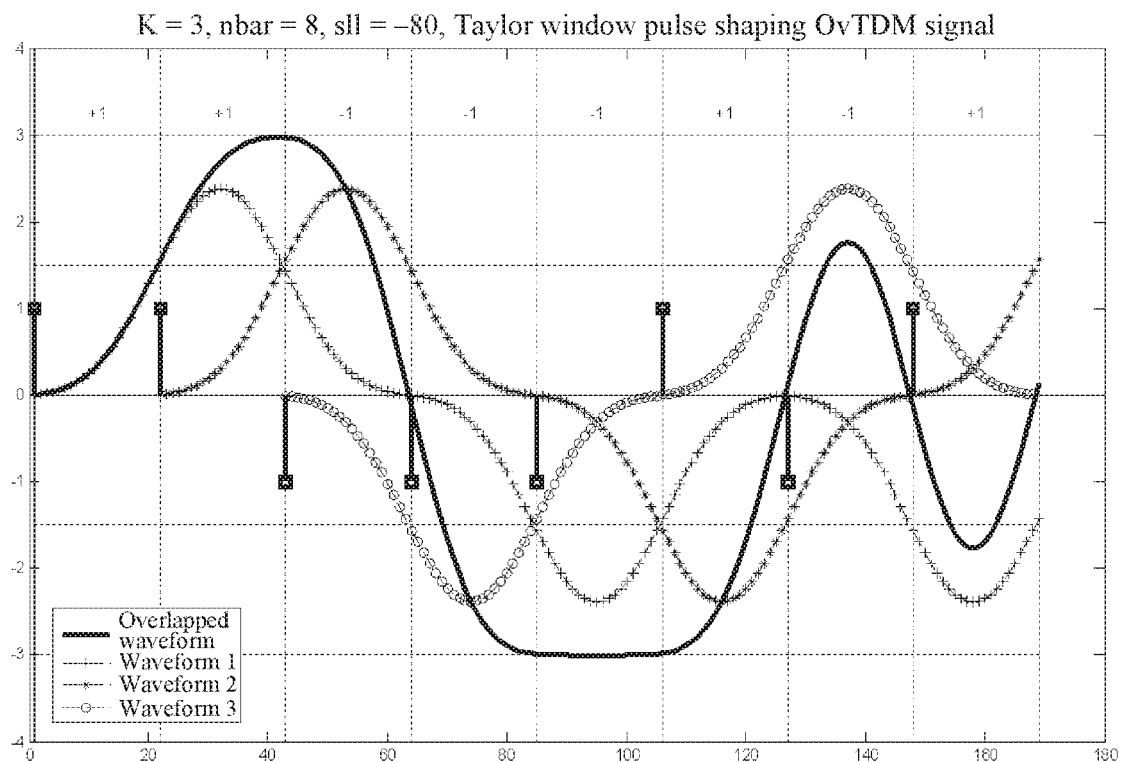
FIG. 62C is a schematic diagram of superimposition of to-be-sent waveforms when a Taylor envelope waveform is used, nbar=8, and sll=−80 according to an embodiment of the disclosure.

(4) Multiply the positive-negative symbol sequence $x_i$ (in this embodiment, $x_i=\{+1\ +1\ -1\ -1\ -1\ +1\ -1\ +1\}$) by the offset envelope waveforms $h(t-i*\Delta T)$ of transmit signals at various moments that are generated in (2), to obtain modulated envelope waveforms $x_i h(t-i*\Delta T)$ of the moments. Formed waveforms are shown in FIG. 62 (FIG. 62A to FIG. 62C), where three different dashed lines represent three waveforms obtained after multiplication.

(5) Superimpose the modulated envelope waveforms $x_i h(t-i*\Delta T)$ of the moments that are formed in (4) in the time domain, to obtain a complex modulated envelope waveform carrying an output signal sequence, namely, a transmit signal.

According to the overlapped time division/frequency division multiplexing modulation method, apparatus, and system that are provided in the disclosure, because the initial envelope waveform is smooth in the time domain (or the frequency domain), the waveform obtained after superimposition is smooth. Therefore, the system transmit power linearly and slowly increases, and the spectrum utilization and the transmission rate are indirectly improved. The overlapped time division multiplexing modulation method, apparatus, and system may be applied to wireless communications systems such as mobile communications, satellite communications, microwave line-of-sight communications, scatter communications, atmospheric optical communications, infrared communications, and underwater acoustic communications systems; and may be applied to both large-capacity wireless transmission and small-capacity light-weight radio systems.

A person skilled in the art may understand that all or some of the steps of the methods in the foregoing implementations may be implemented by a program instructing related hardware. The program may be stored in a computer-readable storage medium. The storage medium may include a read-only memory, a random access memory, a magnetic disk, an optical disk, or the like.

Specific examples are applied in the foregoing to describe the disclosure, and are merely used to help understand the disclosure, but not to limit the disclosure. A person skilled in the technical field to which the disclosure belongs may further make simple derivations, variations, or replacements based on ideas of the disclosure.

What is claimed is:

1. An overlapped time division multiplexing modulation method, comprising:
   generating an initial envelope waveform that is smooth in a time domain;
   shifting the initial envelope waveform in the time domain at a preset shift interval based on times of overlapped multiplexing, to obtain offset envelope waveforms of transmit signals at various moments;
   converting an input digital signal sequence into a positive-negative symbol sequence;
   multiplying the positive-negative symbol sequence obtained after conversion by the offset envelope waveforms of transmit signals at various moments that are obtained after shifting, to obtain modulated envelope waveforms of the moments; and
   superimposing the modulated envelope waveforms of the moments in the time domain, to obtain a complex modulated envelope waveform carrying an output signal sequence.

2. The method according to claim 1, wherein the shift interval is a time interval $\Delta T$, and the time interval $\Delta T$ is:

$\Delta T=L/K$, where

K is the quantity of times of overlapped multiplexing, a value of K is a non-zero positive number, and L is a window length of the initial envelope waveform.

3. The method according to claim 1, wherein the converting an input digital signal sequence into a positive-negative symbol sequence is specifically: converting 0 and 1 in the input digital signal sequence into +A and −A respectively, to obtain the positive-negative symbol sequence, where a value of A is a non-zero arbitrary number.

4. The method according to claim 1, wherein the output signal sequence is determined in the following manner:
   when a modulated envelope waveform is obtained after a positive symbol is multiplied by an offset envelope waveform at the moment, determining an operation value of the modulated envelope waveform as +A; or when a modulated envelope waveform is obtained after a negative symbol is multiplied by an envelope waveform at the moment, determining an operation value of the modulated envelope waveform as −A, wherein a value of A is a non-zero arbitrary number; and
   for each shift interval, superimposing operation values of modulated envelope waveforms in the shift interval, to obtain output signals of the shift interval and form the output signal sequence.

5. An overlapped time division multiplexing modulation apparatus, comprising:
   a waveform generation module, configured to generate an initial envelope waveform that is smooth in a time domain;
   a shift module, configured to shift the initial envelope waveform in the time domain at a preset shift interval based on times of overlapped multiplexing, to obtain offset envelope waveforms of transmit signals at various moments;
   a modulation module, configured to convert an input digital signal sequence into a positive-negative symbol sequence;
   a multiplication module, configured to multiply the positive-negative symbol sequence obtained after conversion by the offset envelope waveforms of transmit signals at various moments that are obtained after shifting, to obtain modulated envelope waveforms of the moments; and
   a superimposition module, configured to superimpose the modulated envelope waveforms of the moments in the time domain, to obtain a complex modulated envelope waveform carrying an output signal sequence.

6. The apparatus according to claim 5, wherein the shift interval is a time interval $\Delta T$, and the time interval $\Delta T$ is:

$\Delta T=L/K$, where

K is the quantity of times of overlapped multiplexing, a value of K is a non-zero positive number, and L is a window length of the initial envelope waveform.

7. The apparatus according to claim 5, wherein when the modulation module is configured to convert the input digital signal sequence into the positive-negative symbol sequence, the modulation module is configured to convert 0 and 1 in the input digital signal sequence into +A and −A respectively, to obtain the positive-negative symbol sequence, where a value of A is a non-zero arbitrary number.

8. The apparatus according to claim 5, wherein the output signal sequence carried in the complex modulated envelope waveform is formed by output signals of various shift intervals; the output signals of the shift intervals are results obtained after operation values of modulated envelope waveforms in each shift interval are superimposed; and when a modulated envelope waveform is obtained after a positive symbol is multiplied by an envelope waveform at the moment, an operation value of the modulated envelope waveform is +A; or when a modulated envelope waveform is obtained after a negative symbol is multiplied by an envelope waveform at the moment, an operation value of the modulated envelope waveform is −A, where a value of A is a non-zero arbitrary number.

9. An overlapped frequency division multiplexing modulation method, comprising the following steps:

generating an initial envelope waveform that is smooth in a frequency domain;

shifting the initial envelope waveform in the frequency domain at a preset spectrum interval based on times of overlapped multiplexing, to obtain subcarrier envelope waveforms;

converting an input digital signal sequence into a positive-negative symbol sequence;

multiplying each symbol in the positive-negative symbol sequence by a subcarrier envelope waveform corresponding to the symbol, to obtain modulated envelope waveforms of subcarriers;

superimposing the modulated envelope waveforms of the subcarriers in the frequency domain, to obtain a frequency-domain complex modulated envelope waveform; and transforming the frequency-domain complex modulated envelope waveform into a time-domain complex modulated envelope waveform.

10. The overlapped frequency division multiplexing modulation method according to claim 9, wherein the spectrum interval is a subcarrier spectrum interval ΔB, wherein the subcarrier spectrum interval ΔB=B/K, B is a bandwidth of the initial envelope waveform, K is the quantity of times of overlapped multiplexing, and a value of K is a non-zero positive number.

11. The overlapped frequency division multiplexing modulation method according to claim 9, wherein the converting an input digital signal sequence into a positive-negative symbol sequence is specifically: converting 0 and 1 in the input digital signal sequence into +A and −A respectively, to obtain the positive-negative symbol sequence, wherein a value of A is a non-zero arbitrary number.

12. The overlapped frequency division multiplexing modulation method according to claim 9, wherein the output signal sequence carried in the complex modulated envelope waveform is determined by using the following steps:

when a modulated envelope waveform is obtained after a positive symbol is multiplied by a subcarrier envelope waveform, determining an operation value of the modulated envelope waveform as +A; or when a modulated envelope waveform is obtained after a negative symbol is multiplied by a subcarrier envelope waveform, determining an operation value of the modulated envelope waveform as −A, where a value of A is a non-zero arbitrary number; and for each spectrum interval, superimposing operation values of modulated envelope waveforms in the spectrum interval, to obtain output signals of the spectrum interval and form the output signal sequence.

13. An overlapped frequency division multiplexing modulation apparatus, comprising:

a waveform generation module, configured to generate an initial envelope waveform that is smooth in a frequency domain;

a shift module, configured to shift the initial envelope waveform in the frequency domain at a preset spectrum interval based on times of overlapped multiplexing, to obtain subcarrier envelope waveforms;

a conversion module, configured to convert an input digital signal sequence into a positive-negative symbol sequence;

a multiplication module, configured to multiply each symbol in the positive-negative symbol sequence by a subcarrier envelope waveform corresponding to the symbol, to obtain modulated envelope waveforms of subcarriers;

a superimposition module, configured to superimpose the modulated envelope waveforms of the subcarriers in the frequency domain, to obtain a frequency-domain complex modulated envelope waveform; and a transformation module, configured to transform the frequency-domain complex modulated envelope waveform into a time-domain complex modulated envelope waveform.

14. The overlapped frequency division multiplexing modulation apparatus according to claim 13, wherein the spectrum interval is a subcarrier spectrum interval ΔB, where the subcarrier spectrum interval ΔB=B/K, B is a bandwidth of the initial envelope waveform, K is the quantity of times of overlapped multiplexing, and a value of K is a non-zero positive number.

15. The overlapped frequency division multiplexing modulation apparatus according to claim 13, wherein that the conversion module converts the input digital signal sequence into the positive-negative symbol sequence is specifically: converting 0 and 1 in the input digital signal sequence into ±A, where a value of A is a non-zero arbitrary number.

16. The overlapped frequency division multiplexing modulation apparatus according to claim 13, wherein the output signal sequence carried in the complex modulated envelope waveform is formed by output signals of various spectrum intervals; the output signals of the spectrum intervals are results obtained after operation values of modulated envelope waveforms in each spectrum interval are superimposed; and when a modulated envelope waveform is obtained after a positive symbol is multiplied by a subcarrier envelope waveform, an operation value of the modulated envelope waveform is +A; or when a modulated envelope waveform is obtained after a negative symbol is multiplied by a subcarrier envelope waveform, an operation value of the modulated envelope waveform is −A, where a value of A is a non-zero arbitrary number.

* * * * *

UNITED STATES PATENT AND TRADEMARK OFFICE
CERTIFICATE OF CORRECTION

| | | |
|---|---|---|
| PATENT NO. | : 10,630,408 B2 | Page 1 of 1 |
| APPLICATION NO. | : 16/017012 | |
| DATED | : April 21, 2020 | |
| INVENTOR(S) | : Ruopeng Liu, Chunlin Ji and Shasha Zhang | |

It is certified that error appears in the above-identified patent and that said Letters Patent is hereby corrected as shown below:

On the Title Page

Item (73) should read:
SHEN ZHEN KUANG-CHI HEZHONG TECHNOLOGY LTD

Signed and Sealed this
Thirtieth Day of June, 2020

Andrei Iancu
*Director of the United States Patent and Trademark Office*